United States Patent
Mandyam et al.

(10) Patent No.: US 9,269,059 B2
(45) Date of Patent: Feb. 23, 2016

(54) APPARATUS AND METHODS FOR TRANSPORT OPTIMIZATION FOR WIDGET CONTENT DELIVERY

(75) Inventors: Giridhar D. Mandyam, San Diego, CA (US); Lalitha Suryanarayana, San Diego, CA (US); Christophe G. Bernard, San Diego, CA (US); Kevin E. Hunter, Del Mar, CA (US); Noam Raffaelli, Pinner (GB)

(73) Assignee: QUALCOMM Incorporated, San Diego, CA (US)

( * ) Notice: Subject to any disclaimer, the term of this patent is extended or adjusted under 35 U.S.C. 154(b) by 1672 days.

(21) Appl. No.: 12/407,583

(22) Filed: Mar. 19, 2009

(65) Prior Publication Data

US 2009/0271778 A1    Oct. 29, 2009

Related U.S. Application Data

(60) Provisional application No. 61/039,402, filed on Mar. 25, 2008.

(51) Int. Cl.
 G06F 15/16      (2006.01)
 G06Q 10/06     (2012.01)
 G06F 17/30     (2006.01)

(52) U.S. Cl.
 CPC ............... *G06Q 10/06* (2013.01); *G06F 17/30* (2013.01); *G06F 17/301* (2013.01);
 (Continued)

(58) Field of Classification Search
 CPC . G06F 17/30; G06F 17/301; G06F 17/30103; G06F 17/30106; G06F 17/30112; G06F 17/30153; G06F 17/30861; G06F 17/30864; G06F 17/30867; G06F 17/30964; G06F 17/30967; G06F 17/30976; G06F 17/30997
 USPC ......... 709/203, 217, 218, 219, 229, 224, 226; 715/854; 707/721, 778; 386/46; 717/105
 See application file for complete search history.

(56) References Cited

U.S. PATENT DOCUMENTS 5,329,360 A    7/1994   Gillard et al.
5,333,063 A    7/1994   Yoo
(Continued)

FOREIGN PATENT DOCUMENTS

CN    1449219 A    10/2003
CN    1758794 A    4/2006
(Continued)

OTHER PUBLICATIONS

International Search Report and Written Opinion—PCT/US2009/037790, International Search Authority—European Patent Office—Nov. 20, 2009.

(Continued)

*Primary Examiner* — Le H Luu
(74) *Attorney, Agent, or Firm* — Shirin Tefagh; Joseph Agusta

(57) ABSTRACT

Apparatus and methods for transport optimization for widget content delivery includes obtaining updated content corresponding to a mobile widget having a plurality of informational hierarchical depths, and obtaining user navigation pattern historical data corresponding to the mobile widget, wherein the user navigation pattern historical data corresponds to the plurality of informational hierarchical depths. The aspects also include obtaining a first informational hierarchical depth range for inclusion in a first content update message for delivery to a device, wherein the first informational hierarchical depth range is based on the user navigation pattern historical data. Further, the aspects include generating a content update message with a first portion of the updated content corresponding to the first informational hierarchical depth range. Optionally, the aspects further include reducing a size of the first portion of the updated content in the first content update message, thereby defining a first compressed portion of the updated content.

55 Claims, 26 Drawing Sheets

(52) U.S. Cl.
CPC ... *G06F 17/30103* (2013.01); *G06F 17/30106* (2013.01); *G06F 17/30112* (2013.01); *G06F 17/30153* (2013.01); *G06F 17/30861* (2013.01); *G06F 17/30864* (2013.01); *G06F 17/30867* (2013.01); *G06F 17/30964* (2013.01); *G06F 17/30967* (2013.01); *G06F 17/30976* (2013.01); *G06F 17/30997* (2013.01)

(56) References Cited

U.S. PATENT DOCUMENTS

| | | | |
|---|---|---|---|
| 5,375,068 | A | 12/1994 | Palmer et al. |
| 5,386,568 | A | 1/1995 | Wold et al. |
| 5,563,649 | A | 10/1996 | Gould et al. |
| 5,617,467 | A | 4/1997 | Bacher et al. |
| 5,894,473 | A | 4/1999 | Dent |
| 5,936,616 | A | 8/1999 | Torborg, Jr. et al. |
| 6,049,330 | A | 4/2000 | Redford |
| 6,064,771 | A | 5/2000 | Migdal et al. |
| 6,125,283 | A | 9/2000 | Kolev et al. |
| 6,237,004 | B1 | 5/2001 | Dodson et al. |
| 6,324,651 | B2 | 11/2001 | Kubik et al. |
| 6,441,833 | B1 | 8/2002 | Anderson et al. |
| 6,608,841 | B1 | 8/2003 | Koodli |
| 6,728,208 | B1 | 4/2004 | Puuskari |
| 6,925,609 | B1 | 8/2005 | Lucke |
| 6,996,393 | B2 | 2/2006 | Pyhalammi et al. |
| 7,054,954 | B2 | 5/2006 | Kalliokulju |
| 7,200,390 | B1 | 4/2007 | Henager et al. |
| 7,227,900 | B2 | 6/2007 | Porter et al. |
| 7,304,585 | B2 | 12/2007 | Suomela et al. |
| 7,379,731 | B2 | 5/2008 | Natsuno et al. |
| 7,499,878 | B2 | 3/2009 | Janakiraman et al. |
| 7,523,331 | B2 | 4/2009 | Van Der Heijden |
| 7,587,486 | B2 | 9/2009 | Taniguchi |
| 7,596,389 | B2 | 9/2009 | Tsuda et al. |
| 7,660,871 | B2 | 2/2010 | Koh et al. |
| 7,672,690 | B2 | 3/2010 | Hsu et al. |
| 7,711,806 | B1 | 5/2010 | Roka et al. |
| 7,734,285 | B2 | 6/2010 | Chmaytelli et al. |
| 7,831,670 | B2 | 11/2010 | Goodman et al. |
| 7,873,908 | B1 | 1/2011 | Varanasi et al. |
| 7,886,229 | B2 | 2/2011 | Pachet |
| 7,890,572 | B2 | 2/2011 | Goodman et al. |
| 7,917,858 | B2 | 3/2011 | Pereira et al. |
| 7,948,817 | B2 | 5/2011 | Coteus et al. |
| 7,957,691 | B1 | 6/2011 | Lee |
| 7,983,711 | B2 | 7/2011 | Juneja et al. |
| 8,010,095 | B2 | 8/2011 | Natsuno et al. |
| 8,086,225 | B2 | 12/2011 | Lee |
| 8,131,271 | B2 | 3/2012 | Ramer et al. |
| 8,131,875 | B1 | 3/2012 | Chen et al. |
| 8,195,133 | B2 | 6/2012 | Ramer et al. |
| 9,069,575 | B2 | 6/2015 | Mandyam et al. |
| 2002/0107947 | A1 | 8/2002 | Moragne et al. |
| 2002/0152268 | A1 | 10/2002 | Kureshy et al. |
| 2003/0061122 | A1 | 3/2003 | Berkowitz et al. |
| 2003/0120599 | A1* | 6/2003 | Agboatwalla et al. .......... 705/50 |
| 2003/0191859 | A1 | 10/2003 | Ramsey |
| 2004/0044999 | A1 | 3/2004 | Gibson |
| 2004/0098421 | A1 | 5/2004 | Peng |
| 2004/0119754 | A1 | 6/2004 | Bangalore et al. |
| 2004/0153992 | A1* | 8/2004 | Molina-Moreno et al. ... 717/105 |
| 2004/0190853 | A1* | 9/2004 | Dow et al. ..................... 386/46 |
| 2005/0039136 | A1 | 2/2005 | Othmer |
| 2005/0049989 | A1 | 3/2005 | Kaminsky et al. |
| 2005/0086105 | A1 | 4/2005 | McFadden et al. |
| 2005/0091576 | A1 | 4/2005 | Relyea et al. |
| 2005/0125787 | A1 | 6/2005 | Tertitski et al. |
| 2005/0278443 | A1 | 12/2005 | Winner et al. |
| 2006/0010394 | A1 | 1/2006 | Chaudhri et al. |
| 2006/0015818 | A1 | 1/2006 | Chaudhri et al. |
| 2006/0173838 | A1* | 8/2006 | Garg et al. ..................... 707/721 |
| 2006/0224716 | A1 | 10/2006 | Nakazawa et al. |
| 2006/0235766 | A1 | 10/2006 | Mifune et al. |
| 2006/0242249 | A1 | 10/2006 | Swanson et al. |
| 2006/0242279 | A1 | 10/2006 | Chen et al. |
| 2006/0271618 | A1 | 11/2006 | Kokubo et al. |
| 2006/0277469 | A1 | 12/2006 | Chaudhri et al. |
| 2007/0038934 | A1 | 2/2007 | Fellman |
| 2007/0078953 | A1 | 4/2007 | Chai et al. |
| 2007/0101291 | A1 | 5/2007 | Forstall et al. |
| 2007/0101297 | A1 | 5/2007 | Forstall et al. |
| 2007/0106627 | A1 | 5/2007 | Srivastava et al. |
| 2007/0118813 | A1 | 5/2007 | Forstall et al. |
| 2007/0124688 | A1 | 5/2007 | Nauerz et al. |
| 2007/0124701 | A1* | 5/2007 | Gong et al. ..................... 715/854 |
| 2007/0130541 | A1 | 6/2007 | Louch et al. |
| 2007/0130589 | A1 | 6/2007 | Davis et al. |
| 2007/0192763 | A1 | 8/2007 | Helvick |
| 2007/0198698 | A1 | 8/2007 | Boyd et al. |
| 2007/0244750 | A1 | 10/2007 | Grannan et al. |
| 2007/0245269 | A1 | 10/2007 | Kim et al. |
| 2007/0250643 | A1 | 10/2007 | Pyhalammi et al. |
| 2007/0266093 | A1 | 11/2007 | Forstall et al. |
| 2007/0277109 | A1 | 11/2007 | Chen et al. |
| 2007/0300185 | A1 | 12/2007 | Macbeth et al. |
| 2007/0300265 | A1 | 12/2007 | Karkkainen |
| 2008/0010133 | A1 | 1/2008 | Pyhalammi et al. |
| 2008/0034309 | A1 | 2/2008 | Louch et al. |
| 2008/0034314 | A1 | 2/2008 | Louch et al. |
| 2008/0040681 | A1 | 2/2008 | Synstelien et al. |
| 2008/0052348 | A1 | 2/2008 | Adler et al. |
| 2008/0052372 | A1 | 2/2008 | Weber et al. |
| 2008/0098420 | A1 | 4/2008 | Khiversa et al. |
| 2008/0113656 | A1 | 5/2008 | Lee et al. |
| 2008/0126476 | A1* | 5/2008 | Nicholas et al. .............. 709/203 |
| 2008/0139189 | A1 | 6/2008 | Hyatt |
| 2008/0160956 | A1 | 7/2008 | Jackson et al. |
| 2008/0222658 | A1 | 9/2008 | Allen et al. |
| 2008/0235602 | A1 | 9/2008 | Strauss et al. |
| 2008/0242373 | A1 | 10/2008 | Lu et al. |
| 2008/0248815 | A1 | 10/2008 | Busch |
| 2008/0255962 | A1 | 10/2008 | Chang et al. |
| 2008/0307301 | A1 | 12/2008 | Decker et al. |
| 2009/0007186 | A1 | 1/2009 | Hartwell |
| 2009/0037509 | A1 | 2/2009 | Parekh et al. |
| 2009/0049097 | A1* | 2/2009 | Nocifera et al. .............. 707/778 |
| 2009/0070228 | A1 | 3/2009 | Ronen |
| 2009/0113346 | A1 | 4/2009 | Wickramasuriya et al. |
| 2009/0138477 | A1 | 5/2009 | Piira et al. |
| 2009/0171939 | A1 | 7/2009 | Athsani et al. |
| 2009/0172567 | A1 | 7/2009 | Brooks et al. |
| 2009/0235149 | A1 | 9/2009 | Frohwein |
| 2009/0248883 | A1 | 10/2009 | Suryanarayana et al. |
| 2009/0248996 | A1 | 10/2009 | Mandyam et al. |
| 2009/0249321 | A1 | 10/2009 | Mandyam et al. |
| 2009/0249359 | A1 | 10/2009 | Caunter et al. |
| 2010/0185938 | A1 | 7/2010 | Rising, III |
| 2010/0305999 | A1 | 12/2010 | Fujioka |
| 2011/0055434 | A1 | 3/2011 | Pyers et al. |
| 2011/0099487 | A1 | 4/2011 | Pyhalammi et al. |
| 2012/0265613 | A1 | 10/2012 | Ramer et al. |
| 2012/0330750 | A1 | 12/2012 | Ramer et al. |
| 2013/0046852 | A1 | 2/2013 | Saxena et al. |
| 2013/0053005 | A1 | 2/2013 | Ramer et al. |
| 2015/0248231 | A1 | 9/2015 | Mandyam et al. |

FOREIGN PATENT DOCUMENTS

| | | |
|---|---|---|
| CN | 1893418 A | 1/2007 |
| CN | 1963819 A | 5/2007 |
| CN | 101080095 A | 11/2007 |
| EP | 1217857 A2 | 6/2002 |
| EP | 1406174 A2 | 4/2004 |
| EP | 1536327 A2 | 6/2005 |
| GB | 2443991 | 5/2008 |
| JP | 5020016 A | 1/1993 |
| JP | 10116170 A | 5/1998 |
| JP | 11075257 A | 3/1999 |
| JP | 2000507365 A | 6/2000 |
| JP | 2000276332 A | 10/2000 |
| JP | 2002140213 A | 5/2002 |
| JP | 2002345050 A | 11/2002 |

(56) References Cited

FOREIGN PATENT DOCUMENTS

| | | |
|---|---|---|
| JP | 2002373272 A | 12/2002 |
| JP | 2003016286 A | 1/2003 |
| JP | 2003283494 A | 10/2003 |
| JP | 2003330849 A | 11/2003 |
| JP | 2003345716 A | 12/2003 |
| JP | 2004500661 A | 1/2004 |
| JP | 2004326039 A | 11/2004 |
| JP | 2005011218 | 1/2005 |
| JP | 2005228228 A | 8/2005 |
| JP | 2006127382 A | 5/2006 |
| JP | 2006139443 A | 6/2006 |
| JP | 2006146600 A | 6/2006 |
| JP | 2006227855 A | 8/2006 |
| JP | 2006260418 A | 9/2006 |
| JP | 2006285936 A | 10/2006 |
| JP | 2006302144 A | 11/2006 |
| JP | 2006345214 A | 12/2006 |
| JP | 2007026094 A | 2/2007 |
| JP | 2007133871 A | 5/2007 |
| JP | 2007293849 A | 11/2007 |
| JP | 2008501173 A | 1/2008 |
| JP | 2008504610 A | 2/2008 |
| JP | 2008065695 A | 3/2008 |
| JP | 2008527563 A | 7/2008 |
| JP | 2010503052 A | 1/2010 |
| JP | 2010503127 A | 1/2010 |
| KR | 20060107950 A | 10/2006 |
| KR | 100861656 B1 | 10/2008 |
| KR | 20080109473 A | 12/2008 |
| RU | 2254611 | 6/2005 |
| RU | 2371758 C2 | 10/2009 |
| WO | WO9735296 A1 | 9/1997 |
| WO | WO9966394 A1 | 12/1999 |
| WO | WO0143017 | 6/2001 |
| WO | WO-0167785 A2 | 9/2001 |
| WO | WO-02082265 A2 | 10/2002 |
| WO | WO2004008781 | 1/2004 |
| WO | WO2004061615 | 7/2004 |
| WO | 2005025252 A2 | 3/2005 |
| WO | WO-2006012343 A2 | 2/2006 |
| WO | 2006040506 A1 | 4/2006 |
| WO | WO2006037786 A2 | 4/2006 |
| WO | WO2006075334 A2 | 7/2006 |
| WO | 2006089880 A1 | 8/2006 |
| WO | WO2006117107 | 11/2006 |
| WO | 2006135844 A2 | 12/2006 |
| WO | 2007073404 A1 | 6/2007 |
| WO | 2008010872 A1 | 1/2008 |
| WO | WO2008025017 A2 | 2/2008 |
| WO | 2008030780 A1 | 3/2008 |
| WO | WO2008030875 A2 | 3/2008 |
| WO | WO-2008030976 A2 | 3/2008 |

OTHER PUBLICATIONS

SHOCKWIDGETS.COM: "ministat2 1.91b" MACUPDATE, [Online] Nov. 10, 2007, XP002536607 online Retrieved from the Internet: URL:http://www.macupdate.com/info.php/id/19368> [retrieved on Jul. 9, 2009] the whole document.

"Web widget", Wikipedia.org, http://en.wikipedi.org/wiki/Web_widget, Dec. 18, 2008.

Inoue T., "RIA"—Three-Sided Offence and Deffence, I/O, Japan, vol. 33, No. 2, Kohgakusha Co., Ltd., Feb. 1, 2008, vol. 33, pp. 65-68. 1:81.

Live GPS Tracking: "FreeMacWare", Internet Archive, Oct. 5, 2007, 5 pages, Retrieved from the internet < URL: https://web.archive.org/web/20071005201319/http://www.freemacware.com/live-gps-tracking/>.

RSS Reader: "Dashboard Widget", Internet Archive, 22 Aug. 2007, 2 pages, Retrieved from the internet < URL: https://web.archive.org/web/20070822225108/http://www.apple.com/p/downloads/dashboard/news/rssreader.html >.

Widgets 1.0 Requirements: "W3C Working Draft 9", Feb. 2007, 21 pages, Retrieved from the internet < URL: http://www.w3.org/TR/2007/WD-widgets-reqs-20070209/ >.

Bott E., et al., "Microsoft Windows Vista Official Manual, First Volume," Nikkei Business Publications, Inc., Sep. 3, 2007, 1st edition, pp. 104-106.

Mizuno T., "All about Google," Sotechsha Co., Ltd., Nov. 20, 2007, 1st edition, p. 322.

Suzaki S., et al., "Automatic Estimation Method of Use Interest Based on WWW Access Logs," Proceedings of Multimedia, Distributed, Cooperative and Mobile (DICOMO) Symposium, the Information Processing Society of Japan, Jul. 2, 1997, vol. 97, No. 2, pp. 251-256.

* cited by examiner

APPARATUS AND METHODS FOR TRANSPORT OPTIMIZATION FOR WIDGET CONTENT DELIVERY

CLAIM OF PRIORITY UNDER 35 U.S.C. §119

The present Application for patent claims priority to Provisional Application No. 61/039,402 entitled "APPARATUS AND METHODS OF MANAGING WIDGETS IN A WIRELESS COMMUNICATION ENVIRONMENT" filed Mar. 25, 2008, and hereby expressly incorporated by reference herein.

REFERENCE TO CO-PENDING APPLICATIONS FOR PATENT

The present Application for patent is related to the following co-pending U.S. Patent Applications:

"APPARATUS AND METHODS FOR WIDGET UPDATE SCHEDULING" having Ser. No. 12/407,574, filed concurrently herewith, and expressly incorporated by reference herein.

"APPARATUS AND METHODS FOR WIDGET-RELATED MEMORY MANAGEMENT" having Ser. No. 12/407,567, filed concurrently herewith, and expressly incorporated by reference herein;

"APPARATUS AND METHODS FOR MANAGING WIDGETS IN A WIRELESS COMMUNICATION ENVIRONMENT" having Ser. No. 12/407,559, filed concurrently herewith, and expressly incorporated by reference herein; and "APPARATUS AND METHODS FOR WIDGET INTERCOMMUNICATION IN A WIRELESS COMMUNICATION ENVIRONMENT" having Ser. No. 12/407,593, filed concurrently herewith, and expressly incorporated by reference herein.

BACKGROUND

The described aspects relate to widgets, and more specifically to apparatus and methods relating to transport optimization for widget content delivery in a wireless communication environment.

Wireless networking systems have become a prevalent way to communicate with others worldwide. Wireless communication devices, such as a mobile or cellular telephone, a personal digital assistant (PDA), etc., operate on such networks, and have become smaller and more powerful in order to meet consumer needs and to improve portability and convenience. Consumers have become dependent upon these devices, demanding reliable service, expanded areas of coverage, additional services such as web browsing capabilities, and continued reduction in the size and cost of such devices.

Many of the functionalities and end user experiences of wireless communication devices have been developed, with limited success, to mimic the functionalities and end user experiences of a personal computing (PC) environment. For example, mobile web services have seen varying levels of success, even with the deployment of relatively high speed and high capacity services, such as advanced 3G services (1X-EV-DO Rev. A, UMTS HSPA). Much of the problem lies in the fact that the mobile web browsing experience is distinct from the PC experience with which most users are familiar. In particular, many end users find mobile web browsing applications to be hard to use, for example, with regard to entering search information, and difficult to enjoy, for example, as the resulting presentation of content is unpleasant.

Further, web content delivery for desktop widgets is normally accomplished under the assumption that sufficient access layer throughput is available. In contrast, cellular access to such content often results in varying, and occasionally insufficient, throughput for delivery of content.

Therefore, apparatus and methods are desired to improve the experience of an end user in interacting with web services on a wireless communication device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for updating content for a mobile widget. The method may include obtaining updated content corresponding to a mobile widget having a plurality of informational hierarchical depths. The method may also include obtaining user navigation pattern historical data corresponding to the mobile widget, wherein the user navigation pattern historical data corresponds to the plurality of informational hierarchical depths. Also, the method may include obtaining a first informational hierarchical depth range for inclusion in a first content update message, wherein the first informational hierarchical depth range is based on the user navigation pattern historical data. Additionally, the method may include generating the first content update message with a first portion of the updated content corresponding to the first informational hierarchical depth range.

Another aspect relates to at least one processor configured to update content for a mobile widget. The processor may include a first module for obtaining updated content corresponding to a mobile widget having a plurality of informational hierarchical depths. Further, the processor may include a second module for obtaining user navigation pattern historical data corresponding to the mobile widget, wherein the user navigation pattern historical data corresponds to the plurality of informational hierarchical depths. Also, the processor may include a third module for obtaining a first informational hierarchical depth range for inclusion in a first content update message, wherein the first informational hierarchical depth range is based on the user navigation pattern historical data. Additionally, the processor may include a fourth module for generating the first content update message with a first portion of the updated content corresponding to the first informational hierarchical depth range.

Yet another aspect relates to a computer program product for updating content for a mobile widget including a computer-readable medium. The computer-readable medium may include at least one instruction for causing a computer to obtain updated content corresponding to a mobile widget having a plurality of informational hierarchical depths. Moreover, the computer-readable medium may include at least one instruction for causing the computer to obtain user navigation pattern historical data corresponding to the mobile widget, wherein the user navigation pattern historical data corresponds to the plurality of informational hierarchical depths. Also, the computer-readable medium may include at least one instruction for causing the computer to obtain a first informational hierarchical depth range for inclusion in a first content update message, wherein the first informational hierarchical depth range is based on the user navigation pattern historical data. Additionally, the computer-readable medium may include at least one instruction for causing the computer to generate the first content update message with a first portion of the updated content corresponding to the first informational hierarchical depth range.

Another aspect relates to a network device for updating content for a mobile widget. The network device may include means for obtaining updated content corresponding to a mobile widget having a plurality of informational hierarchical depths, wherein the updated content comprises a first size. In addition, the network device may include means for obtaining user navigation pattern historical data corresponding to the mobile widget, wherein the user navigation pattern historical data corresponds to the plurality of informational hierarchical depths. Also, the network device may include means for obtaining a first informational hierarchical depth range for inclusion in a first content update message, wherein the first informational hierarchical depth range is based on the user navigation pattern historical data. Additionally, the network device may include means for generating the first content update message with a first portion of the updated content corresponding to the first informational hierarchical depth range Still another aspect relates to a network device for updating content for a mobile widget. The network device may include a memory comprising a content update manager and a content package bundler. The network device may also include a processor in communication with the memory and operable to execute the content update manager and the content package bundler. The content update manager is operable to obtain updated content corresponding to a mobile widget having a plurality of informational hierarchical depths, wherein the updated content comprises a first size. The content update manager is further operable to obtain user navigation pattern historical data corresponding to the mobile widget. The user navigation pattern historical data corresponds to the plurality of informational hierarchical depths. Also, the content update package bundler is further operable to obtain a first informational hierarchical depth range for inclusion in a first content update message. The first informational hierarchical depth range is based on the user navigation pattern historical data. Additionally, the content update package bundler is further operable to generate the first content update message with a first portion of the updated content corresponding to the first informational hierarchical depth range Another aspect relates to a method for updating content for a mobile widget on a wireless communication device. The method may include storing a mobile widget on a wireless communication device, where the mobile widget comprises a plurality of informational hierarchical depths. In addition, the method may include tracking user navigation patterns corresponding to the mobile widget to define user navigation pattern historical data, wherein the user navigation pattern historical data corresponds to the plurality of informational hierarchical depths. Moreover, the method may include forwarding the user navigation pattern historical data to a network device associated with a content source. Further, the method may include wirelessly receiving a first portion of updated content in a first content update message from the network device The first portion of updated content corresponds to a first informational hierarchical depth range of the mobile widget based on the user navigation pattern historical data.

Yet another aspect relates to at least one processor operable to update content for a mobile widget on a wireless communication device. The processor may include a first module for storing a mobile widget on a wireless communication device. The mobile widget comprises a plurality of informational hierarchical depths. Additionally, the processor may include a second module for tracking user navigation patterns corresponding to the mobile widget to define user navigation pattern historical data. The user navigation pattern historical data corresponds to the plurality of informational hierarchical depths. Further, the processor may include a third module for forwarding the user navigation pattern historical data to a network device associated with a content source. The processor may also include a fourth module for wirelessly receiving a first portion of updated content in a first content update message from the content source. The first portion of updated content corresponds to a first informational hierarchical depth range of the mobile widget based on the user navigation pattern historical data.

Another aspect relates to a computer program product for updating content for a mobile widget on a wireless communication device including a computer readable medium. The computer-readable medium may include at least one instruction operable to cause a computer to store a mobile widget on a wireless communication device, where the mobile widget comprises a plurality of informational hierarchical depths. The computer-readable medium may also include at least one instruction operable to cause the computer to track user navigation patterns corresponding to the mobile widget to define user navigation pattern historical data. The user navigation pattern historical data corresponds to the plurality of informational hierarchical depths. Moreover, the computer-readable medium may include at least one instruction operable to cause the computer to forward the user navigation pattern historical data to a network device associated with a content source. Furthermore, the computer-readable medium may include at least one instruction operable to cause the computer to wirelessly receive a first portion of updated content in a first content update message from the content source. The first portion of updated content corresponds to a first informational hierarchical depth range of the mobile widget based on the user navigation pattern historical data.

Still another aspect relates to a wireless communication device. The wireless communication device may include means for storing a mobile widget on a wireless communication device, where the mobile widget comprises a plurality of informational hierarchical depths. In addition, the wireless communication device may include means for tracking user navigation patterns corresponding to the mobile widget to define user navigation pattern historical data. The user navigation pattern historical data corresponds to the plurality of informational hierarchical depths. Further, the wireless communication device may include means for forwarding the user navigation pattern historical data to a network device associated with a content source. Moreover, the wireless communication device may include means for wirelessly receiving a first portion of updated content in a first content update message from the content source. The first portion of updated content corresponds to a first informational hierarchical depth range of the mobile widget based on the user navigation pattern historical data.

Another aspect relates to a wireless device. The wireless device may include a memory comprising a mobile widget and a widget management client. The mobile widget comprises a plurality of informational hierarchical depths. The wireless device may also include a processor in communication with the memory and operable to execute the mobile widget and the widget management client. The widget management client is operable to track user navigation patterns corresponding to the mobile widget to define user navigation pattern historical data. The user navigation pattern historical data corresponds to the plurality of informational hierarchical depths. The widget management client is further operable to forward the user navigation pattern historical data to a network device associated with a content source. Furthermore, the wireless device may include a communication module operable to wirelessly receive a first portion of updated content in a first content update message from the content source. The first portion of updated content corresponds to a first informational hierarchical depth range of the mobile widget based on the user navigation pattern historical data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
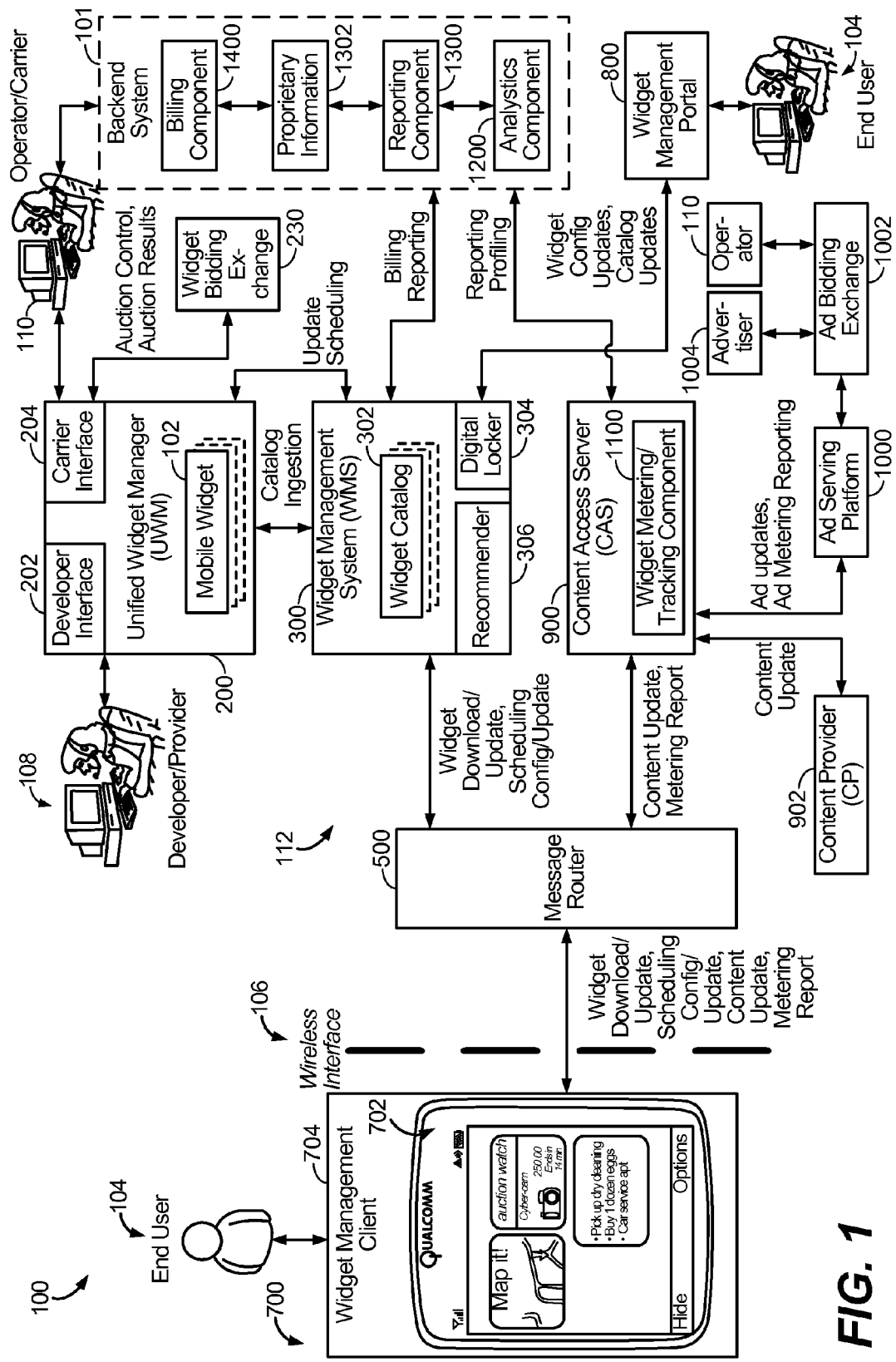
FIG. 1 is a is a schematic diagram of an aspect of an end-to-end mobile widget system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to widgets, and more specifically to apparatus and methods relating to the transport optimization for widget content delivery. For example, the described aspects may include transporting widget content based on a user's navigation pattern corresponding to the respective widget.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Terminology

To enhance the description of the present aspects, the following provides a list of some of the discussed terminology.

Mobile widget or widget: a user interface (UI) element with which a device end user interacts; in some aspects, a mobile widget may have a specific relationship with a respective content source. For example, a mobile widget or widget is a relatively small, specialized graphical user interface (GUI) application, which may include a combination of a graphical symbol and program code or a software module executable to provide visual information or easy access to a function, such as but not limited to a clock, a calendar, a news aggregator, weather information, etc.

Widget frame: a static user interface display area of a mobile widget.

Widget management client (WMC): a client application that instantiates and manages one or more mobile widgets.

Widget wall: an initial view in the WMC where a device end user can see all or some portion of mobile widgets, depending on the size of the view and the size of the respective mobile widgets, resident on the respective wireless communication device.

Widget operation modes: (i) compressed mode: an individual widget frame for display on a widget wall; and (ii) expanded mode: an individual widget frame for display when the mobile widget is selected, where the widget frame in the expanded mode may be sized larger than the respective widget frame in the compressed mode.

Mobile widget types: (i) updateable widget: a widget whose underlying widget package can be updated after instantiation at the client; (ii) locked widget: widget that cannot be modified, deleted or re-positioned by the user; it is updateable, but not at user discretion; (iii) dynamic widget mobile widget having: a compressed mode appearance on UI that can be manipulated by end user (as opposed to a locked widget); (iv) floating widget: a mobile widget having a compressed mode appearance that cannot be modified by the end user; (v) discovery widget: a mobile widget that presents widget management functionality to the end user, including widget selection and widget wall management.

Widget security: (i) trusted widget: a widget that has gone through an approval process; and (ii) untrusted widget: a widget that has not gone through any approval; could be user defined, public domain, or from a developer.

Standalone ad widget: an optional form of a locked widget displayed on the widget wall; may have content relevant to the end user based on, among other things, other widget selections made by the WMC.

Widget management system (WMS): an infrastructure element for managing widget subscriptions and downloads.

Widget management portal (WMP): in one aspect, an end user-facing web tool for end users to manage widgets.

Content access server (CAS): an infrastructure element operable to handle routing of metering information related to mobile widget activity or end user interactivity with mobile widgets from one or more wireless communication devices; further operable to manage providing content updates to mobile widgets, and to retrieve/cache corresponding content updates from one or more content providers.

Widget wizard: a client management engine for mobile widgets.

Unified widget manager (UWM): an infrastructure element that operates as a clearinghouse for mobile widgets.

Message router: a network element through which all communication between the widget system infrastructure elements and the WMC is routed.

Schedule record: a data record that provides update schedules for widget content updates and a timetable for periodic retrieval of digital locker contents, where the digital locker may be a WMS component that includes mobile widget information and configuration for end users; for example, the schedule record may be sent from the WMS digital locker to the WMC.

Catalog record: a data record sent from the WMS digital locker to the WMC and WMP that provides a widget catalog listing mobile widgets, e.g. catalog items, available to the end user; the catalog record may be customized for an end user.

Overview

The described aspects relate to widgets, and more specifically to apparatus and methods relating to an end-to-end system for the creation, storage, delivery, and management of user-defined mobile widgets and widget-related content in a wireless communication environment. The described aspects provide apparatus and methods that enable end users to customize mobile widgets. Further, the described aspects provide apparatus and methods that are operable to operate efficiently in a wireless network environment having constraints with regard to network connectivity, communications bandwidth or throughput, and wireless device memory and processing usage.

As such, the described aspects particularly relate to "mobile" widgets optimized for a wireless network environment. To understand mobile widgets, one should also understand their counterpart—desktop widgets. Desktop widgets are essentially compact, client applications that provide specific functionality to the end user via a specialized user interface. It should be understood, however, that mobile widgets are not a straightforward extension of desktop widgets, particularly in several respects: (a) Desktop widgets are simple to write, and leverage existing web programming technologies (particularly JavaScript and XML). In some aspects, mobile widgets may include compact protocols and utilize limited interpreters (e.g. JavaScript, etc.) due to limitations in device memory and processing power; (b) Desktop widgets generally function with an expectation of consistent connectivity. Such consistent connectivity is not necessarily feasible in the wireless network environment due to inconsistent available throughput, limited cellular capacity, and specific wireless data plans; (c) Functionality utilized by desktop widgets specified in standard Javascript (e.g. ECMAScript versions, etc.) does not interface with wireless device-specific API's that can be extended to the mobile widget developer. Examples of such API's include the handset power meter, location information, and wireless connectivity status, etc.; (d) In some aspects, mobile widget accessibility may be provided in several forms, while, in general, desktop widgets are accessible directly on the PC desktop. In some aspects, mobile widgets are accessible via the wireless device application manager, while in other aspects mobile widgets may be accessible via a specific mobile widget management application or via a network portal; and (e) Mobile widget discovery and instantiation may be controlled by a wireless device application manager, or by a mobile widget management application, or by a network portal. In contrast, desktop widget discovery and instantiation is not restricted to one client or one portal. Therefore, the described aspects take these considerations into account to provide a mobile widget service optimized for the wireless network environment.

In particular, the described mobile widgets provide an alternative to the mobile browser to access content on a wireless device, and also allow individual users to easily create custom mobile widgets for arbitrary wireless device or web resources.

Thus, the described aspects offer a true replacement to receiving content via a mobile browser, addressing the above-noted challenges by developing a system with the constraints of wireless access, wireless device capabilities, and web development in mind.

End-to-End System Architecture

Figure 2:
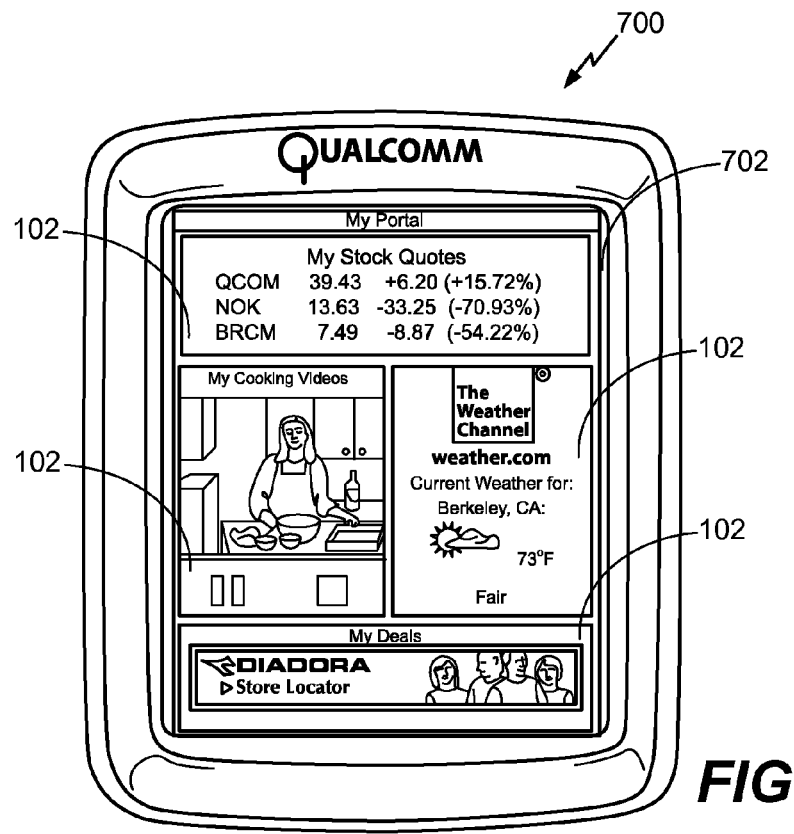
FIG. 2 is a schematic representation of an aspect of a wireless device having a display with a number of mobile widgets in a first state.
Figure 3:
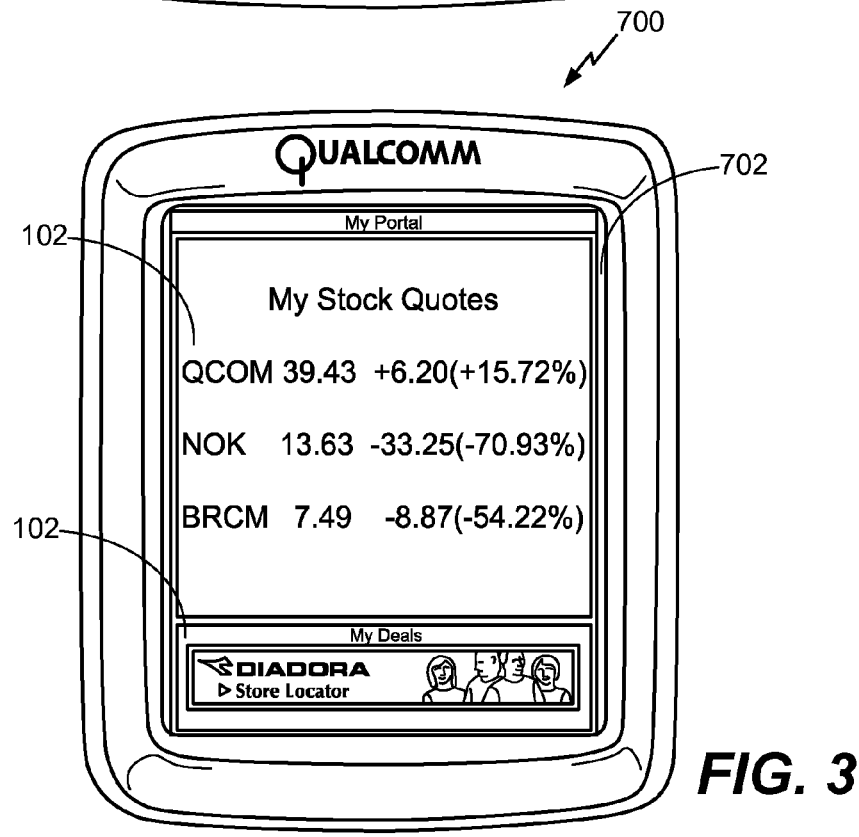
FIG. 3 is a schematic representation of an aspect of the wireless device of FIG. 2 with one of the mobile widgets in a second state.

Referring to FIGS. 1-3, in one non-limiting aspect, a mobile widget system 100 provides an end-to-end architecture for the creation, storage, delivery, operation, and management of mobile widgets in a wireless network environment.

A mobile widget 102 includes a compact application or set of codes executable by a wireless communication device 700 to interact with a content source, such as a content access server (CAS) 900, to retrieve content for presentation to a device end user 104 via a user interface 702, such as a display, on the device. In one non-limiting aspect, for example, mobile widget 102 may be a Really Simple Syndication (RSS) reader operable to retrieve a data feed from a news source and display the corresponding news item or headline(s) to allow end user 104 to view the latest news.

It should be noted, however, that mobile widget 102 is not limited to the prior example, and may have any functionality and may include any type of content. For example, mobile widget 102 may present any content generated by a content provider 902, including text, graphics, audio, video and multimedia content, etc. Further, for example, content presentable by mobile widget 102 may include an advertisement, such as from an advertisement serving platform 1000, where the advertisement may be mixed with other content or may be the sole content. Advertisement serving platform 1000 may be a specialized version of content provider 902, supplying system 100 with advertising content, managing the placement of advertisements in system 100, and tracking feedback relating to the usage of advertisements on wireless communication devices 700. Additionally, advertisement serving platform 1000 may be operable to interface with an advertisement virtual negotiation component 1002, such as an advertisement bidding exchange, which provides advertisers 1004 and an operator 110 of system 100 with a virtual marketplace to enable the placement and management of advertising content within system 100.

Further, in system 100, wireless communication device 700 provides a platform for the storage, operation, and management of mobile widget 102 for end user 104. For example, wireless communication device 700 may include a widget management client (WMC) 704 that is executable to obtain one or more mobile widgets 102, such as from a widget management system 300. Additionally, WMC 704 may be executable to supervise mobile widget operation, and to track mobile widget activities on wireless communication device 700 and report such activities to a widget tracking component 1100.

Widget management system (WMS) 300 is operable to communicate with WMC 704, for example via a wireless interface 106 and a message router component 500, and includes one or more catalogs 302 of one or more widgets 102 available for purchase and/or download to wireless communication device 700. WMS 300 may include a digital locker 304 operable to store records of each widget 102 downloaded to each device 700, as well as the corresponding configuration of each widget 102 on each device 700. A widget configuration may include settings relating to an appearance of widget 102, as well as an operation of widget 102, including one or more content update settings. In conjunction with providing access to widget catalogs 302 and widgets 102, WMS 300 optionally may include a widget recommender 306 to provide end user 104 with advice, suggestions, or recommendations of mobile widgets 102 that may be of benefit or of interest to end user 104.

As noted, message router component 500 is operable to interface between WMC 704 and the widget-supplying and content-supplying components of system 100. In particular, message router component 500 provides the interface with WMS 300 and CAS 900 to exchange messages relating to downloading mobile widget 102, configuring mobile widget 102, updating mobile widget content, scheduling of content updates, and reporting of data tracking the activity of or end user interaction with mobile widget 102. As such, in some aspects, message router component 500 defines a network element that manages and controls all communications with WMC 704.

Further, in some aspects, system 100 may include a widget management portal 800 that allows end user 104 to access WMS 300 to inquire about available mobile widgets 102 and widget catalogs 302. Further, widget management portal 800 allows end user 104 to configure the functionality and appearance of mobile widget 102 on wireless communication device 700. As such, widget management portal 800 provides end user 104 with alternative interface for mobile widget management.

In system 100, WMS 300 may obtain mobile widget 102 and widget catalog 302 from a unified widget manager (UWM) 200. UWM 200 provides a controlled point-of-entry into system 100 for mobile widget 102. In particular, UWM 200 may be operable to insure that each mobile widget 102 meets one or more predetermined architectural and/or operational widget standards for functioning within system 100. Additionally, UWM 200 provides a common, virtual marketplace that enables one or more mobile widget developers/providers 108 to introduce their respective mobile widget 102 to an operator 110, such as a wireless network carrier, of system 100. For example, widget developers/providers 108 may submit one or more mobile widgets 102 to UWM 200 via a developer interface 202, and operator/carrier 110 may access and review mobile widgets 102 at UWM 200 via an operator interface 204, where developer and operator interfaces 202 and 204 may be a network-accessible interface such as an extranet. Further, for example, via UWM 200, one or more developers/providers 108 and one or more operators/carriers 110 may access a widget virtual negotiation component 206, such as a widget bidding exchange, where an agreement may be reached regarding one or more of mobile widget pricing, mobile widget operation, mobile widget content updating, mobile widget placement in widget catalogs, mobile widget billing, developer/provider compensation, or operator/carrier mobile widget cost in system 100.

Additionally, in some aspects, system 100 may have a backend system 101 for analyzing the tracked data and transactions within system 100. In particular, backend system 101 may include an analytics component 1200 that receives and examines the data of system 100, and a reporting component 1300 that generates reports, including operator/carrier proprietary information 1302, based on the results of the analysis of analytics component 1200. Further, backend system 101 may include a billing component 1400 that accounts for transactions in system 100 and debits and/or credits one or more end users 104, developers/providers 108, operators/carriers 110, or advertisers 908. For example, end user 104 may purchase and download mobile widget 102 to a respective wireless communication device 700. This purchase transaction may be recorded by WMS 300 and reported to analytics component 1200, which extracts relevant information for use by reporting component 1300 and/or billing component 1400 to generate, respectively, an accounting of the transaction and a bill or invoice corresponding to the transaction. The accounting and the billing may represent, for example, one or more of a purchase price/account receivable to be debited to an end user account, an operator/carrier account payable to be credited to an operator/carrier account, a developer/provider account payable to be credited to a developer/provider account, or an advertiser account receivable to be debited to an advertiser account.

It should be noted that the components within and functionalities provided by system 100 may be configured in any manner. For example, the various functionalities of any single system component alternately may be performed by individual system components. As such, it should be noted that the aspects of system 100 may be rearranged in any of a variety of manners, and yet still achieve the stated functionality.

Further, it should be noted that the infrastructure components, e.g. the components to the right of wireless interface 106 in FIG. 1, may be communicatively coupled by one or any combination of wired or wireless links, referred to as infrastructure communication network 112. As such, infrastructure communication network 112 may be a wired network, a wireless network, or a combination wired/wireless network, for example including LANs, WANs, PSTNs, the Internet, circuit-switched and/or packet-switched networks.

Thus, system 100 provides one aspect of an end-to-end system for managing mobile widgets in a wireless network environment. Further details of the various system components and their aspects will now be discussed.

Infrastructure Element/Network Device

In system 100, the network-side or infrastructure elements may include one or more of any type of computer device, such as a network device, operable to perform the functionality described herein. In particular, the network-side or infrastructure elements that may include network device include, but are not limited to, one or any combination of the following system components: end user 104, developer/provider 108, operator/carrier 110, unified widget manager (UWM) 200, widget bidding exchange 230, widget management system (WMS) 300, digital locker 304, recommender 306, message router 500, content access server (CAS) 900, content provider 902, advertisement serving platform 1000, advertisement bidding exchange 1002, advertiser 1004, widget tracking component 1100, analytics component 1200, reporting component 1300, billing component 1400 and, generally, backend system 101.

Figure 4:
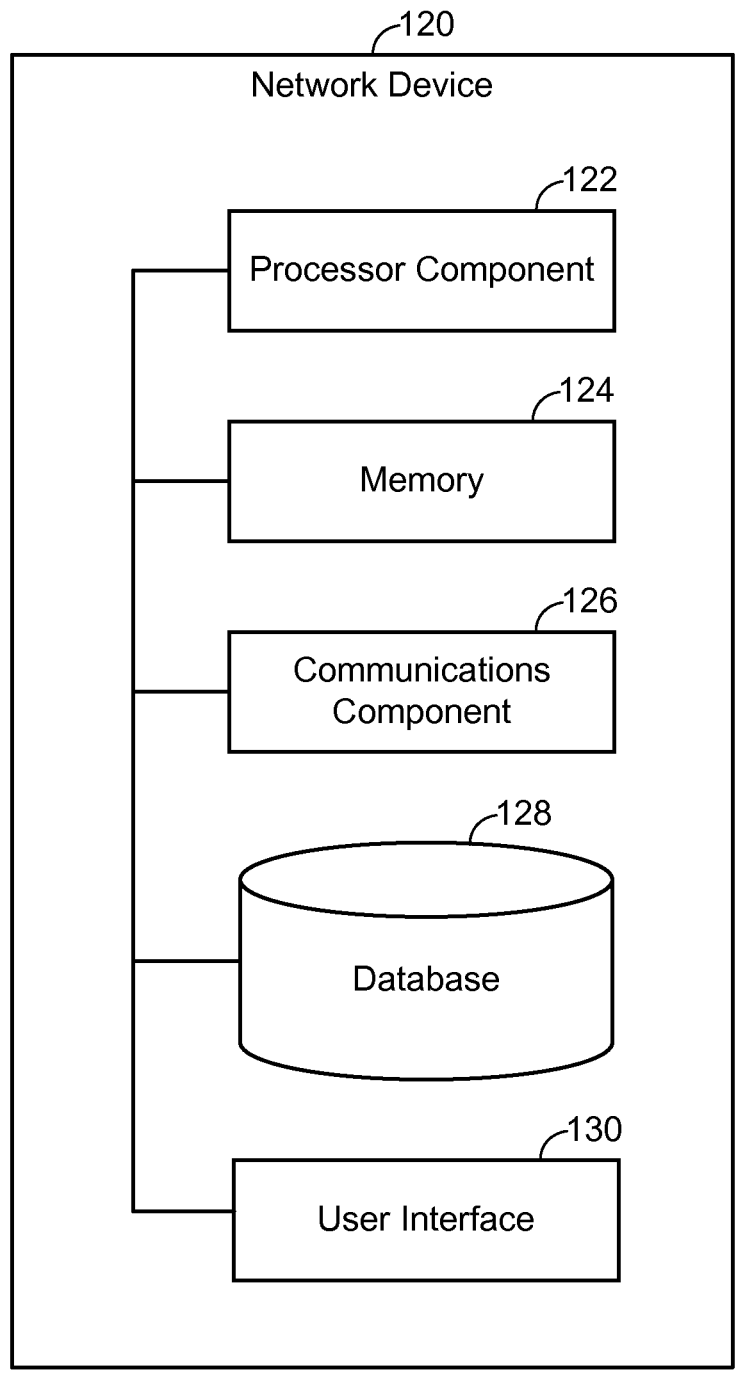
FIG. 4 is a schematic diagram of an aspect of a network device of the system of FIG. 1.

Referring to FIG. 4, in one aspect, such a computer device or network device may be represented by network device 120, which is operable to communicate with any other network-side or infrastructure elements of system 100 and/or with wireless communication device 700 (FIG. 1) and/or WMC 704 (FIG. 1). Network device 120 includes any type of network-based communication device, such as a network server operable on a communication network that links the components of system 100 (FIG. 1). For example, the communication network underlying system 100 (FIG. 1) may be a wired or wireless communication system, or a combination of both, and includes wireless interface 106, such as a wireless access network of operator/carrier 110 (FIG. 1) on which wireless communication device 700 operates.

Network device 120 includes a processor component 122 for carrying out processing functions associated with one or more of components and functions described herein. Processor component 122 can include a single processor, or multiple set of processors or multi-core processors. Moreover, processor component 122 can be implemented as an integrated processing system and/or a distributed processing system. In particular, processor component 122 is operable to execute a software program or application from memory in order to receive and process inputs and generate outputs corresponding to the functionality of the respective infrastructure element as described herein.

Network device 120 further includes a memory 124, such as for storing local versions of software programs or applications, including scripts, codes, algorithms, heuristics, neural networks, rules, fuzzy logic, and executable instructions, being executed by processor component 122. Memory 124 can include one or more types of random access memory (RAM), read only memory (ROM), and a combination thereof.

Further, network device 120 includes a communications component 126 that provides for establishing and maintaining communications with one or more other components utilizing hardware, software, and services as described herein. Communications component 126 may carry communications between components on network device 120, as well as between network device 120 and external devices, such as wireless communication device 700 (FIG. 1), other network-side or infrastructure elements, or other devices serially or locally connected to network device 120. Communications component 120 includes a receiver to receive communications and a transmitter to transmit communications. Further, communications component 120 includes the corresponding receive chain components and transmit chain components to enable exchanging messages according to one or more respective protocols.

Additionally, network device 120 may further include database 128, which can be any suitable combination of hardware and/or software, that provides for mass storage of data/information, data relationships, and software programs/applications employed in connection with aspects described herein.

Network device 120 may additionally include a user interface component 130 operable to receive inputs from a user of network device 120, and to generate outputs for presentation to the user. User interface component 130 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 130 may include one or more output devices, including but not limited to a display, a speaker, a haptic feedback mechanism, a printer, any other mechanism capable of presenting an output to a user, or any combination thereof.

Thus, network device 120 includes hardware, or software, or combinations of hardware and software, operable to enable performing the functionality of one or more of the network-side or infrastructure elements of system 100 (FIG. 1).

Unified Widget Manager

Figure 5:
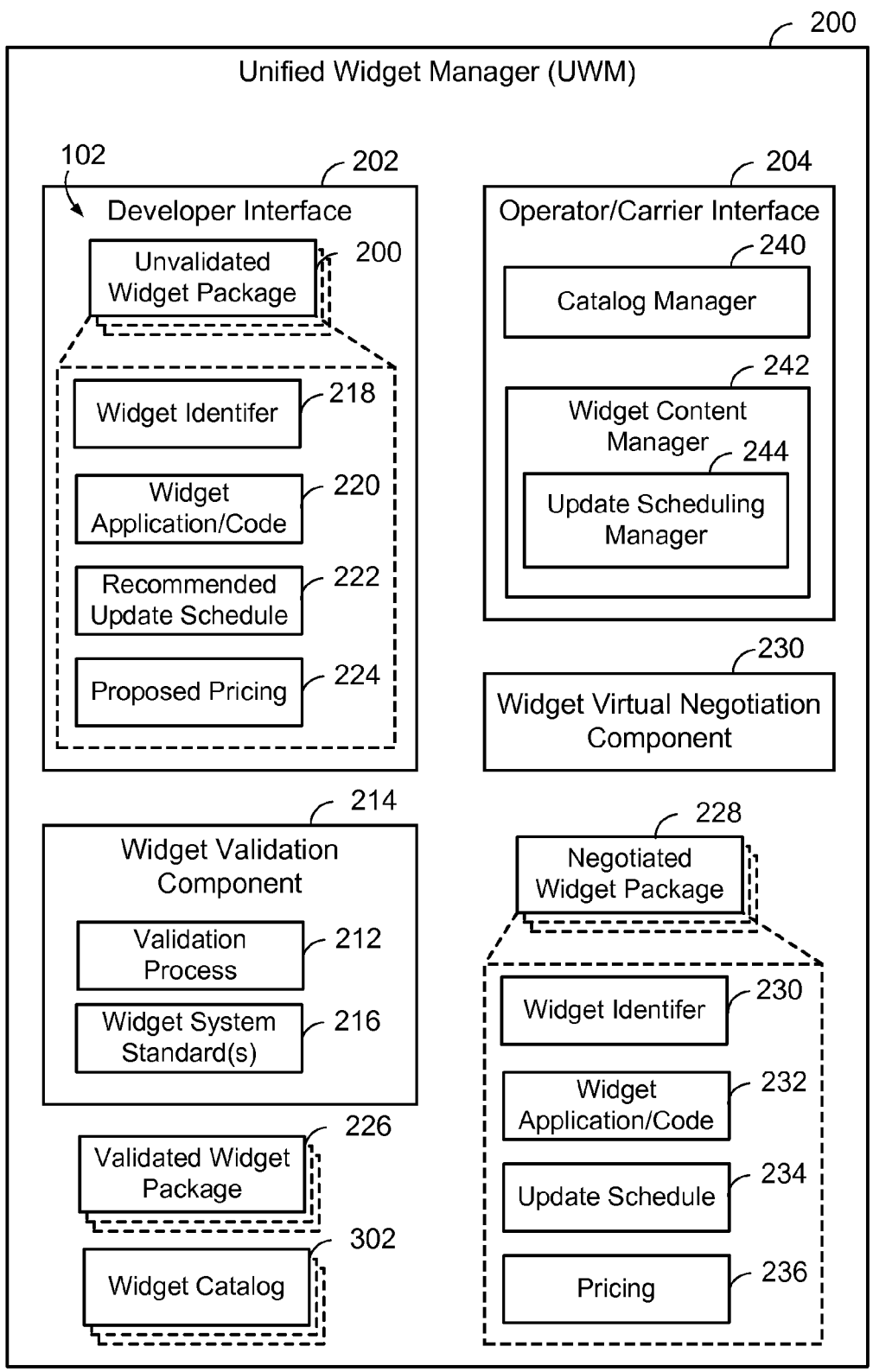
FIG. 5 is a schematic diagram of an aspect of the unified widget manager (UWM) of FIG. 1.

Referring to FIGS. 1 and 5, as discussed above, UWM 200 provides a clearinghouse for mobile widgets 102, which may be presented to system 100 by developer/provider 108 via developer interface 202 and which may be managed by operator/carrier 110 via operator/carrier interface 204.

Developer interface 202 provides an access point, such as an extranet, for developers/providers 108 to submit mobile widgets 102 to system 100. In some aspects, submitted mobile widgets 102 may be subject to a validation process 210 executable by a widget validation component 212, resulting in a respective submitted widget 102 being either a trusted widget or an untrusted widget or alternately being denied entry into system 100. Validation process 210 may be an automated process, a manual process, or a combination of both, that determines if submitted mobile widget 102 conforms to one or more widget system standards 216 and performs on system 100 as designed by developer/provider 108. If the submitted mobile widget 102 passes validation process 210, then the respective mobile widget 102 will be classified as a trusted widget. In some aspects, trusted mobile widgets may have a trust indicator, such as a digital certificate corresponding to UWM 200 or widget validation component 212 to indicate trustworthiness. If the submitted mobile widget 102 either fails validation process 210 or enters system 100 in another manner, such as via the public domain or from being directly defined by a user, then the respective mobile widget 102 may by considered an untrusted widget.

In some aspect, developer/provider 108 may submit mobile widget 102 to system 100 in the form of an unvalidated widget package 216, which represents a type of untrusted widget. Unvalidated widget package 216 may include the relevant components that define the respective widget, including its operation on system 100 and its pricing. For example, in one aspect, unvalidated widget package 216 may include: a widget identifier 218 to identify or describe the widget, and/or to identify targeted demographics or user behavioral categories to which the widget may be directed. In one aspect, unvalidated widget package 216 may further include widget application or code 220 comprising the instructions, objects, etc. to allow the respective widget to operate on a given computer platform, such as different types of wireless communication device 700 and/or on a personal computer (PC) using different technologies. In one aspect, unvalidated widget package 216 may further include a recommended update schedule 222 that defines a recommendation or suggestion of the developer/provider 108 of when the content represented by the widget should be updated—for example, the temporal aspects of widgets may vary, as so some widgets such as a stock watcher widget may preferably have frequent updates during market hours and much less frequent updates after market hours, versus a weather widget which may preferably be updated only a few times per day. In one aspect, unvalidated widget package 216 may further include a proposed pricing 224 that defines one or more price-related and/or marketing/selling-related aspects of the widget, such as one or more of a desired end user price, developer/provider compensation or fee or royalty, discounts, carrier-specific pricing, catalog placement considerations including catalog type and slotting position, etc. Upon passing through validation process 210 and achieving widget system standard(s) 214 as defined by widget validation component 212, the respective unvalidated widget package 216 may be allowed into system 100 as a validated widget package 226, which represents a type of trusted widget.

Mobile widgets 102 accepted by UWM 200 may be accessed and modified by both developer/provider 108 and operator/carrier 110 via a widget virtual negotiation component 206 that may be entered, for example, via developer interface 202 and operator/carrier interface 204, respectively. Similar to developer interface 202, operator/carrier interface 204 provides an access point, such as an extranet, for operator/carrier 110 to interact with UWM 200. For example, one or more operators/carriers 110 may review mobile widgets 102, or in some aspects validated widget packages 226, to determine if they want to include the respective widget in one or more widget catalogs 302 available to end users 104 of system 100. Further, for example, widget virtual negotiation component 206 allows developers/providers 108 and operators/carriers 110 to negotiate various aspects of a respective mobile widget 102, such as widget pricing, developer compensation, operator compensation, update scheduling, etc. In one aspect, for example, widget virtual negotiation component 206 may include a widget bidding exchange including auction functionality to control and report the results of an auction process used to define agreed upon parameters corresponding to a respective mobile widget 102. In any case, in some aspects, after agreement between developers/providers 108 and operators/carriers 110 on the final set of widget parameters, the mobile widget 102 may be defined by a negotiated mobile widget package 228. For example, negotiated mobile widget package 228 may include: a widget identifier 230 to identify or describe the widget and/or to identify targeted demographics or user behavioral categories to which the widget may be directed, which may be the same as identifier 218, or which may be operator/carrier specific. The negotiated mobile widget package 228 may further include widget application or code 232 comprising the instructions, objects, etc. to allow the respective widget to operate on a given computer platform, which may be the same as widget application or code 220 or which may be operator/carrier specific. The negotiated mobile widget package 228 may further include a negotiated update schedule 234 that defines negotiated or initially accepted content update schedule, which may be the same as recommended update schedule 222 or which may be operator/carrier specific. The negotiated mobile widget package 228 may further include a negotiated pricing 236 that defines one or more price-related and/or marketing/selling-related aspects of the widget as agreed upon during the negotiation, which may be the same as proposed pricing 224 or which may be operator/carrier-developer/provider specific or negotiation specific.

Figure 6:
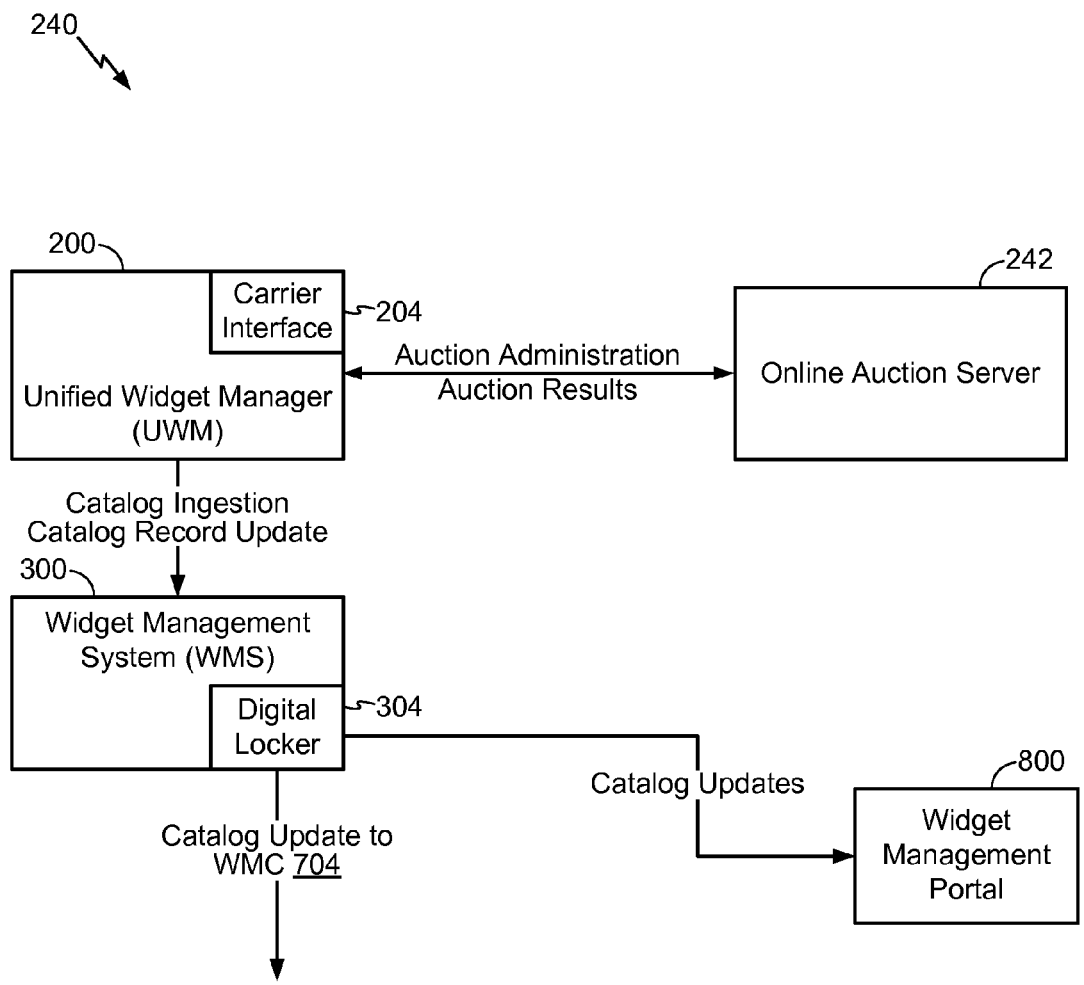
FIG. 6 is a schematic diagram of an aspect of an auction architecture of the system of FIG. 1.
Figure 7:
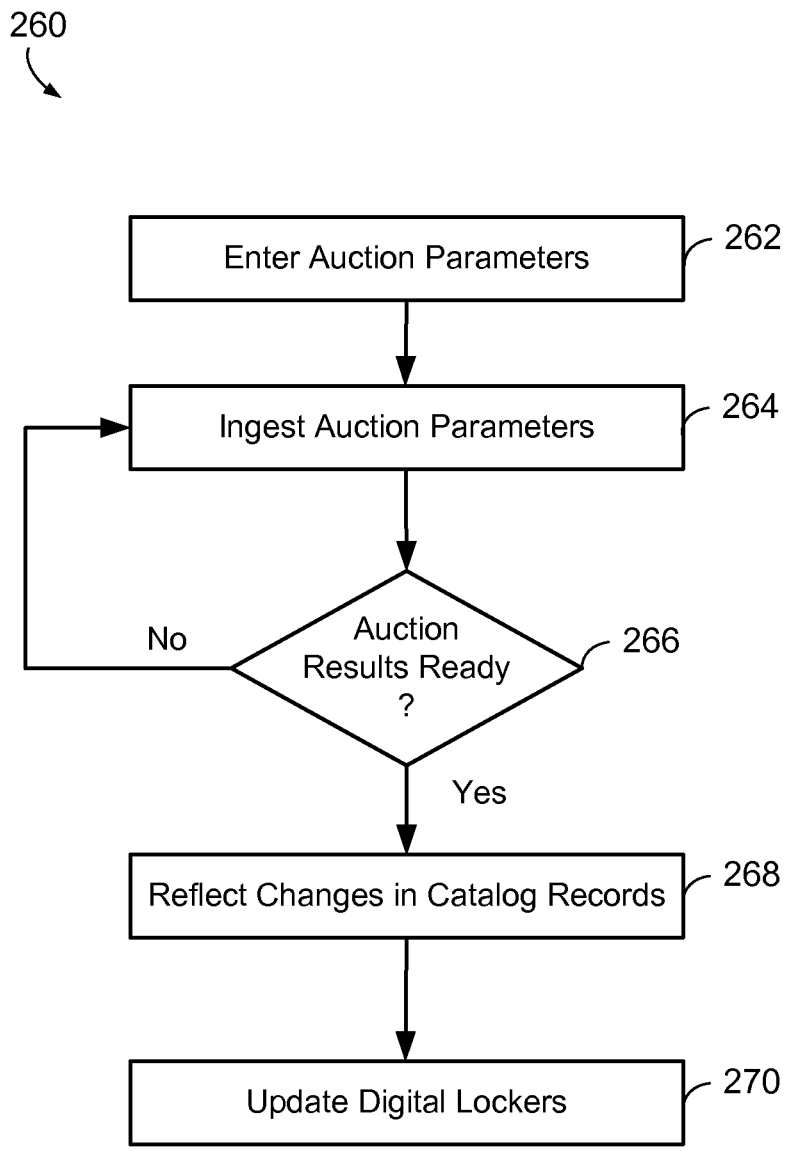
FIG. 7 is flow diagram of an aspect of an auction method of the system of FIG. 1.

Referring specifically to FIGS. 6 and 7, in one non-limiting example, one aspect of an architecture 240 and method 260 corresponding to widget virtual negotiation component 206 (FIGS. 1 and 5) include an online auction server 242 operable to interact with UWM 200 to perform auction administration duties and to transmit auction results. For example, online auction server 242 may be operable to present mobile widget inventory to operators/carriers 110 (FIG. 1), as well as biddable parameters associated with each mobile widget, such as pricing and placement (FIG. 7, action 262). For example, biddable parameters corresponding to mobile widget placement may include, but are not limited to, parameters such as slotting placement for position on a widget wall, a "featured" parameter corresponding to featuring the respective mobile widget in the display of a shopping mobile widget, and slotting placement for each category of widgets or for each widget catalog. Further, the mobile widgets presented by online auction server 242 may have additional targeting metadata, such as the data of the targeted demographics or user behavioral categories to which the widget may be directed. As such, operator/carrier 110 (FIG. 1) is able to access biddable items and enter bids corresponding thereto (FIG. 7, actions 264 and 266). Based on the auction results (FIG. 7, action 266), UWM 200 modifies the records of corresponding mobile widgets 102 and/or mobile widget catalogs 302 (FIG. 7, action 268), which are received by WMS 300 and updated in the corresponding records of digital locker 304 (FIG. 7, action 270). Thus, as a result, such updated records are then made available to WMC 704 and widget management portal 800 to insure end user 104 (FIG. 1) has access to the latest information.

Additionally, in some aspects, UWM 200 allows operator/carrier 110 to organize one or more mobile widgets 102 into one or more widget catalogs 302, for example, using a catalog manager component 240 accessible via operator/carrier interface 204. In one aspect, for example, operator/carrier 110 selects negotiated widget packages 228 for inclusion in one or more widget catalogs 302, which may be organized in many different fashions, such as by widget functionality, etc. Further, for example, each widget catalog 302 includes a listing of mobile widgets 102 that may be organized in a predetermined fashion, such as based on payments for a given slotting placement, etc. Widget catalog 302 may be defined by a catalog record that includes mobile widget metadata describing each mobile widget 102 and corresponding parameters that may be of interest to a catalog viewer, such as one or any combination of a name of the widget, a description of the widget functionality, a graphic or visual representation of the widget, widget pricing and purchasing information, etc. Further, for example, the listing of mobile widgets 102 in widget catalogs 302 may be varied after creation of widget catalog 302, such as based on end user preferences, and/or end user behavioral information, and/or end user device capabilities. In any case, catalog manager component 240 further allows operator/carrier 110 to transmit widget catalogs 302 to WMS 300 so that the listed mobile widgets 102 may be made available to end users 104.

Further, UWM 200 may further include a widget manager component 242 that allows operator/carrier 110 to change one or more parameters or characteristics of mobile widget 102. For example widget manager component 242 may allow operator/carrier 110 to: activate or deactivate a respective mobile widget 102 for operation on system 100; set or change a widget identifier, such as identifier 230; set or change widget application/code, such as application/code 232; set or change a widget update schedule, such as update schedule 234; and/or set or change pricing information, such a pricing 236. In one aspect, for example, widget manager component 242 may further include an update scheduling manager 244 to specifically allow interaction with, and setting of updates schedules for one or a group of mobile widgets 102. For example, update scheduling manager 244 may include logic, algorithms, heuristics, fuzzy logic, neural networks, etc., operable to provide automated update schedules for individual or groups of mobile widgets 102 or end users 104, for example, that take into account and/or balance end user considerations, mobile widget characteristics such as temporal aspects of content, and operator/carrier considerations.

Thus, UWM 200 provides an access point and interfacing functionality for developers/providers 108 to submit mobile widgets 102 into system 100. Further, UWM 200 provides validation functionality to approve mobile widgets 102 for operation within system 100. Additionally, UWM 200 provides a clearinghouse or marketplace that allows developers/providers 108 and operators/carriers 110 to negotiate and agree upon financial and operational parameters of mobile widgets 102. Moreover, UWM 200 provides an access point and interfacing functionality for operators/carriers 110 to manage widget catalogs 302 and the content and characteristics of mobile widgets 102 within system 100.

Widget Management System

Figure 8:
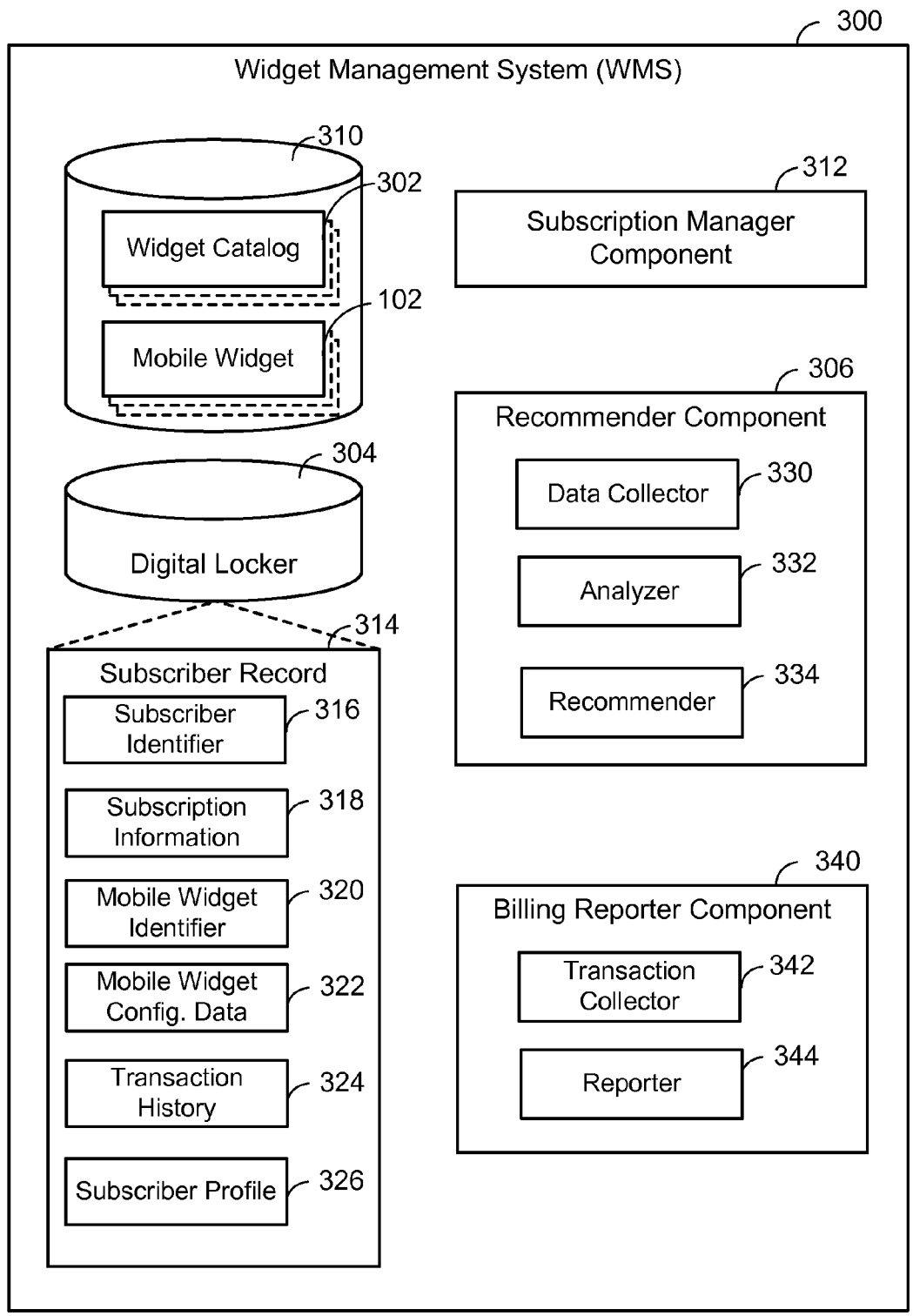
FIG. 8 is a schematic diagram of an aspect of the widget management system (WMS) of FIG. 1.

Referring to FIGS. 1 and 8, WMS 300 is an infrastructure element that interacts with UWM 200 to obtain mobile widgets 102, widget catalogs 302, and widget modifications such as changes to widget operational or configuration parameters. Further, WMS 300 provides an end user-facing interface that allows end user 104, via WMC 804 on wireless communication device 700 and/or via widget management portal 800, to view, select, purchase/download, and configure mobile widgets 102. Additionally, WMS 300 provides management functionality for mobile widget distribution to wireless communication devices, for storing and implementing mobile widget configuration and subscription parameters, and for effecting, recording, and reporting on mobile widget transactions.

In one aspect, for example, WMS 300 includes widget database 310 for storing one or more widget catalogs 302 and/or one or more mobile widgets 102. Further, WMS 300 may include a subscription manager component 312 that interacts with WMC 704 and/or widget management portal 800 to allow end user 104 to access widget catalog 302 or individual mobile widgets 102 for purchase and/or download onto wireless communication device 700.

Further, subscription manager component 312 may be operable to control one or a plurality of subscriber records 314 in a database such as digital locker 304. Each subscriber record 314 includes information on each end user and on each mobile widget 102 corresponding to each end user to enable the management and control of mobile widgets for subscribers. For example, in one aspect, subscriber record 314 may include one or any combination of: a subscriber identifier 316, such as a name, subscriber number, phone number, wireless device serial number, etc. that may be used to uniquely identify a given end user 104 and/or wireless communication device 700; subscription information 318 including a subscription identifier, a subscription description, a subscription key, a license, a validity time period, a service level, and any other information relevant to enabling operation of a mobile widget on a wireless device—such subscription information 318 may authorize end user 104 and/or wireless communication device 700 to receive or operate an individual or a class of mobile widgets, and may further authorize or identify a service level that may allow one of a number of levels of service corresponding to a mobile widget, wherein such service levels may regulate a number or volume of content updates, message exchanges, etc. performed by the respective mobile widget; mobile widget identifier(s) 320 to identifier one or more mobile widgets 102 purchased/downloaded to wireless communication device 700 and/or WMC 704 and authorized for operation; mobile widget configuration data 322, corresponding to each mobile widget identifier 320, that defines how corresponding mobile widget 102 is presented and/or operates, which may include user-defined/customized configuration data entered by end user to personalize the respective mobile widget according to user preferences; a transaction history 324 that includes transaction details relating to end user 104 accessing, purchasing/downloading, and configuring a respective mobile widget 102; and a subscriber profile 326 that includes information that describes end user 104, defines demographic information of end user 104, and/or defines behavioral information of end user 104, wherein such information may be utilized for marketing purposes, such as to recommend mobile widgets to end user 104 and/or to provide advertising to end user 104. Thus, WMS 300 stores and controls the relationships between each mobile widget 102 and each subscriber or end user 104 in system 100 through digital locker 302.

Optionally, WMS 300 may include recommender component 306 operable to interact with subscription manager component 312, digital locker 304, widget database 310, other infrastructure elements such as UWM 200 or CAS 900 to obtain widget slotting information or widget advertising-related information and other external entities, such as providers of marketing and/or sales data, to suggest mobile widgets 102 that may be of interest to subscriber/end user 104. For example, in one aspect, recommender component 306 may include a data collector module 330 operable to perform one or any combination of: gathering data about available mobile widgets, such as mobile widget metadata; gathering data about subscriber/end user, such as subscription information 318, transaction history 324 and subscriber profile information 326; or gathering other internal or external information relating to widget popularity, widget profitability, widget sales, widget advertising, widget positioning/slotting, widget marketing, etc. Further, recommender component 306 may include an analyzer module 332 operable to execute one or more algorithms, heuristics, fuzzy logic, etc. in order to determine potential matches between one or more of the available mobile widgets or catalogs, the available subscriber/end user data, and/or external widget-related information. Additionally, based on the results of analyzer module 332, recommender component 306 may further include a recommender module 334 operable to generate a message including references to or links to or identification of one or more mobile widgets 102 or widget catalogs 302 that may be of interest to the subscriber/end user 104 and/or that may be of an economic interest of operator/carrier 110 to promote to subscriber/end user 104. Thus, recommender component 306 is operable to dynamically suggest or recommend mobile widgets 102 or widget catalogs 302 to subscribers/end users 104 based on any number of configurable parameters.

Further, in some aspects, WMS 300 may additionally include a billing reporter component 340 that keeps track of end user 104 interactions with WMS 300 in downloading/purchasing of mobile widgets 102 and reports such activity to backend system 101 for accounting and billing purposes. For example, billing reporter component 340 may include a transaction collector module 342 operable to interact with subscription manager component 312 and/or digital locker 304 in order to gather transaction data relating to the download or purchase of mobile widgets 102 by subscribers/end users 104. Further, a reporter module 344 is operable to interact with transaction collector module 342 and generate a message for transmission to backend system 101 documenting the collected transactions, including the transaction details identifying aspects of the corresponding subscriber information, mobile widget metadata and the transaction-specific data such as purchase price. Thus, billing reporter component 340 is operable to update backend system with billing-related information.

Message Router

Figure 9:
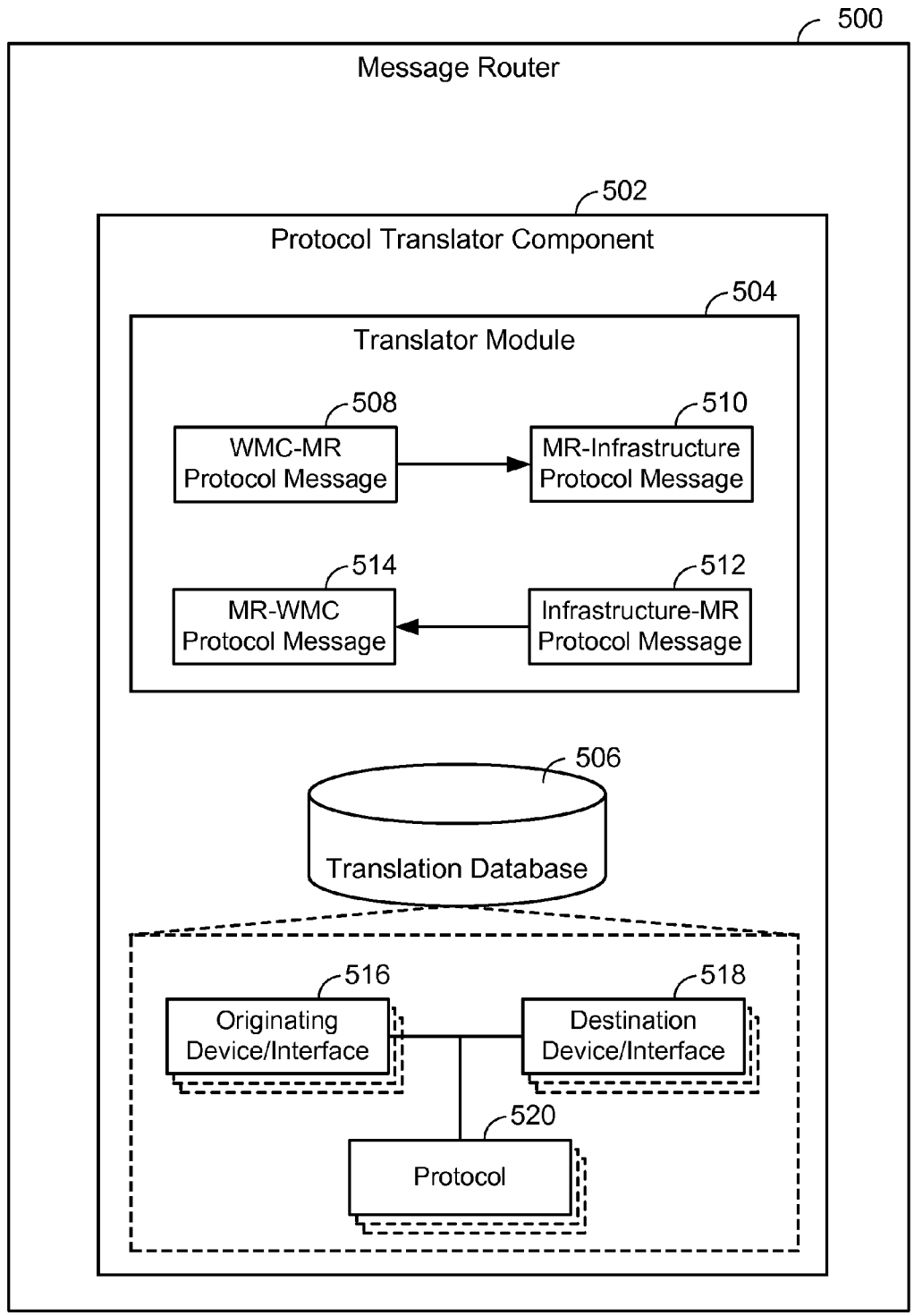
FIG. 9 is a schematic diagram of an aspect of the message router of FIG. 1.

Referring to FIGS. 1 and 9, in one aspect, system 100 includes a network element, such as message router (MR) 500, which provides a communication interface between the network infrastructure, such as WMS 300 and CAS 900, and wireless communication device 700 and/or WMC 704. In particular, in one aspect, message router 500 communicates directly with WMC 704 by sending and/or receiving over-the-air (OTA) messages via wireless interface 106, and further relays those messages to WMS 300 and/or CAS 900 via one or more infrastructure communications networks.

It should be noted that wireless interface 106 between message router 500 and WTC 704 may have a different transport protocol than the one or more infrastructure networks connecting message router 500, WMS 300 and CAS 900. As such, in some aspects, message router 500 may include a protocol translator component 502 to enable message router 500 to exchange messages between device or transport mediums operating with different protocols. For example, protocol translator component 502 may include a translator module 504 having translation logic operable to access a translation database 506 in order to convert a message from one protocol to another protocol. For example, translator module 504 is operable to translate a WMC-MR protocol message 508, for example a WMC originated message transmitted according to the protocol of wireless interface 106, into an MR-infrastructure message 510, for example a message transmitted according to the protocol of the corresponding infrastructure communication network 112. Similarly, for example, translator module 504 is operable to translate a infrastructure-MR protocol message 512, for example an infrastructure originated message transmitted according to the protocol of the corresponding infrastructure communication network 112, into an MR-WMC message 514, for example a message transmitted according to the protocol of wireless interface 106. In performing such message translation, translator module 504 is operable to access a local or remote translation database 506 that stores relationships and data corresponding to an originating device/interface 516, a destination device/interface 518, and communication protocols 520. For example, using translation database 506, translator module 504 is able to identify or determine the corresponding protocol used for a message received from a respective originating device or transported over a corresponding originating interface, as defined by the data of originating device/interface 516. Similarly, for example, using translation database 506, translator module 504 is able to determine the corresponding protocol to use for a message destined for a respective destination device or to be transported over a corresponding destination interface, as defined by the data of destination device/interface 518. It should be noted that originating device/interface 516 and destination device/interface 518 may be combined, for example, to provide relationships between devices and/or interfaces and corresponding protocols 520.

In any case, message router 500 is operable to transport messages in any desired protocol. For example, such protocols can include hypertext transfer protocol (HTTP), an Internet Protocol (IP) socket protocol, a short message service (SMS) protocol, and any wired and/or wireless network protocols, such as code division multiple access (CDMA)-based protocols and global system for mobile communications (GSM)-based protocols.

Wireless Interface

Referring to FIG. 1, wireless interface 106 may be any one or any combination of a variety of wireless communication systems. Such systems often employ different spectrum bandwidths and/or different air interface technologies. Exemplary systems include one or any combination of the wireless systems discussed above.

Infrastructure Communication Network

Referring to FIG. 1, infrastructure communication network 112 may be any one or any combination of a variety of wired or wireless communication systems, or a combination of both. Exemplary systems include one or any combination of the wired or wireless systems discussed above.

Wireless Communication Device and Widget-Related Components

Figure 10:
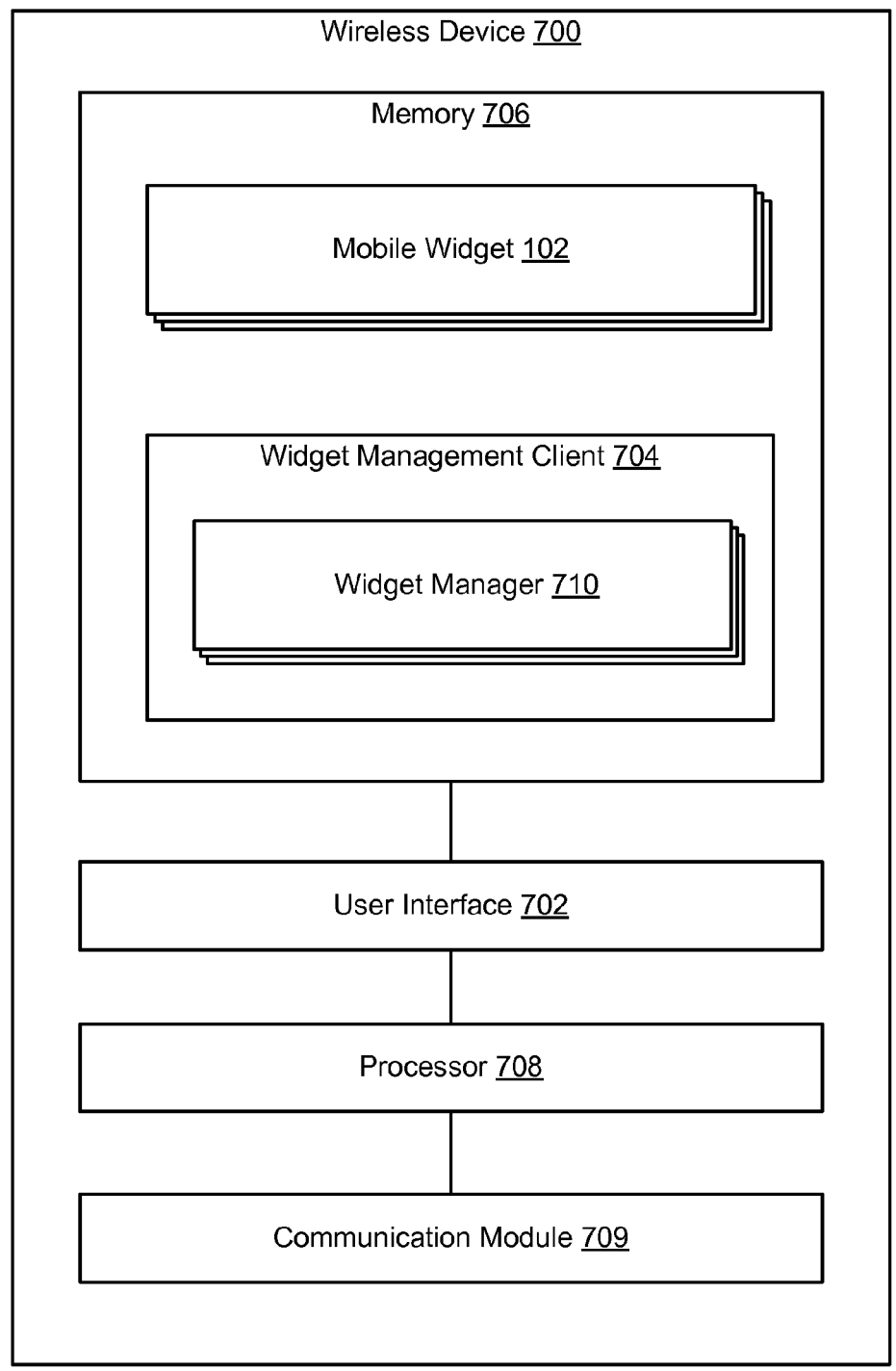
FIG. 10 is a schematic diagram of an aspect of the wireless device of FIG. 1.

FIG. 10 represents a high-level block diagram of a wireless device 700 operable to store, present, and manage mobile widgets 102, according to one aspect. As previously noted, the wireless device may include any device capable of operating on a wireless communication system. For example, wireless device 700 may be embodied as a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem. The wireless communication system may any of variety of systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

The wireless device 700 includes a memory 706 and a processor 708 that is in communication with memory 706. Processor 708 is operable for carrying out processing functions associated with one or more of components and functions described herein. Processor 708 can include a single or multiple set of processors or multi-core processors. Moreover, processor 708 can be implemented as an integrated processing system and/or a distributed processing system. Memory 706 is operable for storing applications being executed by processor 708, such as mobile widgets 102. Memory 706 can include random access memory (RAM), read only memory (ROM), and a combination thereof.

Additionally, wireless device 700 includes user interface 702 operable to receive inputs from a user of wireless device 700, and to generate outputs for presentation to the user. Thus, user interface 702 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 702 may include one or more output devices, including but not limited to a display, a speaker, a haptic feedback mechanism, a printer, any other mechanism capable of presenting an output to a user, or any combination thereof. In aspects herein disclosed user interface 702 may include a display operable to provide a visual presentation of widgets 102, a touch sensitive display operable to provide a visual presentation and receive inputs to the widgets 102 and/or a keypad to receive inputs to the widgets 102 or the like.

Memory 708 can store one, two, or a plurality of mobile widgets 102. As previously noted mobile widgets 102 are applications executable on the wireless device 700 that provide specific functionality, such as content delivery, to the user via a specialized user interface 702, such as a visual display. In some instances, mobile widgets 102 may provide the user access to web/Internet-based content that is delivered over the wireless network. In other instances, the mobile widgets 102 may provide for access to content that is device-based, such as, for example, current battery status, current location, or the like.

Additionally, memory 708 stores a Widget Management Client (WMC) 704 that includes a corresponding widget manager 710 for each mobile widget application 102 stored in the memory 708. WMC 704 is executable to wirelessly obtain one or more mobile widgets 102, from the wireless communication network and supervise mobile widget operation. Additionally, WMC 704 and, specifically widget managers 710, may be executable to track mobile widget activities on wireless communication device 700, report such activities to a network component, such as a widget tracking component 1100. Also, the widget managers 710 may provide management over the schedule for updating content and management cover the configuration of the presentation of the content on the user interface 702.

Figure 11:
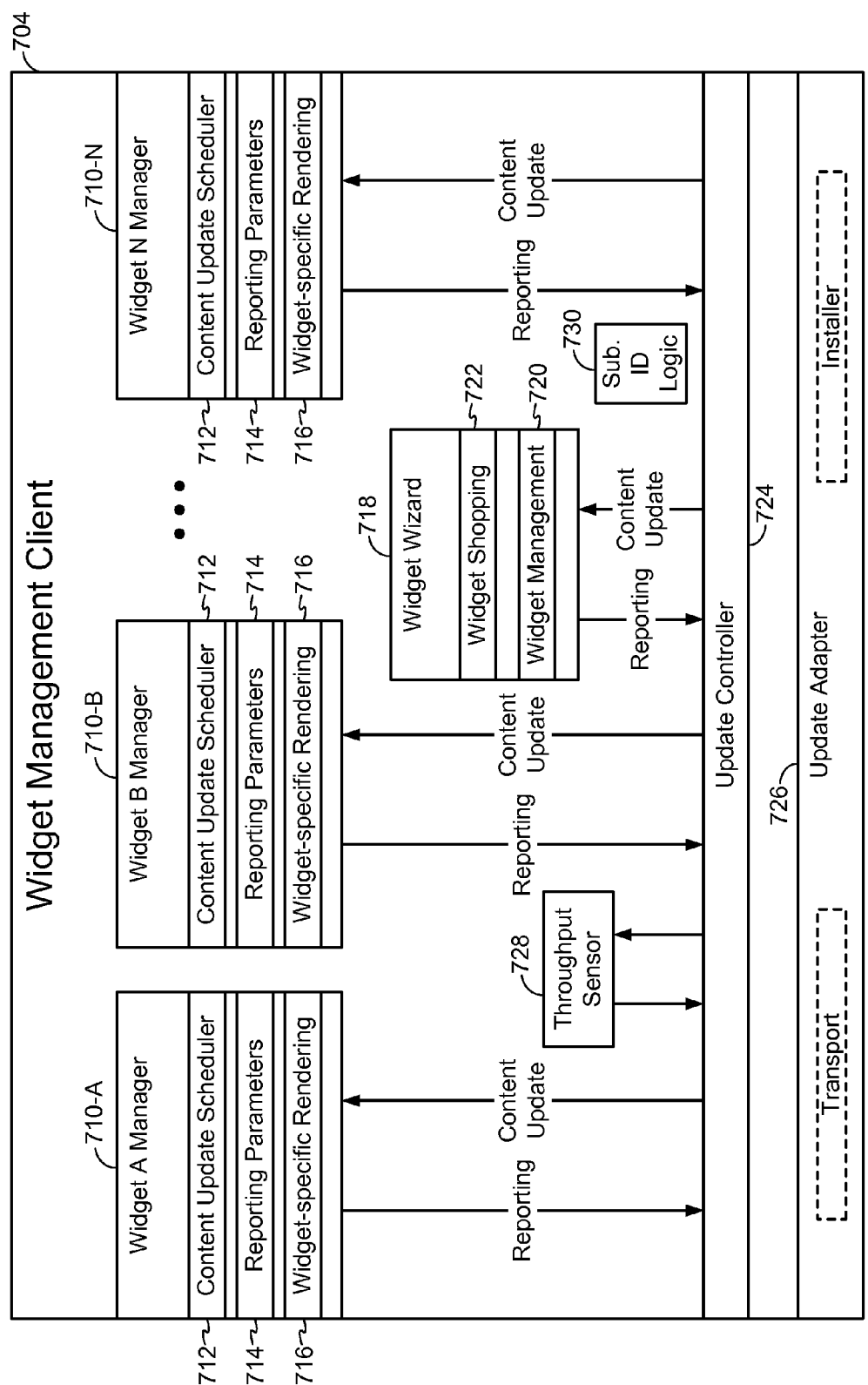
FIG. 11 is a schematic diagram of an aspect of the widget management client (WMC) of FIG. 1.

FIG. 11 provides a more detailed block diagram representation of the Widget Management Client (WMC) 704, which is stored on the wireless communication device 700. The WMC includes one or more widget managers 710 each corresponding to a mobile widget 102 stored on the wireless device 700. The illustrated aspect of FIG. 11 depicts widget managers, 710-A, 710-B and 710-N, where N represents the last widget manger 710 from among the plurality of widget managers.

Widget manager 710 includes a content update scheduler 712 that includes logic that is operable to update the schedule for content delivery based on one or more preconfigured content delivery attributes. Content delivery attributes may include, but are not limited to, widget usage, time of day/week/month/year, user/device location or the like. For example, widget usage may dictate that more frequently accessed widgets (e.g. widgets that are clicked-on or the like) are provided more frequent content updates while less accessed widgets are provided less frequent content updates. In another example, the logic may determine what time of day a user is most likely to access a widget and. in turn, schedule more frequent content updates during that time. Additionally, the logic may associate location with content updates, such that when the user/device is the vicinity of a specified location, more or less frequent updates occur. For example, if a user is within the vicinity of a sports stadium, the logic may be configured to provide more frequent updates for a sports information-related widget.

It should be noted that while the content update scheduler 712 provides logic to determine update schedules based on one or more content delivery attributes, the schedule can also be based on network preferences/factors for content delivery and/or user configuration of content schedules. Therefore, the content update schedule 712 may additionally include logic that provides for prioritizing, weighting, or otherwise factoring content delivery based on the content delivery attributes, the network preferences/factors, and/or the user configuration. Additionally each widget manager 710 may be configured such that the user may override the content update scheduler 712 and either provide for their own content update schedule via an option in the widget management module 722 of the widget wizard 718. Additionally the widget may be configured through the widget management module 722 of the widget wizard 718 with a button or other user interface that allows for the user to instantaneously request a content update.

Figure 12:
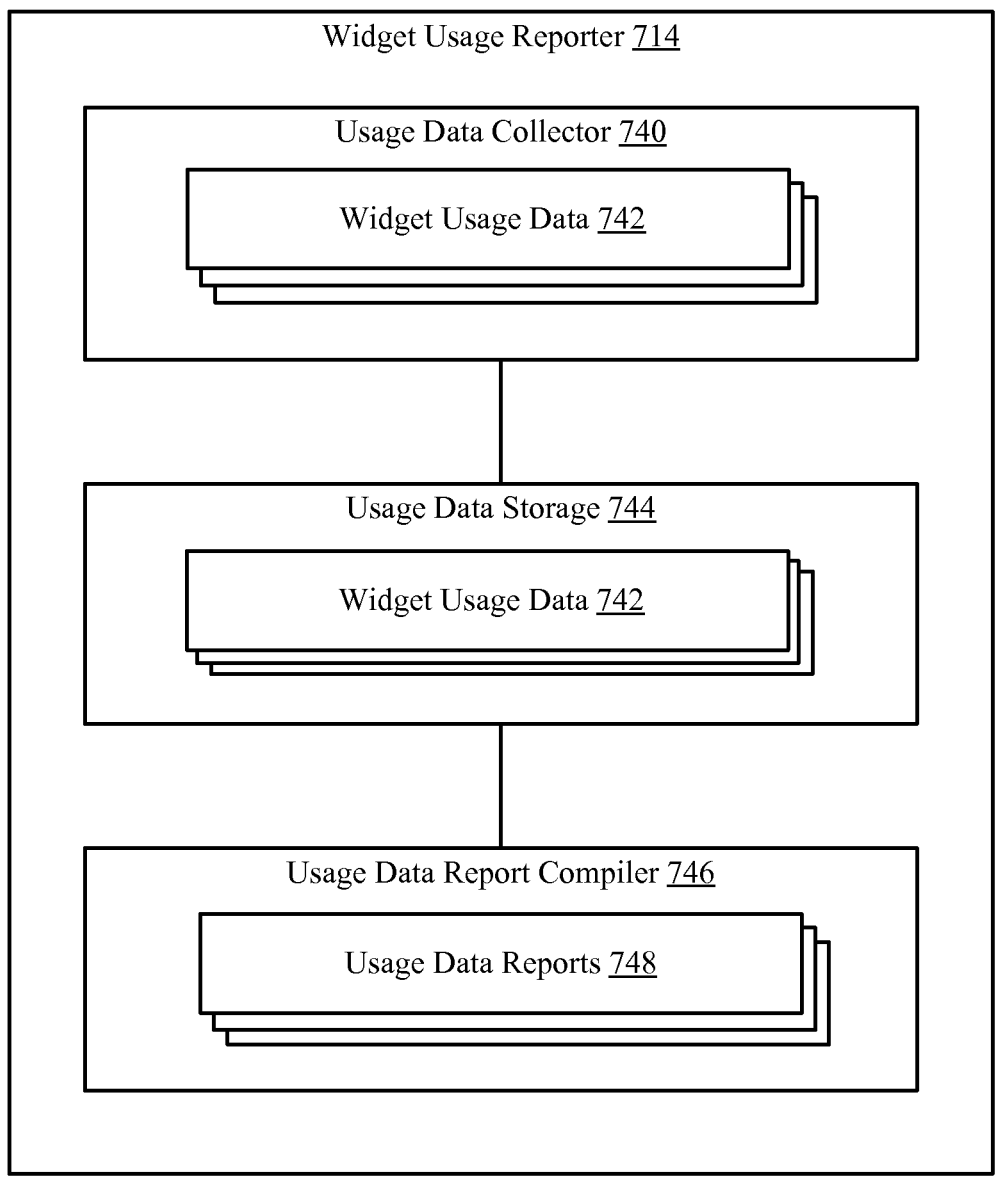
FIG. 12 is a schematic diagram of an aspect of a widget usage reporter of the system of FIG. 1.

Widget manager 710 also includes widget usage reporter 714 that includes logic operable for collecting and reporting widget usage information. FIG. 12 provides a more detailed block diagram of the widget usage reporter 714. The reporter 714 may include usage data collector 740 operable to collect widget usage data 742. The widget usage data may include, but is not limited to, such as widget access frequency, the depth of the access (i.e., how many click-throughs the widget undergoes during an access), the time of day/week that the widget is accessed and the like. The usage reporter 714 may additionally usage data storage 744 or optionally the widget usage data 742 may be stored in another data storage component external from the widget usage reporter 714 or the widget management client 704. The usage reporter 714 may additionally include a usage data report compiler 746 operable for compiling raw usage data into one or more usage data reports 748 based on network operator, widget developer and/or third party report criteria. Alternatively, in other aspects, the widget usage reporter may communicate raw widget usage data 742 to the network.

The collected widget usage information, either raw widget usage data 742 or compiled usage reports 748, to network entities. For example, the widget usage data 742 may be communicated to a network entity, such as digital locker 304 of Widget Management System (WMS) 300 (FIGS. 1 and 8). The WMS may implement the usage data 742 to determine content update schedules for the widget, to prioritize widgets in the user's personal widget catalog or the like. Additionally, the WMS 300 may communicate the usage information to a backend system 101 (FIG. 1) for reporting purposes and/or billing purposes.

Referring again to FIG. 11, widget manager 710 additionally includes widget-specific renderer 716 that includes logic operable for presenting the widget 102 on the wireless device 700 based on one or more rendering attributes. Rendering attributes widget usage, time of day/week/month/year, user/device location or the like. For example, widget usage may dictate that more frequently accessed widgets (e.g., widgets that are clicked-on or the like) are provided on the initial wall of the user interface or in a prominent position on the user interface. In another example, the logic may determine that the date is a Sunday during the fall season and therefore a football score reporting widget may be provided on the initial wall of the user interface or in a prominent position on the user interface. It should be noted that while the widget-specific renderer 716 provides logic to determine where a widget should be rendered on a display the renderer 716 may also provide for user configuration of rendering rules that may override or augment the rendering decision made by the logic.

The WMC 704 additionally includes a widget user interface, such as widget wizard 718, operable to provide the user with an interface to manage which widgets 102 are stored and presented on the wireless device 700, as well as an interface to purchase or otherwise obtain widgets from a marketplace. In addition to a wireless device-based user interface, such as the widget wizard 718, the system 100 may include a network-based user widget management portal 800 (FIG. 1), which provides for the device user to access the network from another wired or wireless device, such as a PC or the like, to make changes to the configuration settings, purchase/obtain additional widgets or otherwise manage the widgets presented on the wireless device.

Figure 13:
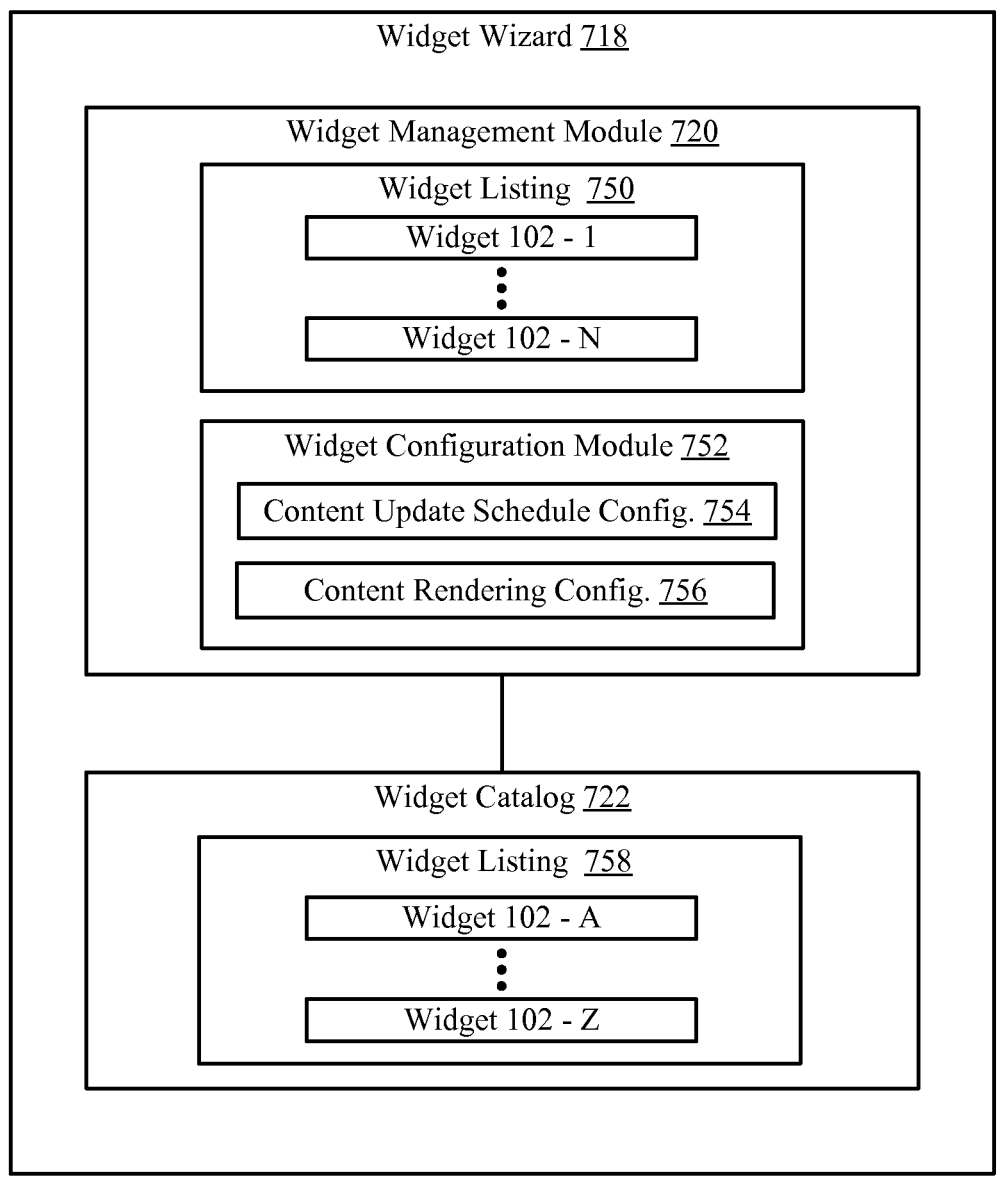
FIG. 13 is a schematic diagram of an aspect of a widget wizard of the WMC of FIG. 11.

The widget wizard 718 may include widget management module 720 operable to provide the user with management over the widgets that are displayed on the user interface 702. In addition, the widget wizard 718 may include widget catalog 722 operable to provide a user a current listing of the widgets currently available from the network operator or some other network source. FIG. 13 provides a detailed block diagram of various components of the widget wizard 718 including widget management module 720 and widget catalog 722. The widget management module may provide for a widget listing 750 that provides for the display of a listing of widgets 102 currently stored on the wireless device. The listing 750 provides for the user to instantaneously update the user interface with selected widgets. In this regard, a user can instantaneously deactivate a widget currently being presented/displayed and replace the widget with another widget stored on the device. In addition, the widget management module 720 provides for widget configuration module 752 that is operable to provide for the user to configure the widgets based on personal preferences. The widget configuration module 752 may include content update schedule configuration 754 operable to allow the user to define the frequency by which each widget is provided content updates and content rendering configuration 756 operable to provide the user with the ability to define the manner in which widgets are rendered/presented on the user interface, such as the position on the display, the size of the widget or the like. Upon user changes to the configuration settings in configuration module 752, the widget wizard 718 may upload or otherwise communicate the configuration changes to the network for storage in the digital locker 304 associated with the user 104 and/or the wireless device 700.

The widget wizard may additionally include widget catalog 722 that provides a widget listing 758 of widgets currently available from the network source. The listing of widgets in the catalog may be periodically updated, based on a set schedule or a user input, to insure the currency of the widgets available to the user. The update or initial receipt of the catalog may be provided by the WMS 300. In addition, the listing 758 may be customized for the user based on previous widget usage patterns or other attributes, such as time, location or the like.

In certain aspects, advertising widgets may be presented to the client as an option via the widget catalog 722. In some aspects, advertisement widgets may be offered to the user as a means of subsidizing or otherwise replacing the cost of other widgets. It should be noted that if widget management client 704 is configured to provide for the presentation of advertising widgets, the advertising widgets may be "locked" widgets, which do otherwise allow the user to manage or configure the widgets through the widget wizard 718. By locking the advertising widgets the network operator and/or advertiser is assured that the advertisements are being displayed/presented without the user otherwise choosing to opt-out of the advertising widgets. Additionally, in those aspects that provide for advertising widgets, the widget usage reporter 714 may be configured to provide specific collection and reporting of usage data related to the interaction that a user may experience with an advertisement, such as time viewed or the accessed depth of the advertisement.

Referring again to FIG. 11, the WMC 704 additionally includes update controller 724 and update adapter 726. The update controller 724 is operable to control upstream and downstream data delivery to and from WMC 704. For example, the update controller 724 may be operable to control the delivery of usage data 742 or usage data reports 748 to network entities, widget configuration settings, and/or user requests to purchase/obtain a new or updated widget. In certain aspects, the update controller 724 may be operable to collate and provide data to network entities, such as the Widget Management System (WMS) 300. In addition, update controller 724 may be operable to receive widget content updates, updates to the widget catalog 722, configuration settings for content update schedules, content reporting requests or the like.

Further, the update adapter 726 is operable to handle the upstream and downstream transport of the data from the WMC 704 to the appropriate network entity. In this regard the update adapter 726 is operable to receive/transmit data over a specified type of network connection, for example, an Internet Protocol (IP) socket, a HyperText Transfer Protocol (HTTP) socket, Short Messaging Service (SMS), or the like. Additionally, the update adapter 726 is operable to compare the existing configuration of widgets with WMS-pushed configurations and make changes to the configurations accordingly; such as instantiating new widgets and/or disabling deactivated widgets.

The WMC 704 may additionally include a throughput sensor 728 operable for sensing the throughput time and estimating the time to download content update for a widget. The throughput sensor 728 is operable to be engaged upon opening WMC 704, and approximate throughput time can be sensed by establishing an IP connection and measuring the Round Trip Time (RTT). Based on the approximate throughput time and the size of the previous content update for a widget of interest, an estimate can be established of the time to update a widget and provided to the user when the user requests an update. In addition, the throughput sensor 728 may be configured to provide for a user warning if the content update will take more than a predetermined threshold of time.

The WMC 704 may additionally include subscriber ID/credential determiner 730 operable to determine the subscriber/user identification associated with the WMC 704. In one aspect, the subscriber ID determiner 730 may initiate a HTTP call and the response header may include the subscriber identification. In alternate aspects, the subscriber ID determiner may be derived from the wireless device or the like. Additionally, the subscriber ID/credential determiner 730 may be configured to determiner subscriber/user credentials by prompting the user to enter the appropriate credentials, e.g. user id. Based on the input, the user credentials are compared to the subscriber identification and if a match is determined, a report acknowledging the match may be communicated to the WMS 300 and a record created in the digital locker 304 associated with the subscriber/user. Subsequently the subscriber ID and the subscriber credentials may be included in all messages communicated from the WMC 704 to the message router 500.

As previously noted, in addition to configuring the widget management client (WMC) 704 and associated mobile widgets 102 on the wireless device, the system provides for a user widget management portal 800. The user widget management portal 800 allows for the user 104 to access the component via another device, such as a wired PC or another wireless device, to manage the (WMC) on the wireless device 700. The user widget management portal 800 is in network communication with the widget management system (WMS) 300 and WMS 300 is in wireless communication with the wireless device 700 via message router 500. The user widget management portal 800 acts as complement to the widget wizard 718 on the wireless device 700 by providing user 104 remote access to the management of widgets on the wireless device. The user widget management portal 800 is operable to receive information pertaining to a user's current WMC 704 or widget 102 configurations from the user's profile stored in the digital locker 304 of WMS 300. As such, user widget management portal 800 may include a WMC configuration module 810 operable to provide user 104 with the ability to re-configure settings that apply to the overall WMC 704 in general. In addition, the user widget management portal 800 may include one or more widget configuration modules 820 operable to provide user 104 with the ability to reconfigure the widgets 102 currently stored on wireless device 700.

In addition to WMC and widget configuration, the user widget management portal 800 may provide for the user to learn about and/or acquire new widgets. As such, user widget management portal 800 may include widget catalog 302, as communicated from widget management system 300. In addition, the widget catalog 302 may be personalized for user 104 such that widgets of interest to user 104 are listed in the catalog near the beginning or are otherwise highlighted. Widgets of interest may be identified by the WMS 300 based on widget usage tracking/metering data communicated from the wireless device 700. Once a user selects, acquires or otherwise purchases a new widget, the user management portal 800 communicates the selection to the WMS 300 and the WMS 300 subsequently retries the widget from a corresponding content access server 900 (FIG. 17) and communicates the widget to the wireless device via message router 500.

Content Access Server/Content-Advertising-Tracking Components

Figure 17:
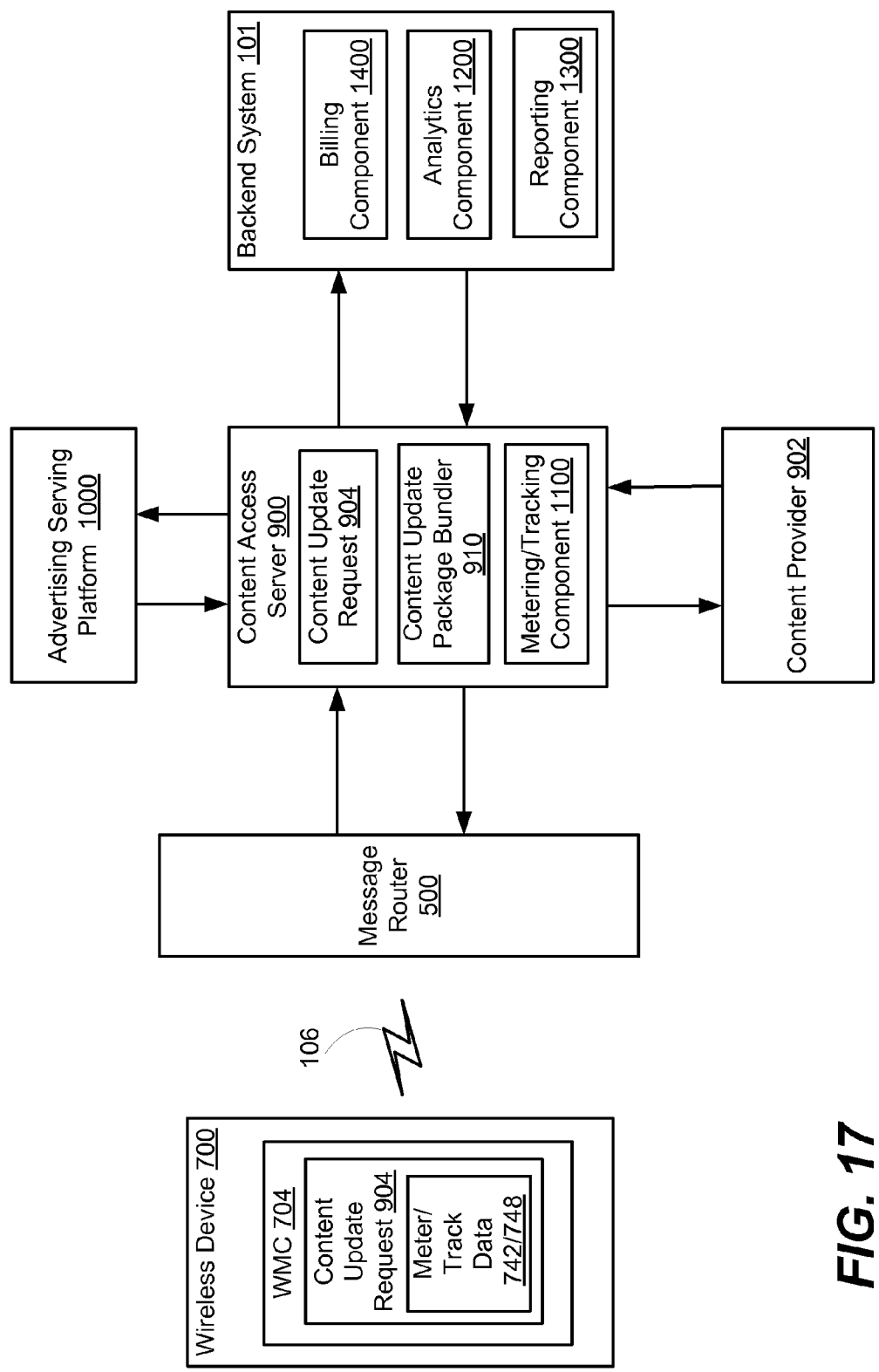
FIG. 17 is a schematic diagram of an aspect of a content access server of the system of FIG. 1.

Referring to FIG. 17, a detailed block diagram highlighting the content access server 900 is depicted. Content access server 900 is operable to provide content to the mobile widgets 102 based on a predetermined update schedule for the widget. As previously mentioned the update schedule may be logically determined based on one or more content delivery attributes, network attributes and/or user configuration settings. A mobile widget 102 will initiate a content request 904 based on the update schedule, which is wirelessly received by the content access server 900 via the message router 500. The content access server 900 will act on the request 904 by retrieving current content from content provider 902 or, in the case of advertisements serving platform 1000, which is in communication with an advertisement source. Once the content update is retrieved, the update is communicated to the wireless device for presentation on the corresponding widget. For example, if the mobile widget is a sporting event score reporting widget, a request may be sent to the content access server and the content access server mat retrieve a content update, in the form of updated sporting event scores from a content provider 902, such as a web-based sports news site or the like. In one aspect, the content access server 900 may include a content package bundler 910 operable to bundle updates in a content update package, such as a /zip file or some other spectrally efficient compression mechanism. Bundling content updates in packages provides for smaller messages that can be more efficiently delivered to the wireless devices. Content updates can be communicated to the wireless device across different connections depending on the connections available at the wireless device. Examples of connections include, but are not limited, HTTP socket, IP socket, SMS, and the like.

In addition to providing content updates, content access server 900 may serve as the receiving point for metering/tracking data communicated from the WMC 704. In some aspects, the content update request 904 may include the metering/tracking data, such as widget usage data 742 or widget usage reports 748. In such aspects, the content access server 900 includes a metering/tracking component 1100 operable to parse the widget usage data 742 or widget usage reports 748 from the request and route the metering/tracking data to a content provider 902 or the advertising serving platform 1000. In addition, the content access server may communicate the metering/tracking data to a backend system 101, which includes an analytics component 1200 operable for receiving the metering/tracking data and logically determining usage patterns or the like. The analytical data may be subsequently communicated and used by the reporting component 1300 to generate predetermined reports and by the billing component 1400 to generate widget bills, such as widget billing based on widget usage rates.

Figure 14:
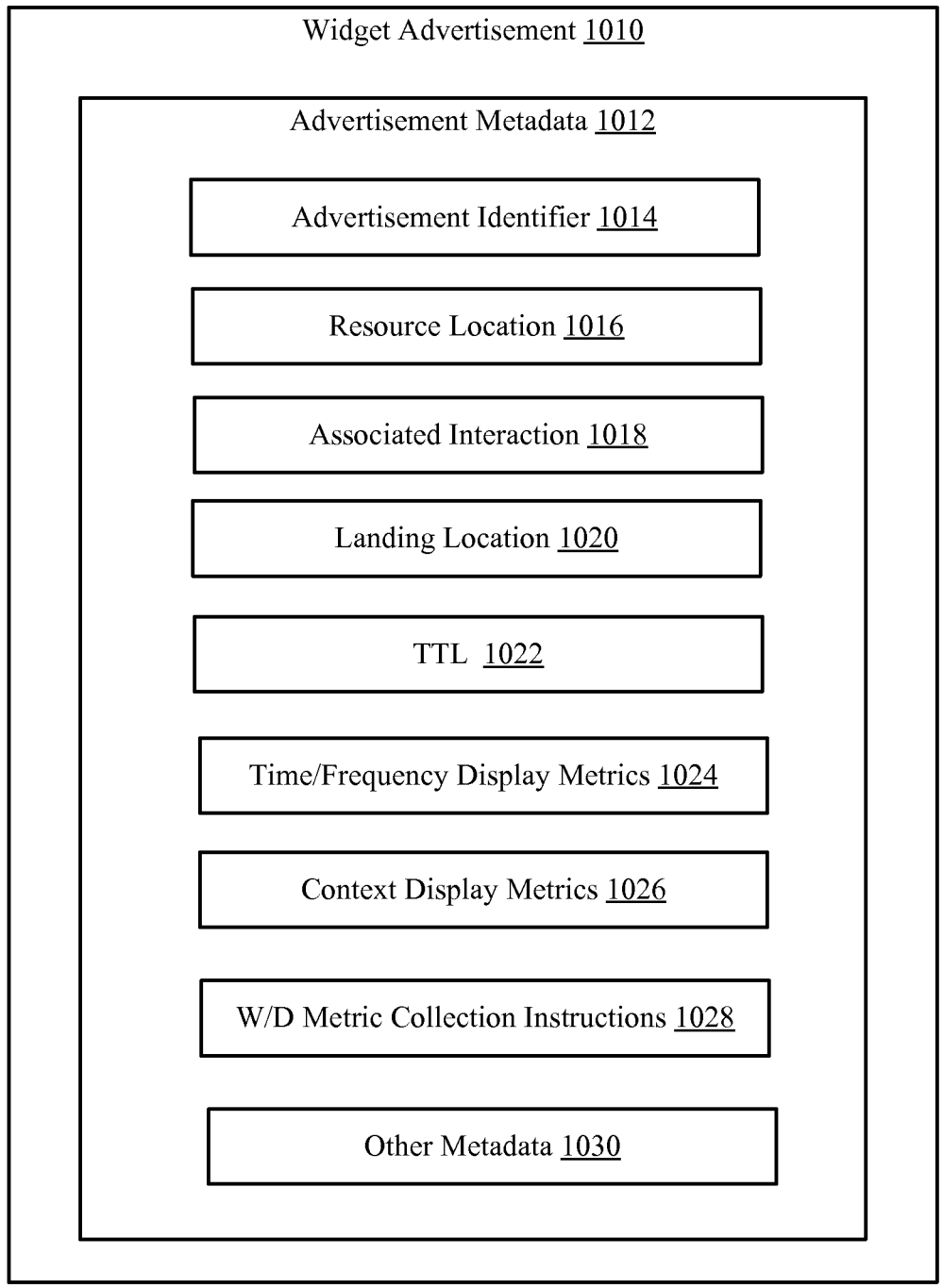
FIG. 14 is a schematic diagram of an aspect of a widget advertisement of the system of FIG. 1.

As previously noted, one or more widgets that are stored and presented on the wireless device 700 may include advertising widgets operable to display advertisements in widget form. In certain aspects, advertising widgets may be provided by the widget operator as an opt-in feature, in which the user is offered the option of opting to accept advertising widgets in lieu of some form of compensation, such as a reduction in the cost of other non-advertising widgets or the like. Thus, advertisement widgets may be configured be the widget providers in conjunction with the advertisers as a "locked" widget, meaning that the user is unable to re-configure the widget or otherwise deactivate the widget on the wireless device. FIG. 14 provides a block diagram of an example of a widget advertisement 1010 and, more specifically, the advertisement metadata 1012 included in such advertisements. The metadata 1012 may include an advertisement identifier 1014, such as id number that serves to identify the advertisement, and a resource location identifier 1016 that serves to identify the source of the advertisement, such as an IP address or the like. The metadata 1012 may additionally include associated interaction 1018, which serves to define user interactions with the advertisement, such as click-to-browse functionality or the like and/or landing location 1020, which defines a URL location for user interaction other than click-to-browse. In other aspects, the metadata 1012 may include the TTL (Time to Live) 1022 for the Advertisement, which defines the expiration date for the advertisement on the wireless device, and time/frequency of display metrics 1024, which define specific times and/or the frequency by which the advertisement should be displayed on the wireless device. Additionally, the metadata 1102 may include contextual display metrics 1026, which define other context parameters related to the display of the advertisement and wireless device metric collection instructions 1028, which define the metrics that are to be collected at the wireless device, and subsequently communicated to the network, in relation to the display of the advertisements, such as time/frequency of display, frequency of user interaction with the advertisements, depth of click-throughs and the like. The metadata 1012 may additionally any other metadata 1012 related to the advertisement 1010, the display of the advertisement on the widget or the reporting functions.

Figure 15:
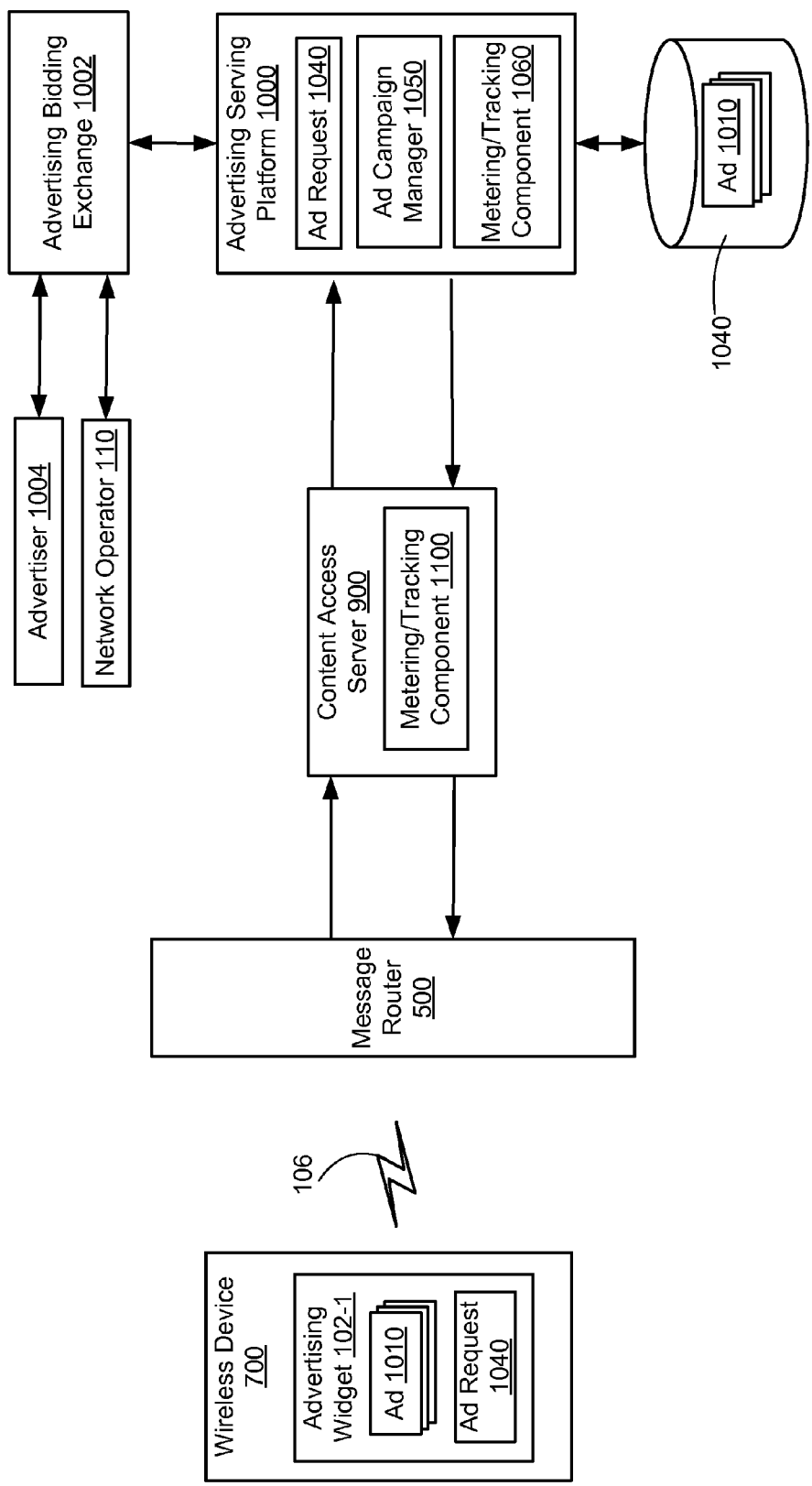
FIG. 15 is a schematic diagram of an aspect of an advertising architecture of the system of FIG. 1.
Figure 16:
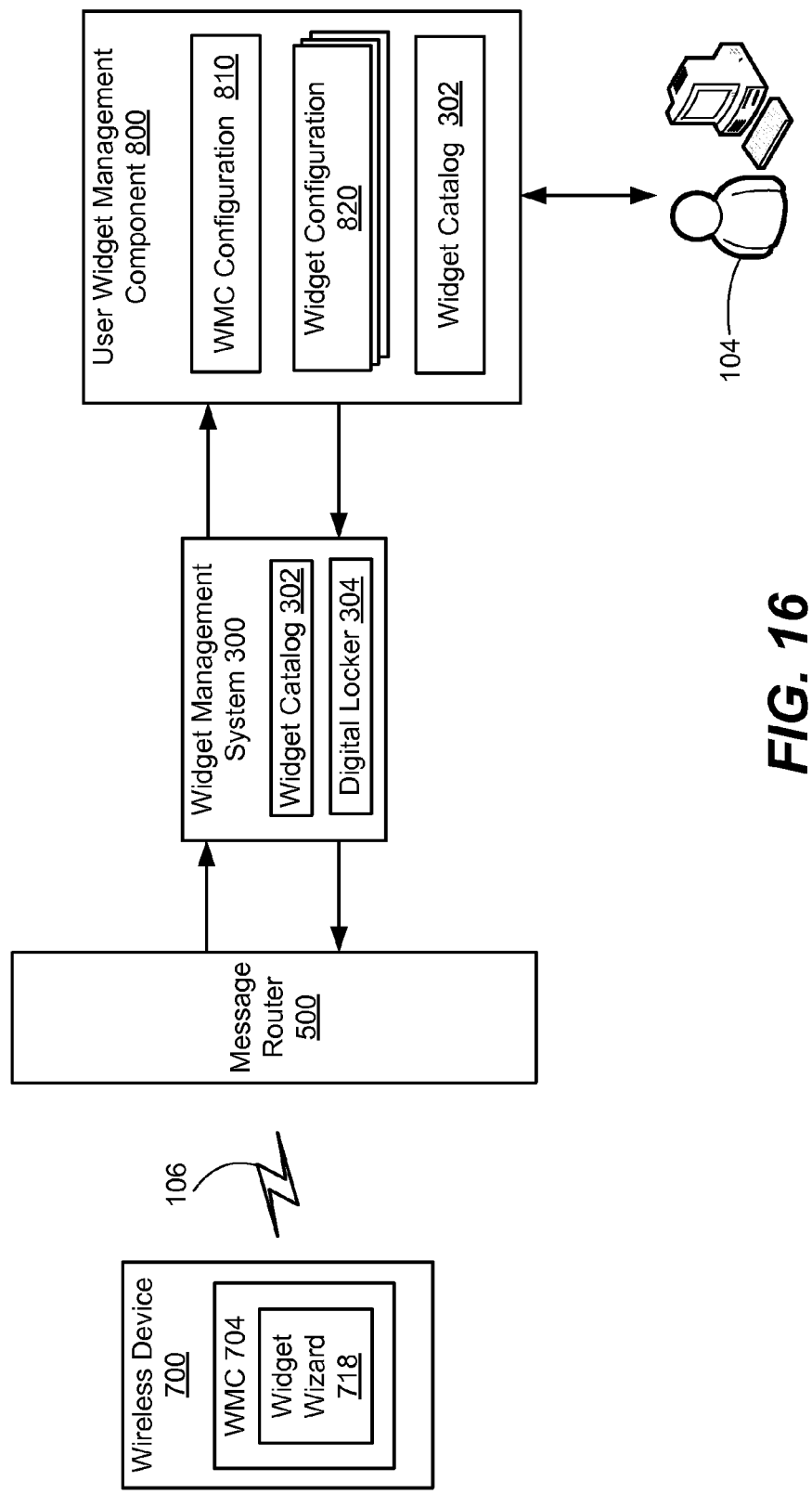
FIG. 16 is a schematic diagram of an aspect of a widget configuration architecture of the system of FIG. 1.

As shown in the block diagram of FIG. 15, advertisements 1010 are wirelessly communicated to the advertising widget 102-1 on the wireless device 700 via an advertising source, such as advertising serving component/platform 1000. The advertising serving platform 1000 is in communication with content access server 900, such that advertisements 1010 are communicated from the advertising serving platform 1000 to the wireless device 700 through the content access server 900. Additionally, the message router 500 is in communication with the content access server 900 and serves to insure that the advertisements and related information are communicated to and from the wireless device via the wireless network 106 using a unified communication protocol. The advertising serving platform is in communication with an advertisement database 1040 that stores the inventory of advertisements 1010. Thus, the advertising serving platform is operable to retrieve advertisements 1010 from the database 1040 and communicate the advertisements to the advertising widget 102-1 on the wireless device.

In addition, similar to a content update request as described above, wireless device may issue an advertisement request 1040 operable to request delivery of an advertisement for presentation of an advertisement on the wireless device. The advertisement request is received by the advertising serving platform 1000, which obtains an advertisement from advertisement database 1040. The advertisement request may include, an identifier, issued by the advertising serving platform 1000, which identifies the WMC 704. The request may additionally include a metering/tracking report that identifies advertisements recently presented and the number of presentations during the TTL.

Additionally, the advertising serving platform 1000 may further comprise an ad campaign manager 1050 operable to manage advertising campaigns for advertisers by communicating advertisements to advertising widgets based on advertising campaign criteria. Advertising campaign criteria may dictate that certain advertisements are pushed to wireless devices having expiration dates and frequency of display rates related to the advertising campaign. In other aspects, the advertising campaign may target certain demographic information related to users, or certain wireless devices, such that certain advertisements are targeted for users and/or wireless devices that are within the target audience confines. Demographic information may include, but is not limited to, user gender, user interests, user income, user age, user address, current used/wireless device location, and the like.

The advertising serving platform 1000 may additionally include a tracking/metering component 1060 that tracks and meters information related to the display of the advertisements on users advertising widgets. The tracking/metering component 1100 may parse out those metering and tracking data related specifically to advertisements 1010 and advertising widgets 102-1 and communicate the advertising related metering and tracking information to the tracking/metering component 1060 of the advertising serving platform 1000. The tracking/metering data that is communicated from the WMC 704 may include advertisement identifiers, number of presentations/displays on the advertising widget, depth of user interaction (e.g. number of click-throughs), elapsed time of user interaction/viewing of advertisement and the like.

The advertising serving platform 1000 may additionally be in communication with an advertising bidding exchange server 1002 that is operable to allow for an advertising bidding marketplace to occur between advertisers 1004 and network/widget operators 110. The bidding exchange marketplace may provide for the advertisers 1004 to bid on widget advertising based one or more advertising criteria, such as a position/placement of the advertisement on the widget wall, the frequency of presentation, the time of presentation, the demographics of the target audience and the like. In addition, the bidding exchange marketplace may provide for the advertisers to bid based on broadcast and/or multicast presentation of advertisements in the widget. In one aspect, the bidding exchange marketplace is a publicly available marketplace, such as an Internet-based marketplace that allows for all advertisers or potential advertisers to bid on widget-based advertising.

Backend System

Referring back to FIG. 1, as previously noted, in some aspects, system 100 may have a backend system 101 for analyzing the tracked data and transactions within system 100. Backend system 101 may include one or any combination of analytics component 1200, reporting component 1300, and billing component 1400.

Analytics component 1200 receives and examines the data of system 100.

Reporting component 1300 generates reports, including operator/carrier proprietary information 1302, based on the results of the analysis of analytics component 1200, according to one aspect.

In one example, billing component 1400 accounts for transactions in system 100 and debits and/or credits one or more end users 104, developers/providers 108, operators/carriers 110, or advertisers 908.

Sample Call Flows

Figure 18:
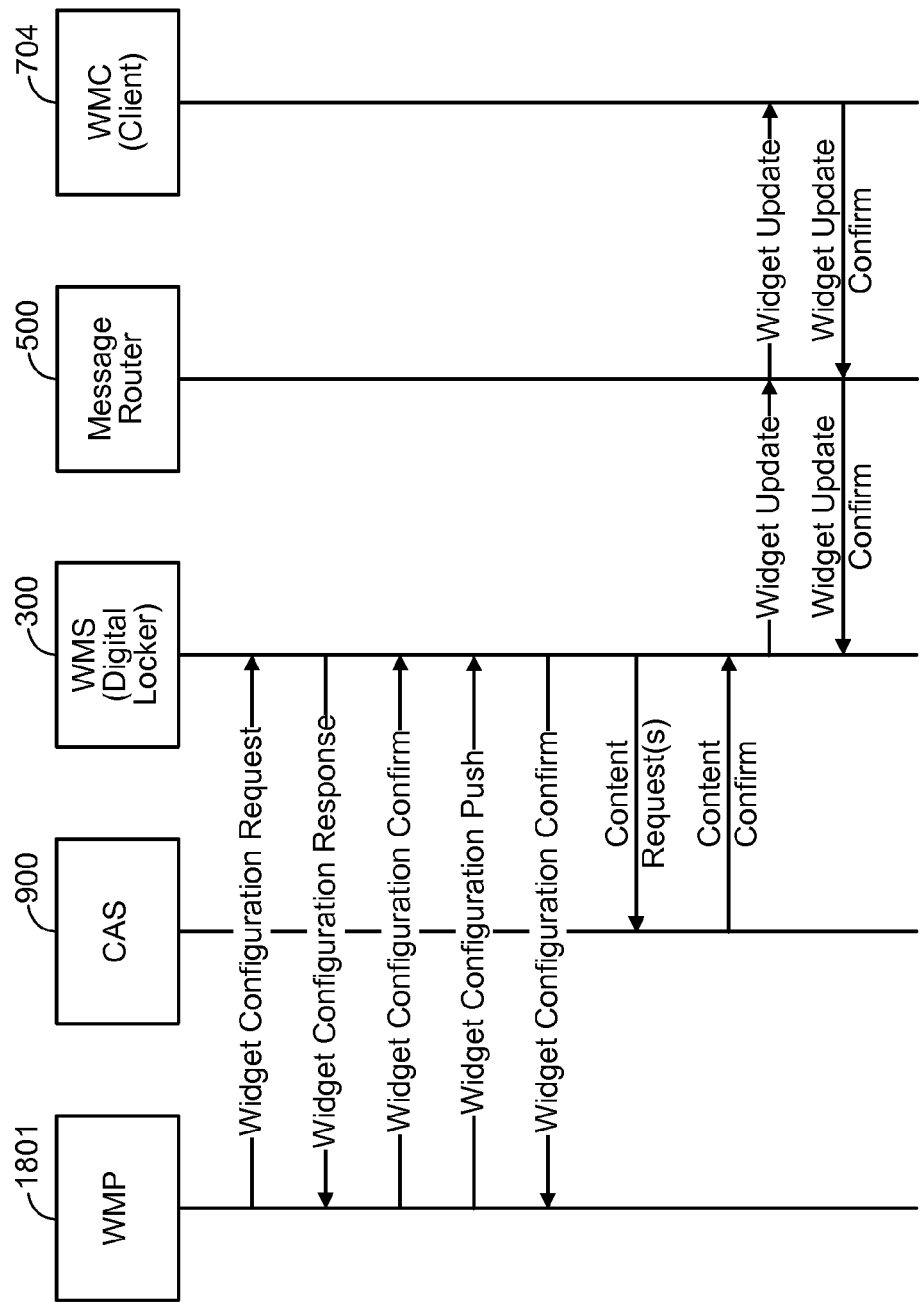
FIG. 18 is a call flow relating to an aspect of selecting and updating a mobile widget in the system of FIG. 1.

Referring to FIGS. 18-23, according to some aspects, some non-limiting examples of call or messages flows are listed for various scenarios. Referring to FIG. 18, for example in one aspect, a high level call flow relates to a widget management portal (WMP)-originated selection and configuration of a new mobile widget. In particular, WMP 1801 interacts with WMS 300 to select and configure the mobile widget. The WMS 300 interacts with CAS 900 to obtain the content for the mobile widget. Additionally, the WMS 300 forwards the mobile widget and/or the content update for the mobile widget to the WMC 704 via the message router.

Figure 19:
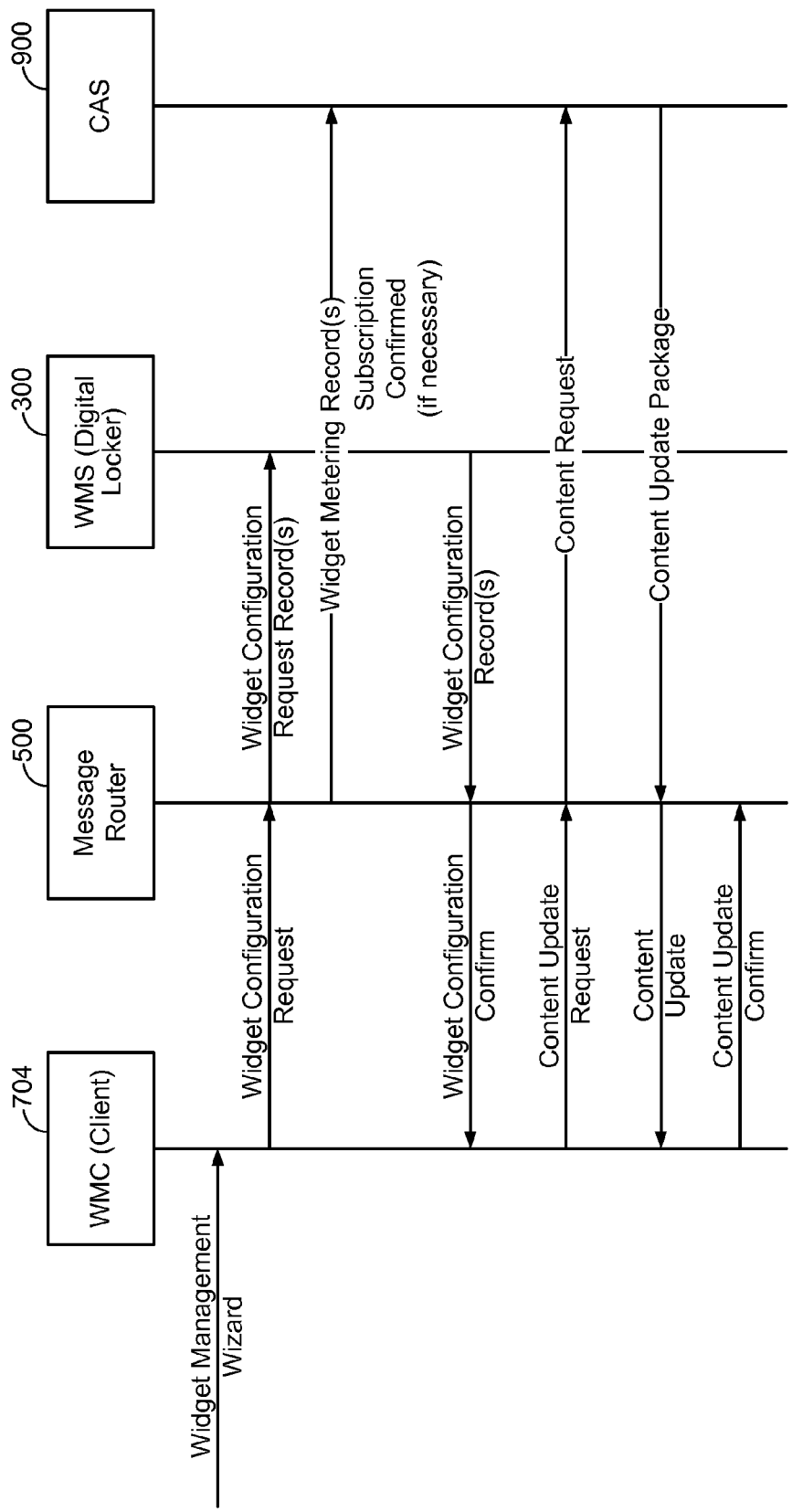
FIG. 19 is a call flow relating to an aspect of selecting and updating a mobile widget in the system of FIG. 1.

Referring to FIG. 19, for example in one aspect, a high level call flow relates to a WMC-originated selection, configuration and updating of a mobile widget. In particular, WMC 704 interacts with WMS 300 to select and configure the mobile widget. The WMS 300 interacts with CAS 900 to obtain the content for the mobile widget. Further, the WMC 704 may request a content update for the mobile widget from the CAS 900, which responds with the updated content, which the WMC 704 confirms receiving.

Figure 20:
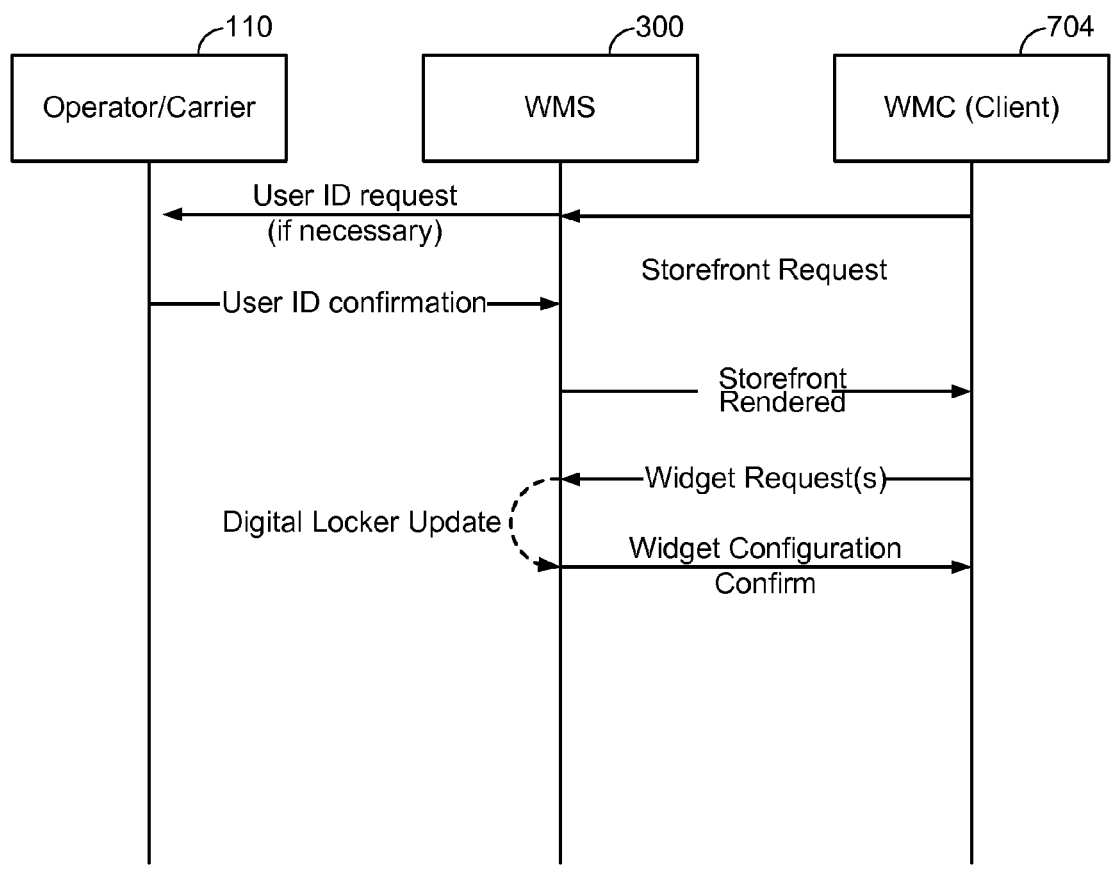
FIG. 20 is a call flow of relating to an aspect of operator/carrier control of access to mobile widgets in the system of FIG. 1.

Referring to FIG. 20, for example in one aspect, a high level call flow relates to a WMC 704 accessing a web storefront in the WMS 300, wherein the operator/carrier 110 authorizes the access. In particular, the WMC 704 requests access to the storefront from the WMS 300, which verifies with the operator/carrier 110 that WMC 704 is authorized for such access. For example, the verification may include passing an identifier or a credential associated with the WMC 704 or the end user to a content management server or authorization server of the operator/carrier to determine if WMC is authorized. Upon receiving an authorization, WMS 300 is then able to provide WMC 704 with access to the storefront and allows subsequent interaction for downloading of mobile widgets.

Figure 21:
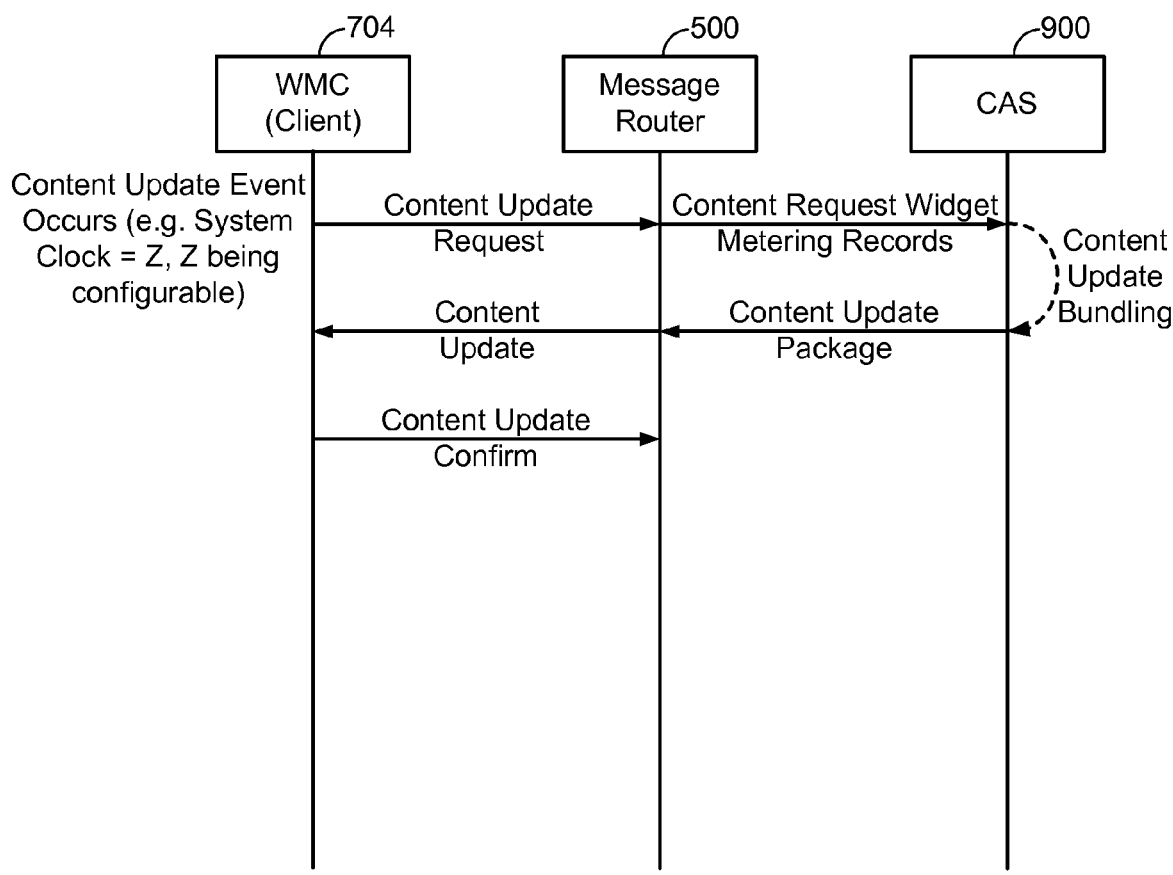
FIG. 21 is a call flow of relating to an aspect of updating a mobile widget in the system of FIG. 1.

Referring to FIG. 21, for example in one aspect, a high level call flow relates to a content update requested by a WMC. In particular, based on the occurrence of a content update event, WMC 704 sends a content update request via the message router 500 to the CAS 900. The CAS 900 bundles the corresponding content update and transmit it to the WMC 704 via the message router 500. It should be noted that in one example, rather than being event driven, the content update request may be user initiated. Additionally, it should also be noted that WMC 704 may package metering/tracking data along with the content update request. In this case, CAS 900 is operable to route the metering/tracking data to other infrastructure elements, such as the analytics component 1200 of backend system 101 and/or the advertisement serving platform 1000.

Figure 22:
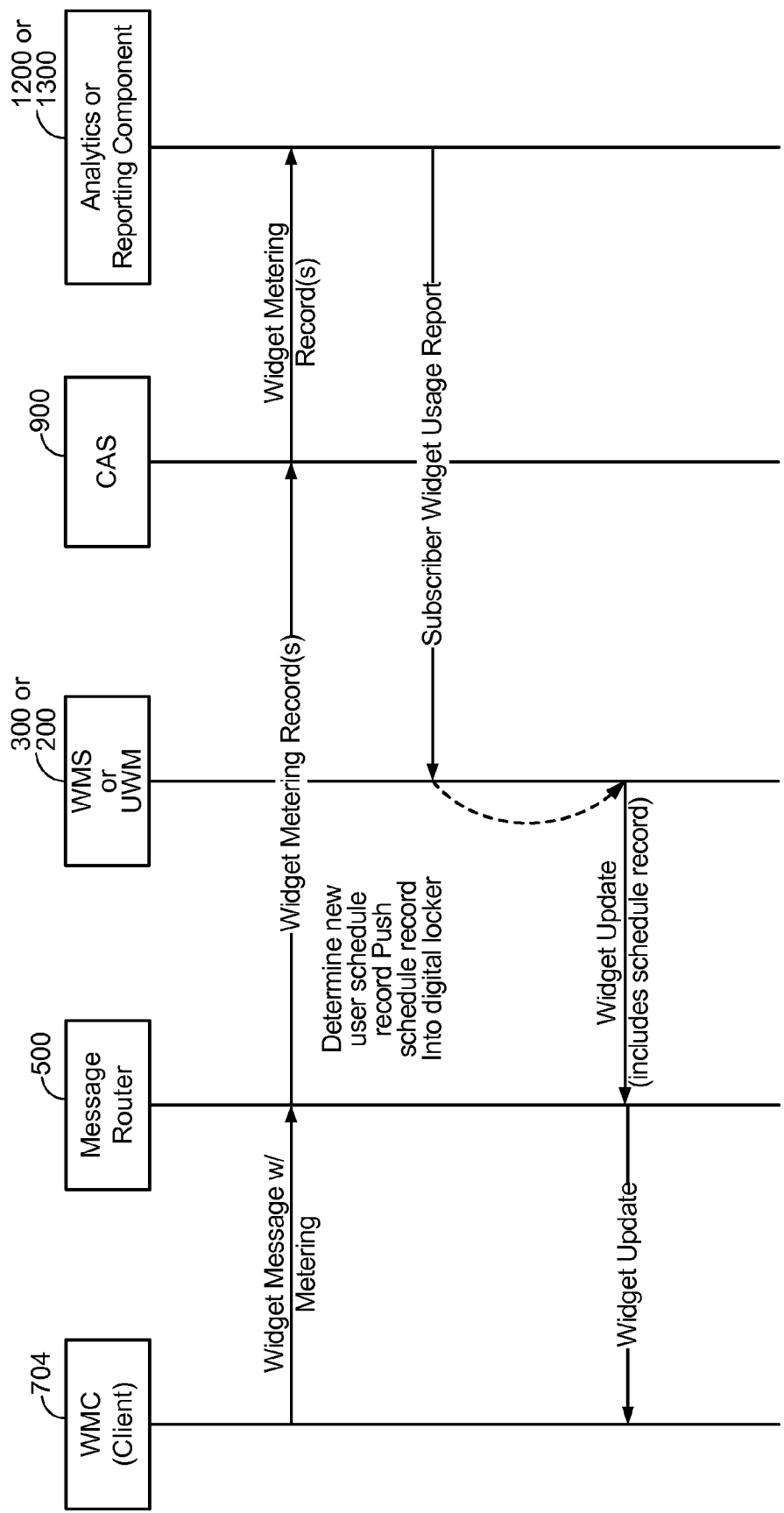
FIG. 22 is a call flow of relating to an aspect of adjusting a content update schedule for a mobile widget or an end user in the system of FIG. 1.

Referring to FIG. 22, for example in one aspect, a high level call flow relates to a reporting of widget metering/tracking data and a corresponding adjustment of a widget update schedule based on the reported metering/tracking data. In particular, WMC 704 transmits a widget message that includes metering/tracking data to CAS 900 via message router 500. CAS 900 is operable to route the metering/tracking data to other infrastructure elements, such as the analytics component 1200 and the reporting component 1300 in this case. The analytics and reporting components 1200 and 1300 then determine usage data based on the reported metering/tracking data, which is provided as an input to the WMS 300 and/or the UWM 200 for use in determining content update schedules. Based on the usage data, a new update schedule is determined for one or more users, and/or for one or more mobile widgets. The new update schedule is stored at the WMS 300 and/or the UWM 200, and is further communicated to the WMC 704 via the message router 500. Thus, a new update schedule is effected based on an analysis of the reported metering/tracking data provided by WMC 704.

Figure 23:
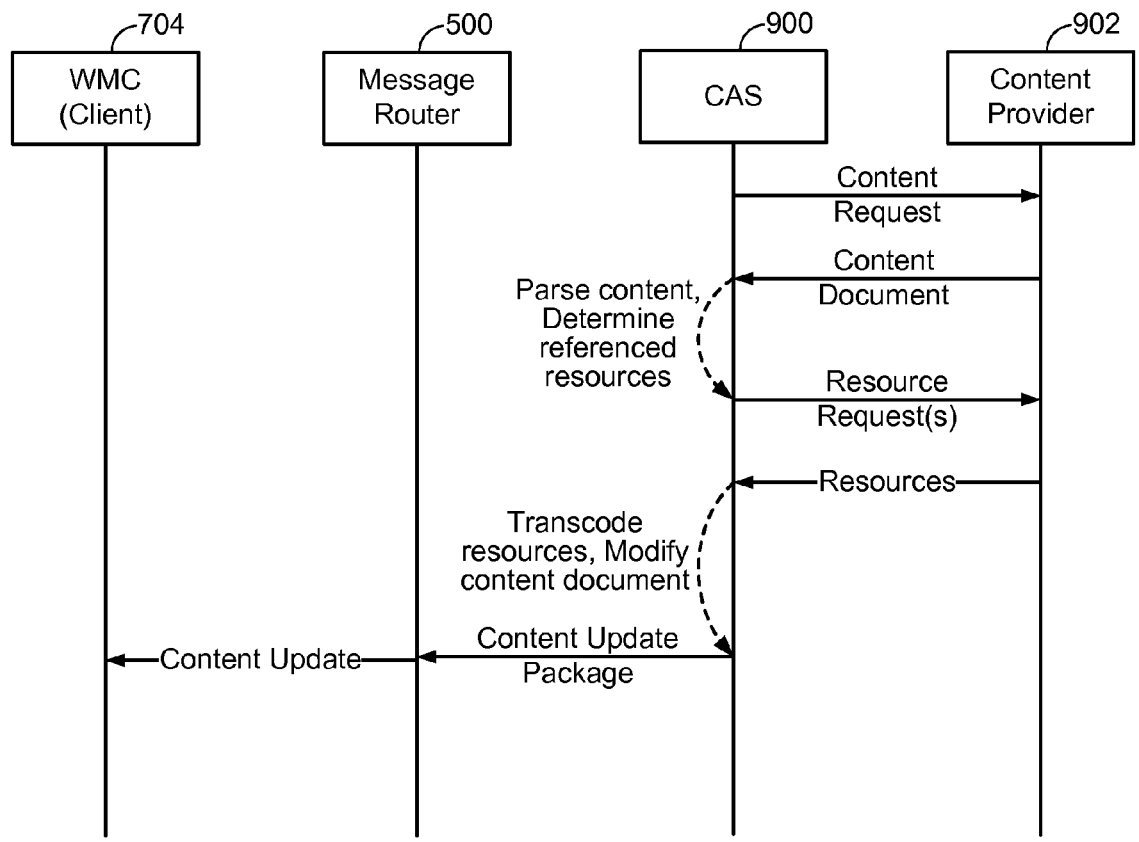
FIG. 23 is a call flow of relating to an aspect of updating a mobile widget in the system of FIG. 1.

Referring to FIG. 23, for example in one aspect, a high level call flow relates to the CAS providing WMC with a content update. In particular, CAS 900 transmits a content request to a content provider 902, who responds with a content document. The content document may include various updated content, as well as references to resources for further content updates. The CAS 900 parses the content document and, if necessary, requests the additional resources from the content provider 902. Upon receiving the requested resources, the CAS 900 transforms the resources and the other content from the content document into an update package for delivery to WMC 704. Upon completing the transformation, the CAS 900 forwards the content update packet to the WMC 704 via the message router 500.

Transport Optimization

Since over-the-air throughput of wireless interface 106 may be limited, and also may be variable, the described aspects, such as CAS 900, may be configured to be as efficient as possible in content delivery. Efficient content delivery may become even more desirable when several different transport mechanisms (e.g. SMS, HTTP (web) connection, IP socket, etc.) are utilized for a service.

In some aspects, a compact protocol may be utilized to support widget content delivery. For instance, unlike the web browser where a full URL is normally sent upstream when the user desires to navigate to a particular web source, a mobile widget service can send a simple widget identifier when a content update is desired. Moreover, widget packages can be flattened and encoded, thus allowing for efficient transmission of widget scripts over-the-air.

In one aspect, for example, data compression may be utilized for transport optimization. Many of the content feeds for mobile widgets come in the form of XML files, which are ASCII-based and are therefore highly compressible with lossless compression algorithms, such as but not limited to a Lempel-Ziv algorithm, a Lempel-Ziv-Welch algorithm, a Lempel-Ziv-Markov algorithm, arithmetic algorithms, and a Huffman algorithm. Additionally, the computational efficiency of data compression can be improved by utilizing a schema-aware compression, which separates the underlying structural schema, such as an XML schema, from the information to be compressed.

In addition, delta compression schemes can be used to further improve efficiency in transporting content for updates, particularly if the updates are provided multiple times per day. For example, consider an RSS feed XML page for the New York Times website. The source file of 8.74 kB may be compressed to 2.73 kB using a data compression scheme. However, if we assume, for instance, that only one news item had changed from a previous update, then resending the whole file may be avoided and instead just enough metadata to update the previous file can be sent. As such, in one aspect, only a delta content update is sent, wherein the delta content update represents the difference between the prior content update and the current content update. A benefit in this case is to save on decompression computation at the wireless communication device. In another aspect, the data compression scheme may be applied to the delta content update to further reduce its size. In this case, for example, one delta item from the RSS feed may be 633 bytes, which may be further compressed by the data compression scheme, such as to a size of 499 bytes.

A hybrid compression scheme may refer to any scheme that combines different modes of compression. For example, one hybrid compression scheme combines data compression and delta compression. Another hybrid compression scheme, for example, combines schema-aware compression and delta compression. It should be noted that many other possible combinations of compression schemes are possible.

Figure 24:
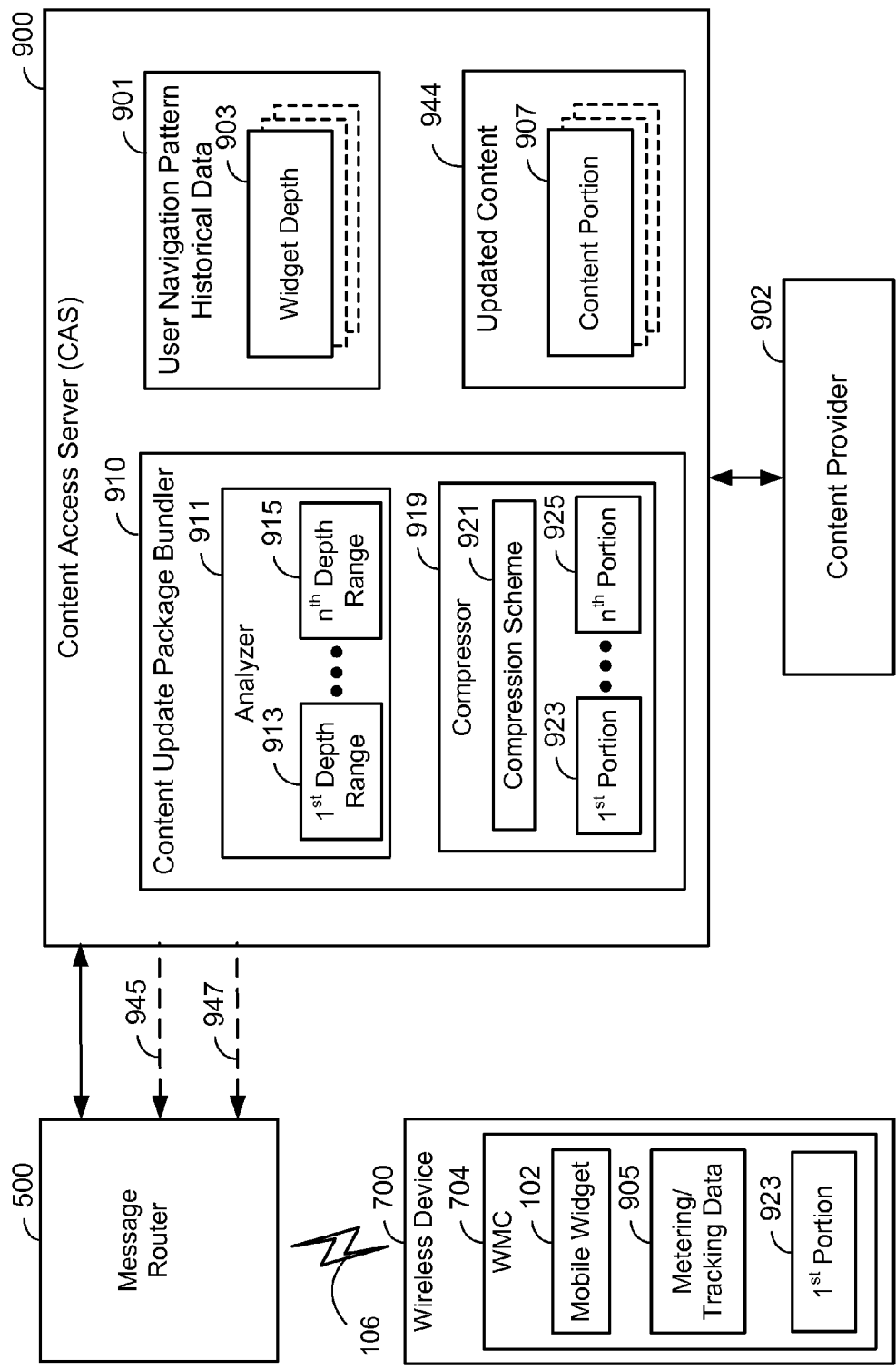
FIG. 24 is a schematic diagram of an aspect of optimizing transport of updated content in the system of FIG. 1.
Figures 25, 26:
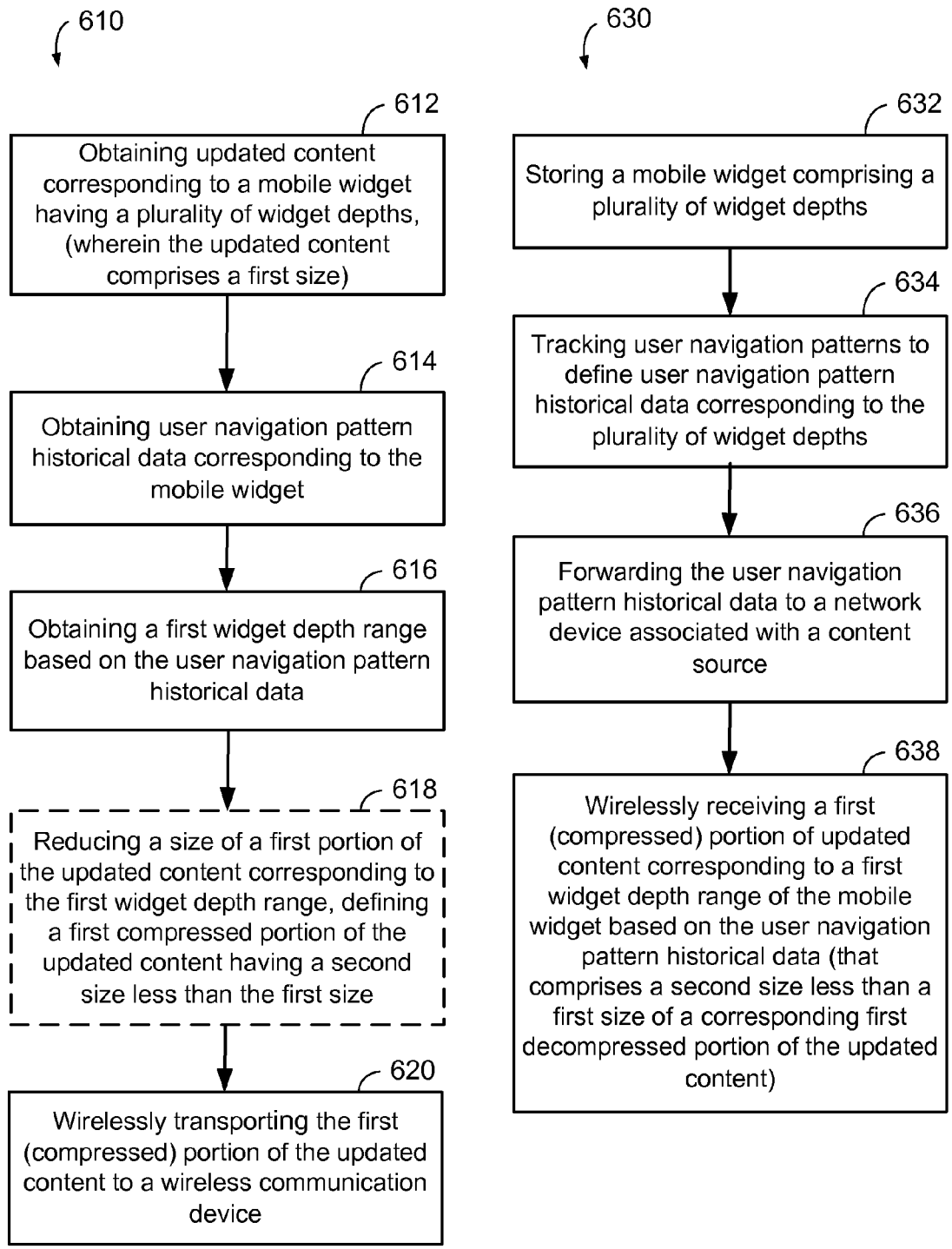
FIG. 25 is a flow diagram of an aspect of a method of optimizing transport of updated content in the system of FIG. 1.
FIG. 26 is a flow diagram of an aspect of a method of optimizing transport of updated content in the system of FIG. 1.

Referring to FIGS. 24-26, in one aspect, apparatus, and methods for the transport of mobile widget content may be further optimized by taking into account widget depth, or widget level or layer content interaction. In one aspect, widget depth refers to the number of clicks into a widget from the widget wall that is possible before the user's experience within the widget is terminated. Increasing the widget depth as seen by the end user may result in improved spectral efficiency, e.g. in improved utilization of the capacity or bandwidth of wireless interface 106 (FIG. 1). Events that could terminate the user's experience in the widget are (a) no more views within the widget are available, or (b) the user is transferred to another application such as a browser to view additional content. Event (b) can be particularly problematic if the user is not able to transition back from the other application into the widget experience. For example, different widget depths for a typical news site RSS feed widgets are shown in Table 1. In some described aspects, it is desirable to allow for the 3rd click, where a WAP article is usually required, to be rendered within the widget experience. Providing such widget depth within the mobile widget experience may allow for greater flexibility in compression, as standardized web compression may be limited.

TABLE 1

| Widget Depth for Typical RSS-Feed Powered Widget | |
|---|---|
| Widget Depth | Corresponding Content |
| 0 | Compressed mode widget view |
| 1 | List of articles |
| 2 | Individual article with byline |
| 3 | Supporting WAP/HTML/XHTML article |

In addition, user preferences for widget navigation can be tracked and stored, thus allowing for efficient information delivery. For instance, if a user is observed interacting with a widget only to a depth of 2, then content updates could be provided without the supporting WAP articles.

As such, in one aspect, CAS 200 may be operable to receive user navigation pattern historical data 901 that tracks one or more widget depths 903 corresponding to user interaction with one or more mobile widgets 102. For example, user navigation pattern historical data 901 may be part of metering/tracking data 905 collected by WTC 704 and forwarded to CAS 900. Further, CAS 200 may be operable to receive updated content 944 from content provider 902, wherein updated content 944 includes one or more content portions 907 corresponding to one or more widget depths 903 of a respective mobile widget 102.

Additionally, content update package bundler 910 of CAS 900 includes an analyzer module 911 operable to access user navigation pattern historical data 901 and determine one or more (e.g. in the FIG. 1 to n, where n is an integer) depth ranges 913, 915 corresponding to a distribution of recorded user interactions with a respective mobile widget 102. Analyzer module 911 may include one or any combination of logic, fuzzy logic, heuristics, algorithms, neural networks, etc., which may be configurable by operator/carrier 110 (FIG. 1) or another interested party to determine how frequently end user 104 (FIG. 1) interacts with various widget depths and separating such interactions into the one or more depth ranges 913, 915 in a manner to efficiently utilize wireless interface 106.

For example, in one optional aspect, CAS 900 or content update package bundler 910 may utilize the results of analyzer 911 to initiate sending a content update message 945 to wireless device 700, where content update message 945 includes a first portion 907 of updated content 944 corresponding to a first informational hierarchical depth range 913 based on the user navigation pattern historical data 901. For instance, referring to Table 1, if a user is observed interacting with a widget only to a depth of 2, then content update message 945 could be provided with a first portion of updated content 944 corresponding to the depth of 2, e.g. the update message would include the list of articles and individual articles with byline, but would not include the supporting WAP/HTML/XHTML article. Correspondingly, subsequent content update messages may include a second portion of updated content 944 corresponding to a second informational hierarchical depth range based on the user navigation pattern historical data 901, e.g. continuing with the example of Table 1, the subsequent update may include only the supporting WAP/HTML/XHTML article, thereby supplementing the previously-sent content update message 945.

Moreover, content update package bundler 910 may include a compression module 919 operable to apply compression scheme 921 to updated content 944. Compression scheme 921 may include any one or any combination of compression schemes, such as those schemes described above. In particular, based on the results of analyzer module 911, compressor module 919 is operable to apply compression scheme 921 to one or more content portions 907 corresponding to one or more widget depth ranges 913, 915 to generate one or more (e.g. in the FIG. 1 to n, where n is an integer) compressed content portions 923, 925. For example, each compressed content portion 923, 925 may be subject to delta compression, or to data compression, or to both delta compression and data compression. As such, CAS 900 is operable to separately transmit to WMC 704 the one or more compressed content portions 923, 925 in order to optimize the transport efficiency based on user navigation pattern historical data 901 when updating content for a respective mobile widget 102.

For example, in one optional aspect, CAS 900 or content update package bundler 910 may utilize the results of compressor 919 to initiate sending a content update message 947 to wireless device 700, where content update message 947 includes a first compressed portion 923 of updated content 944 corresponding to a first informational hierarchical depth range 913 based on the user navigation pattern historical data 901. For instance, referring to Table 1, if a user is observed interacting with a widget only to a depth of 2, then content update message 947 could be provided with a first compressed portion 923 of updated content 944 corresponding to the depth of 2, e.g. the update message would include a compressed version of the list of articles and individual articles with byline, but would not include the supporting WAP/HTML/XHTML article. Correspondingly, subsequent content update messages may include a second portion of updated content 944 corresponding to a second informational hierarchical depth range based on the user navigation pattern historical data 901, e.g. continuing with the example of Table 1, the subsequent update may include only the supporting WAP/HTML/XHTML article, thereby supplementing the previously-sent content update message 947.

Referring to FIG. 25, in one aspect, a method 610 operable on a network device for updating content for a mobile widget includes obtaining updated content corresponding to a mobile widget having a plurality of widget depths at 612. For example, the updated content may be collected from a content provider, and the updated content may have a number of content portions respectively corresponding to a number of widget depths of a corresponding mobile widget. In some optional aspects, as indicated by the parenthesis at 612, the updated content comprises a first size.

The method further includes obtaining user navigation pattern historical data corresponding to the mobile widget, wherein the user navigation pattern historical data corresponds to the plurality of widget depths at 614. For example, the user navigation pattern historical data may be received from a widget management client on a wireless device operating a respective mobile widget. Further, the user navigation pattern historical data may correspond to one user, or to a plurality of users operating the same mobile widget. Additionally, the user navigation pattern historical data may define user interactions with each widget depth of a respective mobile widget.

Also, the method includes obtaining a first widget depth range for inclusion in a first content update message, wherein the first widget depth range is based on the user navigation pattern historical data at 616. For example, the first widget depth range may be determined based on analyzing the user navigation pattern historical data and determining frequencies at which each widget depth is accessed, and then dividing the widget depths into ranges based on the frequencies.

Optionally at 618, as indicated by the dashed lines, the method further includes reducing a size of a first portion of the updated content corresponding to the first widget depth range according to a compression scheme, thereby defining a first compressed portion of the updated content having a second size less than the first size. For example, the portion of the content corresponding to a first range of widget depths may be identified, and then a compression scheme applied thereto, such as delta compression, data compression, or a combination of both.

Additionally, the method includes wirelessly transporting the first (optionally, compressed) portion of the updated content in the first content update message to a wireless communication device corresponding to the mobile widget (Block 620). For example, in order to efficiently utilize wireless bandwidth when updating one or more mobile widgets, the most frequently reviewed portions of the updated content are sent first, and the remaining portions of content may be sent later or only sent upon request.

Referring to FIG. 26, in one aspect, a method 630 operable on a wireless device for updating content for a mobile widget includes storing a mobile widget on a wireless communication device, where the mobile widget comprises a plurality of widget depths at 632. For example, the mobile widget may be downloaded from a widget management system of a wireless network operator.

Further, the method includes tracking user navigation patterns corresponding to the mobile widget to define user navigation pattern historical data, wherein the user navigation pattern historical data corresponds to the plurality of widget depths at 634. For example, a widget management client on a wireless device operating a respective mobile widget may track user interactions with each widget depth of a respective widget.

Also, the method includes forwarding the user navigation pattern historical data to a network device associated with a content source at 636. For example, the widget management client on the wireless device is operable to forward this information to a network device, such as a content access server or another device interested in such data.

Additionally, the method includes wirelessly receiving a first (optionally, compressed) portion of updated content in a first content update message from the content source at 638. In this case, in one aspect, the first portion of updated content corresponds to a first widget depth range of the mobile widget based on the user navigation pattern historical data. Also, in another aspect, the first portion of the updated content is compressed according to a compression scheme and thus comprises a second size less than a first size of a corresponding first decompressed portion of the updated content. For example, in order to efficiently utilize wireless bandwidth when updating one or more mobile widgets, the most frequently reviewed portions of the updated content are sent first, and the remaining portions of content may be sent later or only sent upon request.

Figure 27:
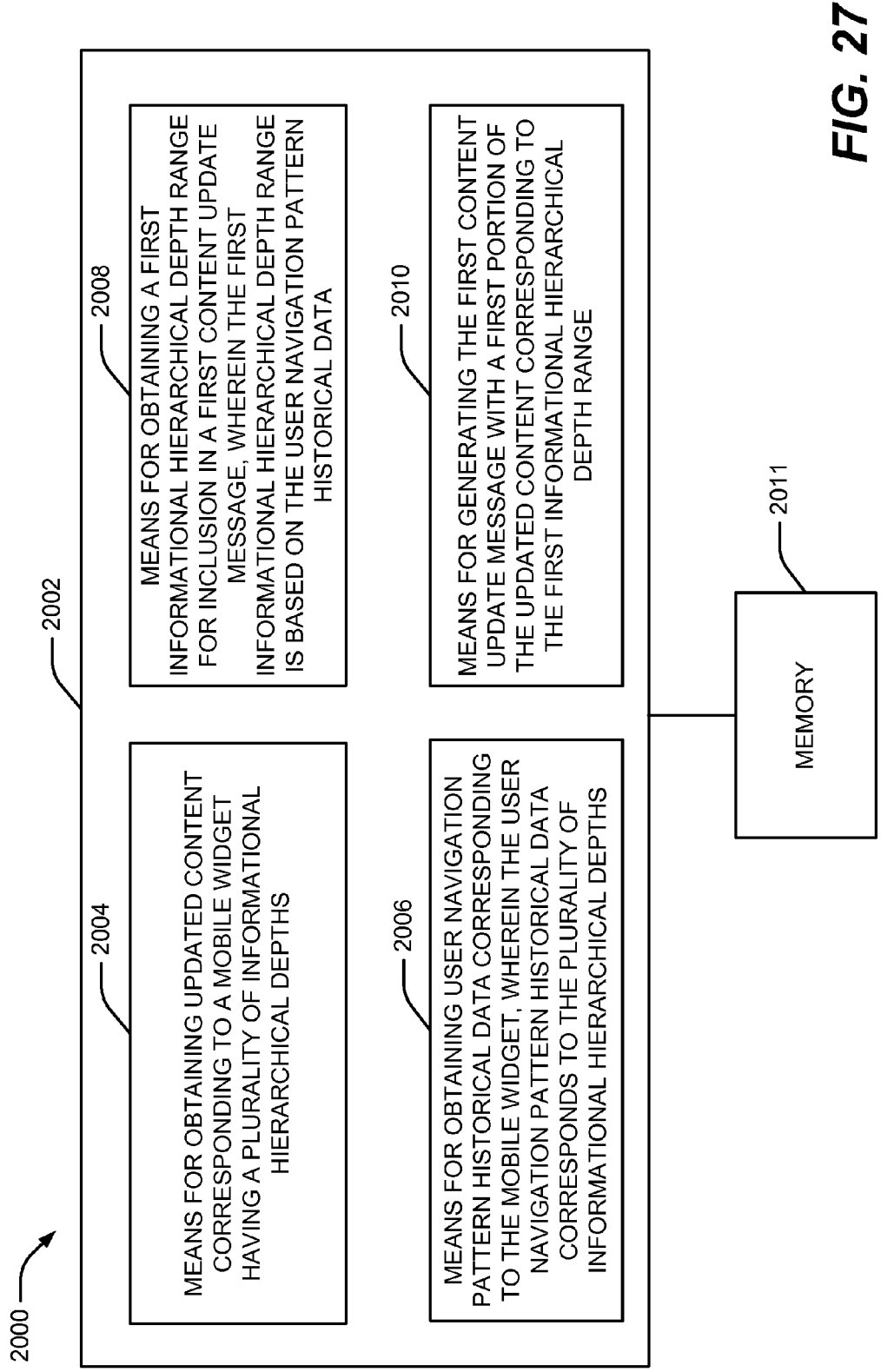
FIG. 27 is an illustration of an example system that facilitates updating content for a mobile widget.

Turning to FIG. 27, illustrated is a system 2000 that updates content for a mobile widget. System 2000 can reside within a multiplexer, transmitter, mobile device, etc., for instance. As depicted, system 2000 includes functional blocks that can represent functions implemented by a processor, software, or combination thereof (e.g., firmware). System 2000 includes a logical grouping 2002 of electrical components that facilitate updating content for a mobile widget. Logical grouping 2002 can include means 2004 for obtaining updated content corresponding to a mobile widget having a plurality of informational hierarchical depths. Moreover, logical grouping 2002 can include means 2006 for obtaining user navigation pattern historical data corresponding to the mobile widget, wherein the user navigation pattern historical data corresponds to the plurality of informational hierarchical depths 2006. Further, logical grouping 2002 can include means 2008 for obtaining a first informational hierarchical depth range for inclusion in a first content update message, wherein the first informational hierarchical depth range is based on the user navigation pattern historical data. Also, logical grouping 2002 can include means 2010 for generating the first content update message with a first portion of the updated content corresponding to the first informational hierarchical depth range. Additionally, system 2000 can include a memory 2011 that retains instructions for executing functions associated with electrical components 2004, 2006, 2008, and 2010. While shown as being external to memory 2011, it is to be understood that electrical components 2004, 2006, 2008, and 2010 can exist within memory 2011.

Figure 28:
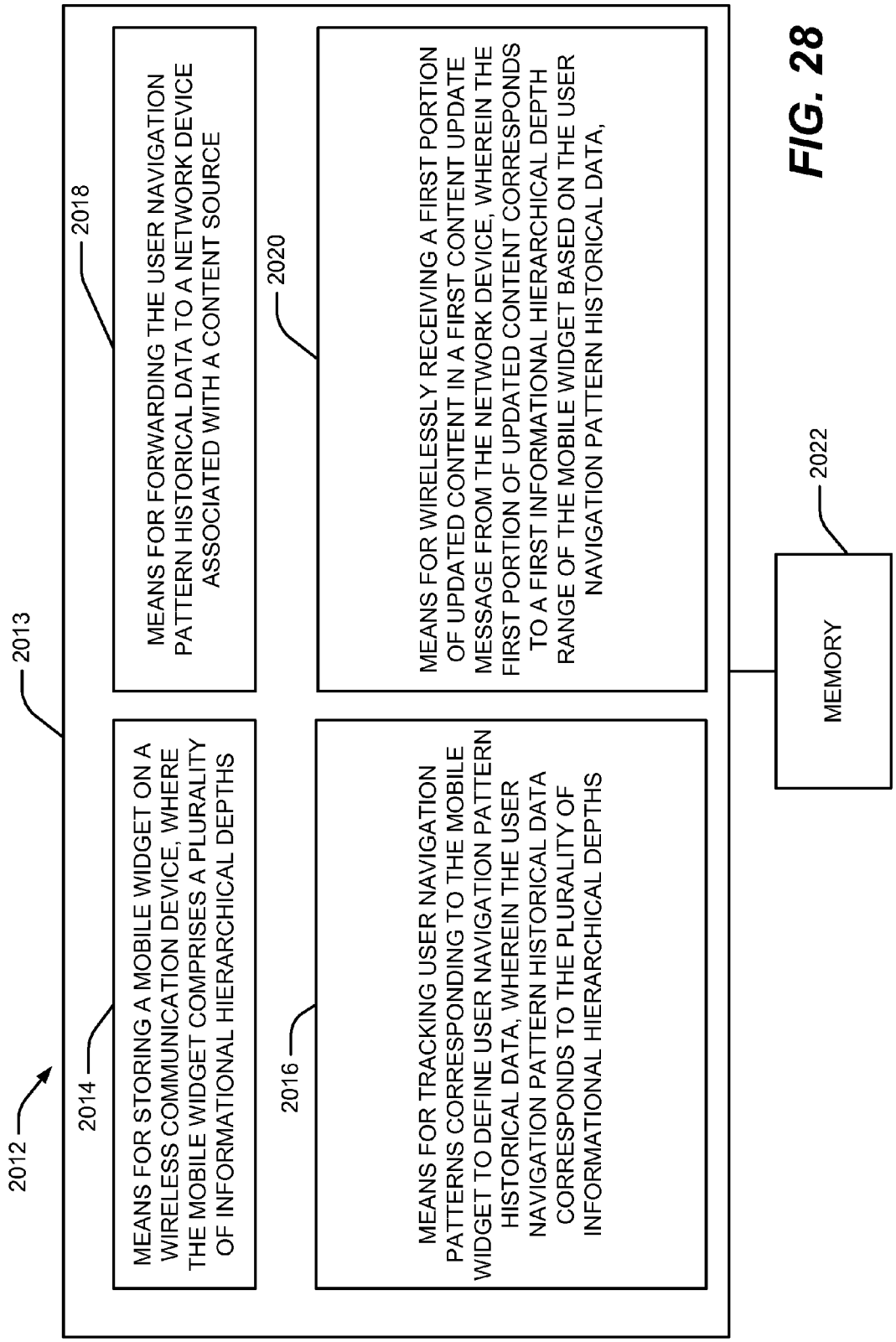
FIG. 28 is an illustration of an example system that facilitates updating content for a mobile widget on a wireless communication device.

Referring now to FIG. 28, illustrated is a system 2012 that updates content for a mobile widget on a wireless communication device. System 2012 can reside within a multiplexer, transmitter, mobile device, etc., for instance. As depicted, system 2012 includes functional blocks that can represent functions implemented by a processor, software, or combination thereof (e.g., firmware, etc.). System 2012 includes a logical grouping 2013 of electrical components that facilitate updating content for a mobile widget on a wireless communication device. Logical grouping 2013 can include means 2014 for storing a mobile widget on a wireless communication device, where the mobile widget comprises a plurality of informational hierarchical depths. In addition, logical grouping 2013 can include means 2016 for tracking user navigation patterns corresponding to the mobile widget to define user navigation pattern historical data, wherein the user navigation pattern historical data corresponds to the plurality of informational hierarchical depths. Moreover, logical grouping 2013 can include means 2018 for forwarding the user navigation pattern historical data to a network device associated with a content source. Further, logical grouping 2012 can include means 2020 for wirelessly receiving a first portion of updated content in a first content update message from the network device, wherein the first portion of updated content corresponds to a first informational hierarchical depth range of the mobile widget based on the user navigation pattern historical data. Additionally, system 2012 can include a memory 2022 that retains instructions for executing functions associated with electrical components 2014, 2016, 2018, and 2020. While shown as being external to memory 2022, it is to be understood that electrical components 2014, 2016, 2018, and 2020 can exist within memory 2022.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of updating content for a mobile widget, comprising:
    obtaining updated content corresponding to the mobile widget having a plurality of informational hierarchical depths;
    obtaining user navigation pattern historical data that characterizes a distribution of the plurality of informational hierarchical depths to which a user has previously navigated via the mobile widget;
    obtaining a first informational hierarchical depth range for inclusion in a first content update message, wherein the first informational hierarchical depth range is based on the user navigation pattern historical data; and
    generating the first content update message with a first portion of the updated content corresponding to the first informational hierarchical depth range.

2. The method of claim 1, wherein the updated content comprises a first size, further comprising reducing a size of the first portion of the updated content corresponding to the first informational hierarchical depth range according to a compression scheme, thereby defining a first compressed portion of the updated content having a second size less than the first size.

3. The method of claim 2, further comprising initiating wireless transport of the first compressed portion of the updated content in the first content update message to a wireless communication device corresponding to the mobile widget.

4. The method of claim 3, further comprising:
    receiving a content update request comprising a mobile widget identifier corresponding to the mobile widget and excluding a universal resource identifier (URI) corresponding to the updated content, wherein initiating wireless transport of the first compressed portion of the updated content in the first content update message is based on the receiving of the content update request.

5. The method of claim 3, wherein initiating wireless transport of the first compressed portion of the updated content in the first content update message is based on a content update schedule determined according to a wireless network operator-related update consideration comprising either temporal network usage data or temporal network capacity data.

6. The method of claim 3, further comprising:
    receiving a content update request based on a user input or based on a content update schedule, wherein initiating wireless transport of the first compressed portion of the updated content in the first content update message is based on the receiving of the content update request.

7. The method of claim 3, further comprising:
    wherein a second portion of the updated content corresponds to a second informational hierarchical depth range different from the first informational hierarchical depth range, wherein the second portion of the updated content has a first size;
    reducing a size of the second portion of the updated content according to the compression scheme, thereby defining a second compressed portion of the updated content having a second size less than the first size; and
    initiating wireless transport of the second compressed portion of the updated content in a second content update message to the wireless communication device corresponding to the mobile widget.

8. The method of claim 2, further comprising obtaining a prior content update corresponding to the mobile widget, and wherein the compression scheme comprises a delta compression scheme operable on the prior content update and the updated content.

9. The method of claim 2, wherein the updated content comprises compressible data within a structural schema, and wherein the compression scheme comprises a selected schema-specific compression scheme corresponding to the structural schema and operable to identify the structural schema and separate the compressible data from the structural schema and compress the compressible data.

10. The method of claim 1, further comprising:
    obtaining a prior content update corresponding to the mobile widget; and
    applying a delta compression scheme to the updated content based on the prior content update to define a delta content update having a first size; reducing a size of a first portion of the delta content update corresponding to the first informational hierarchical depth range according to a data compression scheme, thereby defining a first compressed delta content portion of the delta content update having a second size less than the first size; and
    wherein generating the first content update message further comprises generating the first portion of the updated content to comprise the first compressed delta content portion.

11. The method of claim 1, wherein the first informational hierarchical depth range corresponds to a set of depth options for insertion of the first portion of the updated content within the plurality of informational hierarchical depths of the mobile widget.

12. The method of claim 11, wherein the first informational hierarchical depth range excludes, from the set of depth options, one or more depth options from the plurality of informational hierarchical depths that the user navigation pattern historical data characterizes as failing to exceed a distribution threshold of previous navigation by the user via the mobile widget.

13. The method of claim 11, wherein the first informational hierarchical depth range includes, within the set of depth options, one or more depth options from the plurality of informational hierarchical depths that the user navigation pattern historical data characterizes as exceeding a distribution threshold of previous navigation by the user via the mobile widget.

14. The method of claim 11,
    wherein the updated content is obtained for insertion within the mobile widget at an unspecified target depth within the plurality of informational hierarchical depths.

15. The method of claim 1, wherein the first informational hierarchical depth range corresponds to a target depth range at which the first portion of the updated content is to be inserted within the mobile widget, the first informational hierarchical depth range being customized to the user based on the user navigation pattern historical data so as to conform to a manner by which the user has previously navigated within the mobile widget.

16. At least one processor configured to update content for a mobile widget, comprising:

a first module for obtaining updated content corresponding to the mobile widget having a plurality of informational hierarchical depths, wherein the updated content comprises a first size; and a second module for obtaining user navigation pattern historical data that characterizes a distribution of the plurality of informational hierarchical depths to which a user has previously navigated via the mobile widget;

a third module for obtaining a first informational hierarchical depth range for inclusion in a first content update message, wherein the first informational hierarchical depth range is based on the user navigation pattern historical data; and a fourth module for generating the first content update message with a first portion of the updated content corresponding to the first informational hierarchical depth range.

17. The at least one processor of claim 16, further comprising:

a fifth module for reducing a size of the first portion of the updated content corresponding to the first informational hierarchical depth range according to a compression scheme, thereby defining a first compressed portion of the updated content having a second size less than the first size.

18. The at least one processor of claim 17, further comprising:

a sixth module for initiating wireless transport of the first compressed portion of the updated content in the first content update message to a wireless communication device corresponding to the mobile widget.

19. A non-transitory computer-readable medium comprising:

at least one instruction for causing a computer to obtain updated content corresponding to a mobile widget having a plurality of informational hierarchical depths, wherein the updated content comprises a first size; and at least one instruction for causing the computer to obtain user navigation pattern historical data that characterizes a distribution of the plurality of informational hierarchical depths to which a user has previously navigated via the mobile widget;

at least one instruction for causing the computer to obtain a first informational hierarchical depth range for inclusion in a first content update message, wherein the first informational hierarchical depth range is based on the user navigation pattern historical data; and at least one instruction for causing the computer to generate the first content update message with a first portion of the updated content corresponding to the first informational hierarchical depth range.

20. The non-transitory computer-readable medium of claim 19 further comprising; at least one instruction for causing the computer to reduce a size of the first portion of the updated content corresponding to the first informational hierarchical depth range according to a compression scheme, thereby defining a first compressed portion of the updated content having a second size less than the first size.

21. The non-transitory computer-readable medium of claim 20 further comprising; at least one instruction for causing the computer to initiate wireless transport of the first compressed portion of the updated content in the first content update message to a wireless communication device corresponding to the mobile widget.

22. A network device for updating content for a mobile widget, comprising:

means for obtaining updated content corresponding to the mobile widget having a plurality of informational hierarchical depths, wherein the updated content comprises a first size;

means for obtaining user navigation pattern historical data that characterizes a distribution of the plurality of informational hierarchical depths to which a user has previously navigated via the mobile widget;

means for obtaining a first informational hierarchical depth range for inclusion in a first content update message, wherein the first informational hierarchical depth range is based on the user navigation pattern historical data; and means for generating the first content update message with a first portion of the updated content corresponding to the first informational hierarchical depth range.

23. A network device for updating content for a mobile widget, comprising:

a memory comprising a content update package bundler; and a processor in communication with the memory and operable to execute a content update manager and the content update package bundler, wherein the content update package bundler is operable to obtain updated content corresponding to the mobile widget having a plurality of informational hierarchical depths, wherein the content update manager is further operable to obtain user navigation pattern historical data that characterizes a distribution of the plurality of informational hierarchical depths to which a user has previously navigated via the mobile widget, wherein the content update package bundler is further operable to obtain a first informational hierarchical depth range for inclusion in a first content update message, wherein the first informational hierarchical depth range is based on the user navigation pattern historical data, and wherein the content update package bundler is further operable to generate the first content update message with a first portion of the updated content corresponding to the first informational hierarchical depth range.

24. The network device of claim 23, wherein the updated content comprises a first size, wherein the content package bundler is operable to reduce a size of the first portion of the updated content corresponding to the first informational hierarchical depth range according to a compression scheme, thereby defining a first compressed portion of the updated content having a second size less than the first size.

25. The network device of claim 24, wherein the content update package bundler is further operable to initiate wireless transport of the first compressed portion of the updated content in the first content update message to a wireless communication device corresponding to the mobile widget.

26. The network device of claim 25, wherein the content update package bundler is further operable to receive a content update request comprising a mobile widget identifier corresponding to the mobile widget and excluding a universal resource identifier (URI) corresponding to the updated content, wherein the initiating of the wireless transport of the first compressed portion of the updated content in the first content update message is based on the receiving of the content update request.

27. The network device of claim 25, wherein the content update package bundler is further operable to initiate the wireless transport of the first compressed portion of the updated content in the first content update message based on a content update schedule determined according to a wireless network operator-related update consideration comprising either temporal network usage data or temporal network capacity data.

28. The network device of claim 25, wherein the content update package bundler is further operable to receive a content update request based on a user input or based on a content update schedule, wherein initiating the wireless transport of the first compressed portion of the updated content in the first content update message is based on the receiving of the content update request.

29. The network device of claim 24, wherein the content update package bundler is further operable to obtain a prior content update corresponding to the mobile widget, and wherein the compression scheme comprises a delta compression scheme operable on the prior content update and the updated content.

30. The network device of claim 24, wherein the updated content comprises compressible data within a structural schema, and wherein the compression scheme comprises a selected schema-specific compression scheme corresponding to the structural schema and operable to identify the structural schema and separate the compressible data from the structural schema and compress the compressible data.

31. The network device of claim 23, wherein the content update package bundler is further operable to:
obtain a prior content update corresponding to the mobile widget;
apply a delta compression scheme to the updated content based on the prior content update to define a delta content update having a first size; and
reduce a size of a first portion of the delta content update corresponding to the first informational hierarchical depth range according to a data compression scheme, thereby defining a first compressed delta content portion of the delta content update having a second size less than the first size, wherein the first portion of the updated content in the first content update message comprises the first compressed delta content portion.

32. The network device of claim 23, wherein a second portion of the updated content corresponds to a second informational hierarchical depth range different from the first informational hierarchical depth range, wherein the second portion of the updated content has a first size, wherein the content update package bundler is further operable to reduce a size of the second portion of the updated content according to a compression scheme, thereby defining a second compressed portion of the updated content having a second size less than the first size, and wherein the content update package bundler is further operable to initiate wireless transport of the second compressed portion of the updated content in a second content update message to the wireless communication device corresponding to the mobile widget.

33. A method of updating content for a mobile widget on a wireless communication device, comprising:
storing the mobile widget on a wireless communication device, where the mobile widget comprises a plurality of informational hierarchical depths;
tracking user navigation patterns corresponding to the mobile widget to define user navigation pattern historical data that characterizes a distribution of the plurality of informational hierarchical depths to which a user has previously navigated via the mobile widget;
forwarding the user navigation pattern historical data to a network device associated with a content source; and
wirelessly receiving a first portion of updated content in a first content update message from the network device, wherein the first portion of updated content corresponds to a first informational hierarchical depth range of the mobile widget based on the user navigation pattern historical data.

34. The method of claim 33, wherein the first portion of the updated content is compressed according to a compression scheme to define a first compressed portion of the updated content, wherein the first compressed portion comprises a second size less than a first size of the corresponding first portion of the updated content, and decompressing the first compressed portion.

35. The method of claim 34, wherein the compression scheme comprises a delta compression scheme, wherein the first compressed portion of the updated content comprises a first delta compressed portion that is compressed by obtaining a prior content update corresponding to the mobile widget, executing the delta compression scheme on the prior content update and the first portion of the updated content to obtain the first delta compressed portion of the updated content, and wherein the method further comprises executing the mobile widget based on the first delta compressed portion of the updated content.

36. The method of claim 34, wherein the compression scheme comprises a data compression scheme, wherein the first compressed portion of the updated content comprises a first data compressed portion, executing the data compression scheme on the first portion of the updated content to obtain the first data compressed portion of the updated content, and wherein the method further comprises executing the mobile widget with the first decompressed portion of the updated content.

37. The method of claim 36, wherein the updated content comprises compressible data within a structural schema, and wherein the data compression scheme comprises a selected schema-specific compression scheme corresponding to the structural schema and operable to identify the structural schema of the first compressed portion of the updated content.

38. The method of claim 33, further comprising:
transmitting a content update request comprising a mobile widget identifier corresponding to the mobile widget and excluding a universal resource identifier (URI) corresponding to the updated content, wherein wirelessly receiving the first portion of the updated content in the first content update message is initiated based on the transmitting of the content update request.

39. The method of claim 33, wherein wirelessly receiving the first portion of the updated content in the first content update message is based on a content update schedule determined according to a wireless network operator-related update consideration comprising either temporal network usage data or temporal network capacity data.

40. The method of claim 33, further comprising:
transmitting a content update request based on a user input or based on a content update schedule, wherein wirelessly receiving the first portion of the updated content in the first content update message is initiated based on the transmitting of the content update request.

41. The method of claim 33, further comprising:
wirelessly receiving a second portion of the updated content in a second content update message, wherein the second portion of the updated content corresponds to the second portion of the updated content having a second informational hierarchical depth range different from the first informational hierarchical depth range.

42. The method of claim 41, wherein the second portion of the updated content is compressed according to a compression scheme to define a second compressed portion of the updated content, wherein the second compressed portion comprises a second size less than a first size of the corresponding second portion of the updated content, and further comprising decompressing the second compressed portion.

43. At least one processor operable to update content for a mobile widget on a wireless communication device, comprising:
   a first module for storing a mobile widget on a wireless communication device, where the mobile widget comprises a plurality of informational hierarchical depths;
   a second module for tracking user navigation patterns corresponding to the mobile widget to define user navigation pattern historical data that characterizes a distribution of the plurality of informational hierarchical depths to which a user has previously navigated via the mobile widget;
   a third module for forwarding the user navigation pattern historical data to a network device associated with a content source; and
   a fourth module for wirelessly receiving a first portion of updated content in a first content update message from the network device, wherein the first portion of updated content corresponds to a first informational hierarchical depth range of the mobile widget based on the user navigation pattern historical data.

44. A non-transitory computer readable medium, comprising:
   at least one instruction operable to cause a computer to store a mobile widget on a wireless communication device, where the mobile widget comprises a plurality of informational hierarchical depths;
   at least one instruction operable to cause the computer to track user navigation patterns corresponding to the mobile widget to define user navigation pattern historical data that characterizes a distribution of the plurality of informational hierarchical depths to which a user has previously navigated via the mobile widget;
   at least one instruction operable to cause the computer to forward the user navigation pattern historical data to a network device associated with a content source; and
   at least one instruction operable to cause the computer to wirelessly receive a first portion of updated content in a first content update message from the network device, wherein the first portion of updated content corresponds to a first informational hierarchical depth range of the mobile widget based on the user navigation pattern historical data.

45. A wireless communication device, comprising:
   means for storing a mobile widget on a wireless communication device, where the mobile widget comprises a plurality of informational hierarchical depths;
   means for tracking user navigation patterns corresponding to the mobile widget to define user navigation pattern historical data that characterizes a distribution of the plurality of informational hierarchical depths to which a user has previously navigated via the mobile widget;
   means for forwarding the user navigation pattern historical data to a network device associated with a content source; and
   means for wirelessly receiving a first portion of updated content in a first content update message from the network device, wherein the first portion of updated content corresponds to a first informational hierarchical depth range of the mobile widget based on the user navigation pattern historical data.

46. A wireless device, comprising:
   a memory comprising a mobile widget and a widget management client, wherein the mobile widget comprises a plurality of informational hierarchical depths;
   a processor in communication with the memory and operable to execute the mobile widget and the widget management client, wherein the widget management client is operable to track user navigation patterns corresponding to the mobile widget to define user navigation pattern historical data that characterizes a distribution of the plurality of informational hierarchical depths to which a user has previously navigated via the mobile widget, and wherein the widget management client is further operable to forward the user navigation pattern historical data to a network device associated with a content source; and
   a communication module operable to wirelessly receive a first portion of updated content in a first content update message from the network device, wherein the first portion of updated content corresponds to a first informational hierarchical depth range of the mobile widget based on the user navigation pattern historical data.

47. The wireless device of claim 46, wherein the first portion of the updated content is compressed according to a compression scheme to define a first compressed portion of the updated content, wherein the first compressed portion comprises a second size less than a first size of the corresponding first portion of the updated content, and wherein the widget management client is further operable to decompress the first compressed portion.

48. The wireless device of claim 47, wherein the compression scheme comprises a delta compression scheme, wherein the first compressed portion of the updated content comprises a first delta compressed portion that is compressed by obtaining a prior content update corresponding to the mobile widget, executing the delta compression scheme on the prior content update and the first compressed portion of the updated content to obtain the first delta compressed portion of the updated content, and wherein the mobile widget is executable based on the first delta compressed portion of the updated content.

49. The wireless device of claim 47, wherein the compression scheme comprises a data compression scheme, wherein the first compressed portion of the updated content comprises a first data compressed portion, executing the data compression scheme on the first portion of the updated content to obtain the first data compressed portion of the updated content, and wherein the widget management client is further operable to execute the mobile widget with the first decompressed portion of the updated content.

50. The wireless device of claim 49, wherein the updated content comprises compressible data within a structural schema, and wherein the data compression scheme comprises a selected schema-specific compression scheme corresponding to the structural schema and operable to identify the structural schema of the first compressed portion of the updated content.

51. The wireless device of claim 46, wherein the widget management client is further operable to transmit a content update request comprising a mobile widget identifier corresponding to the mobile widget and excluding a universal resource identifier (URI) corresponding to the updated content, wherein the wireless receiving of the first portion of the updated content in the first content update message is initiated based on the transmitting of the content update request.

52. The wireless device of claim 46, wherein the wireless receiving of the first portion of the updated content in the first content update message is based on a content update schedule determined according to a wireless network operator-related update consideration comprising either temporal network usage data or temporal network capacity data.

53. The wireless device of claim 46, wherein the widget management client is further operable to transmit a content update request based on a user input or based on a content update schedule, wherein the wireless receiving of the first portion of the updated content in the first content update message is initiated based on the transmitting of the content update request.

54. The wireless device of claim 46, wherein the communication module is further operable to wirelessly receive a second portion of the updated content in a second content update message, and wherein the second portion of the updated content corresponds to a second portion of the updated content having a second informational hierarchical depth range different from the first informational hierarchical depth range.

55. The wireless device of claim 54, wherein the second portion of the updated content is compressed according to a compression scheme to define a second compressed portion of the updated content, wherein the second compressed portion comprises a second size less than a first size of the corresponding second portion of the updated content, and wherein the widget management client is further operable to decompress the second compressed portion.

* * * * *